United States Patent
Miyazaki et al.

(10) Patent No.: US 8,675,216 B2
(45) Date of Patent: Mar. 18, 2014

(54) SELECTIVE DUPLICATING SYSTEM AND INFORMATION MANAGEMENT SERVER DEVICE

(75) Inventors: Shingo Miyazaki, Fuchu (JP); Tomoaki Morijiri, Chofu (JP); Shingo Abe, Kawasaki (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 6 days.

(21) Appl. No.: 13/588,656

(22) Filed: Aug. 17, 2012

(65) Prior Publication Data

US 2013/0242324 A1    Sep. 19, 2013

Related U.S. Application Data

(63) Continuation of application No. PCT/JP2011/053404, filed on Feb. 17, 2011.

(30) Foreign Application Priority Data

Feb. 18, 2010   (JP) ................................. 2010-033820

(51) Int. Cl.
   *G06F 3/12*   (2006.01)

(52) U.S. Cl.
   USPC ....... 358/1.13; 358/1.14; 358/1.15; 358/1.16; 358/1.18

(58) Field of Classification Search
   None
   See application file for complete search history.

(56) References Cited

U.S. PATENT DOCUMENTS

| | | | | |
|---|---|---|---|---|
| 5,897,643 | A | * | 4/1999 | Matsumoto .................. 715/234 |
| 8,478,724 | B2 | * | 7/2013 | Miyazaki et al. ............. 707/634 |
| 8,488,142 | B2 | * | 7/2013 | Miyazaki et al. ............. 358/1.14 |
| 2007/0027868 | A1 | * | 2/2007 | Mohammed ..................... 707/7 |
| 2008/0007770 | A1 | * | 1/2008 | Tokunaga ..................... 358/1.15 |
| 2010/0318581 | A1 | * | 12/2010 | Miyazaki et al. ............. 707/803 |

FOREIGN PATENT DOCUMENTS

| | | | |
|---|---|---|---|
| JP | 2006-211027 | A | 8/2006 |
| JP | 2007-243729 | A | 9/2007 |
| JP | 2007-243730 | A | 9/2007 |
| JP | 2007-304789 | A | 11/2007 |

OTHER PUBLICATIONS

International Search Report issued Mar. 15, 2011 in PCT/JP2011/053404 filed Feb. 17, 2011 (with English Translation).
Written Opinion issued Mar. 15, 2011 in PCT/JP2011/053404 filed Feb. 17, 2011.
International Preliminary Report on Patentability and Written Opinion issued Sep. 27, 2012, in International application No. PCT/JP2011/053404 (English translation only).

* cited by examiner

*Primary Examiner* — Miya J Cato
(74) *Attorney, Agent, or Firm* — Oblon, Spivak, McClelland, Maier & Neustadt, L.L.P.

(57) ABSTRACT

According to one embodiment, an information management server device determines whether to permit the duplicating of the original data selected in the duplication source selection information. The information management server device reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body.

8 Claims, 51 Drawing Sheets

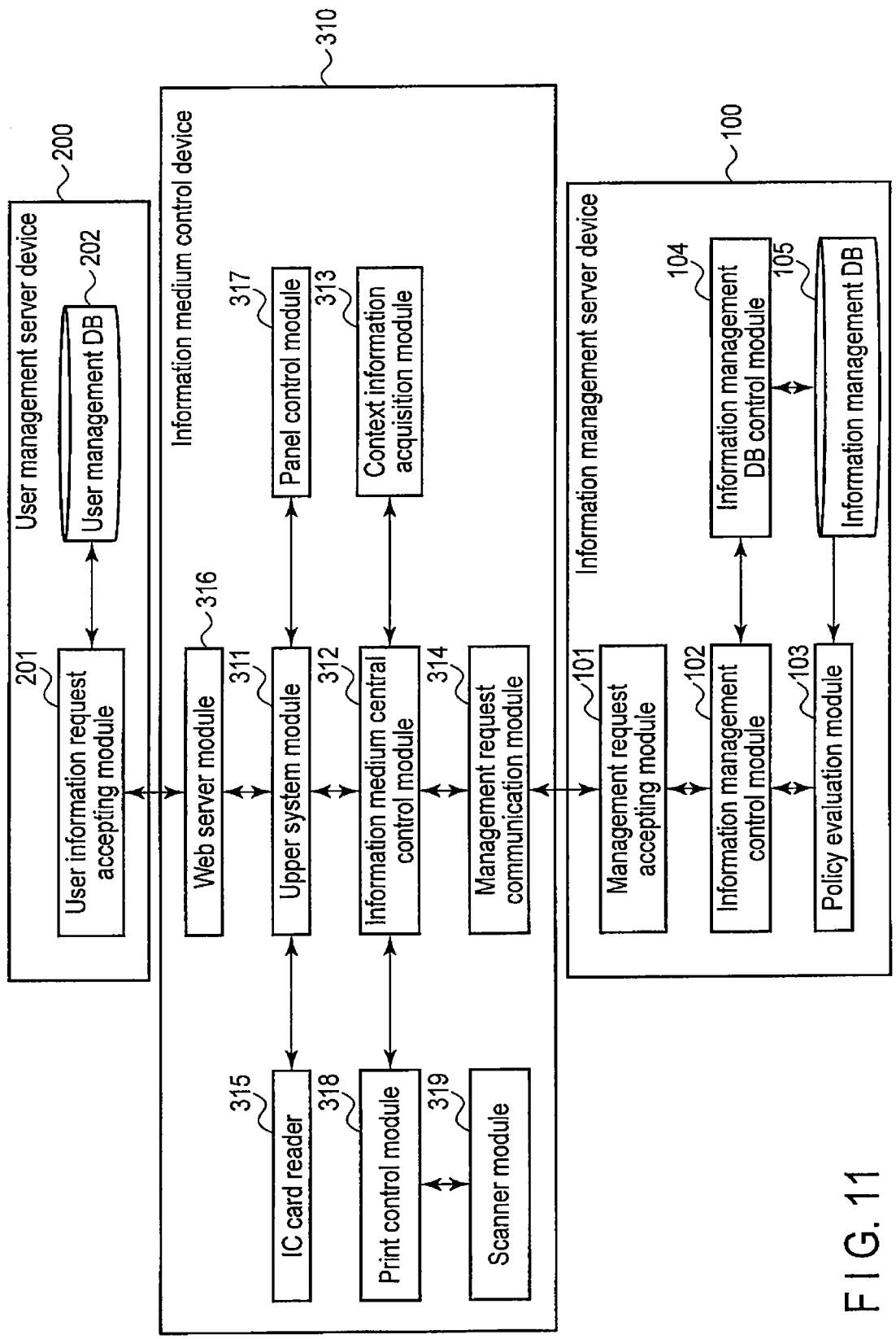
F I G. 11

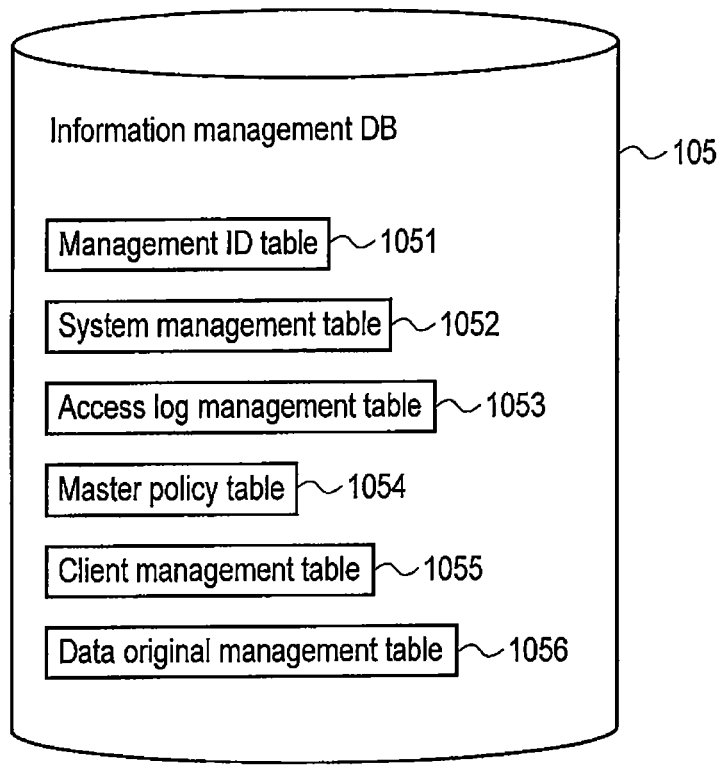

FIG. 12

| Management ID table ||||| 
|---|---|---|---|---|
| Management ID | Issue date and time | Issue client information | Expiry date | Expired client information |
| 1000101 | yyyy/mm/dd | Device A (ip:10.xxx.xx.x) | – | Device A (ip:10.xxx.xx.x) |
| 1001101 | yyyy/mm/dd | Device A (ip:10.xxx.xx.x) | – | Device A (ip:10.xxx.xx.x) |
| 1001102 | yyyy/mm/dd | Device A (ip:10.xxx.xx.x) | – | Device A (ip:10.xxx.xx.x) |
| 1001201 | yyyy/mm/dd | Device A (ip:10.xxx.xx.x) | – | Device A (ip:10.xxx.xx.x) |
| 1001301 | yyyy/mm/dd | Device A (ip:10.xxx.xx.x) | – | Device A (ip:10.xxx.xx.x) |
| 1002101 | yyyy/mm/dd | MFP X (ip:10.xxx.xx.x) | yyyy/mm/dd | MFP X (ip:10.xxx.xx.x) |

FIG. 13

Access log management table 1053

| Date and time | Client ID | Operation type | Management ID | Processing status |
|---|---|---|---|---|
| 2008/04/12 10:22 | 101 | New entry | 1000101 | Success |
| 2008/04/22 11:23 | 232 | Copying request | — | Success |
| 2008/04/22 16:03 | 001 | Printing request | 1000102 | Success |
| ... | ... | ... | ... | ... |
| 2008/09/27 15:32 | 931 | Printing request | — | Authentication error |
| 2008/09/27 15:41 | 543 | Copying request | — | Success |

F I G. 15

Master policy table

| Policy number | Policy type | Reject/permit policy |
|---|---|---|
| 001 | Location control | IP address is set as "172.xx.xxx.xxx. → in-company wireline connection" and all the commands are permitted. |
| 002 | Location control | IP address is set as "10.xxx.xxx.xxx. → in-company wireless connection" and only a new entry is permitted. |
| 003 | Location control | "172.xx.xxx.xxx. → in-company wireline connection" is set and all the commands are rejected. |
| 004 | Time control | When command acceptance time is 02:00 – 06:00, all the commands are rejected. |
| 005 | Authorization control | When user attribute is not an executive, information discard command is rejected. |
| ... | ... | ... |

1054

F I G. 16

1055

| Client management table | | | | |
|---|---|---|---|---|
| Client ID | User ID | Authority class | Terminal type | MAC address |
| 0001 | 00000001 | Executive | Desktop PC | XXXXXXX |
| 0002 | 00000001 | Executive | Note PC | XXXXXXX |
| 0004 | 00000009 | Regular employee | Mobile phone for company use | XXXXXXX |
| ... | ... | | ... | ... |
| 8999 | 00004001 | Administrator | Note PC | XXXXXXX |
| 9000 | 00005223 | Regular employee | Desktop PC | XXXXXXX |

| Data original management table | |
|---|---|
| Entity ID | Identification ID of data original |
| File name | File name of managed data body to be stored in management file |
| Size | File size of managed data body to be stored in management file |
| Hash value | Hash value of managed data body to be stored in management file |
| Electronic data body | Managed data body to be stored in management file (when being stored in information management DB) |
| External storage information | Storage destination information when managed data body is separated from outside information management DB and is stored |

FIG. 18

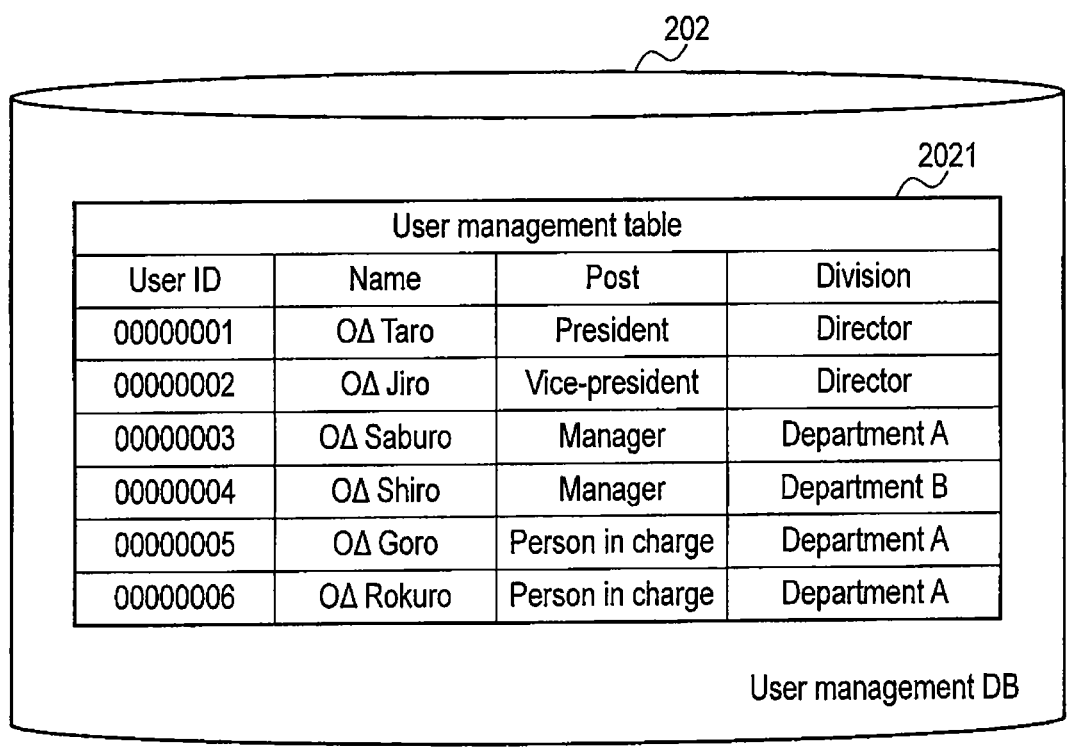
F I G. 19

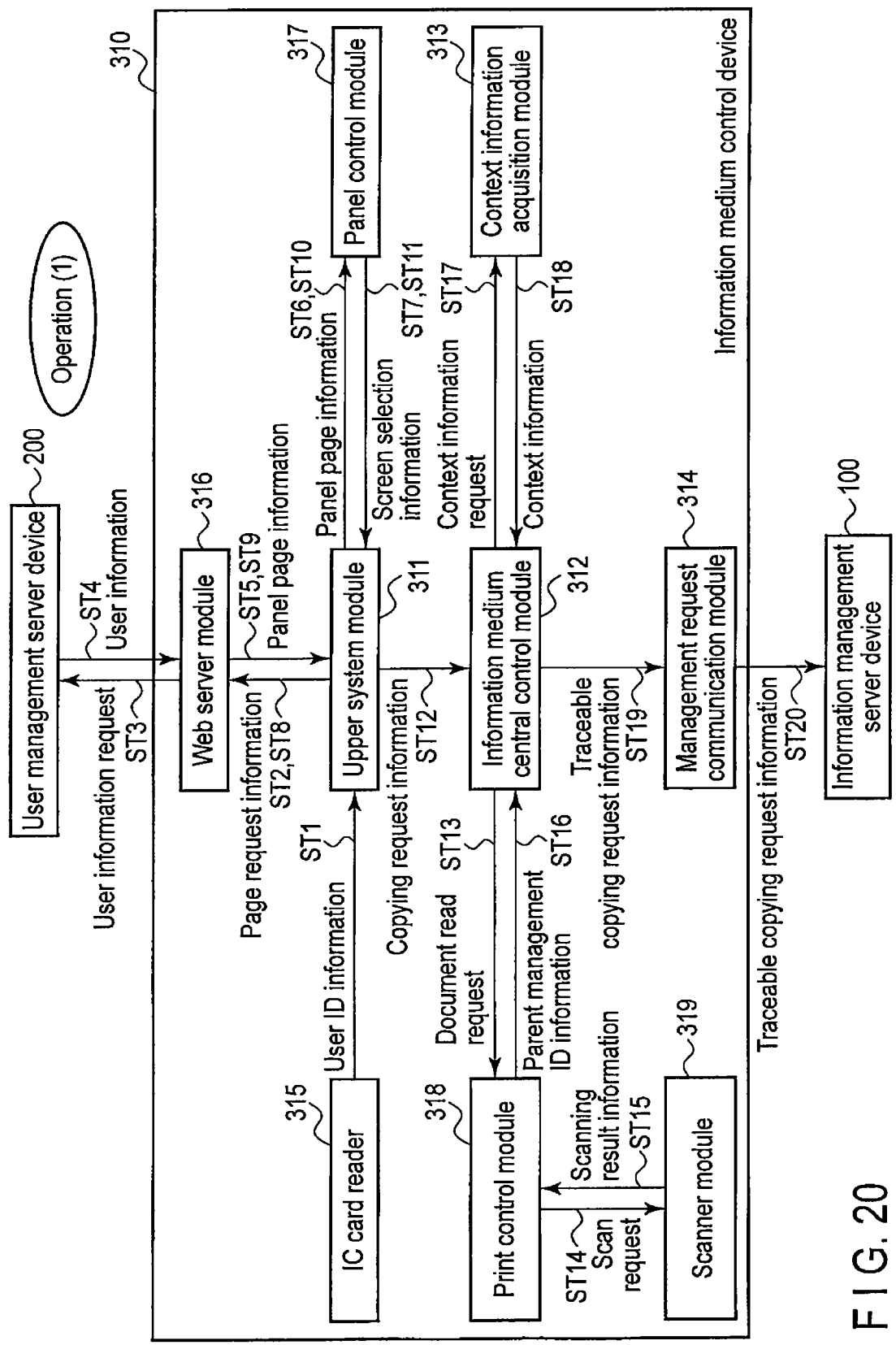
F I G. 20

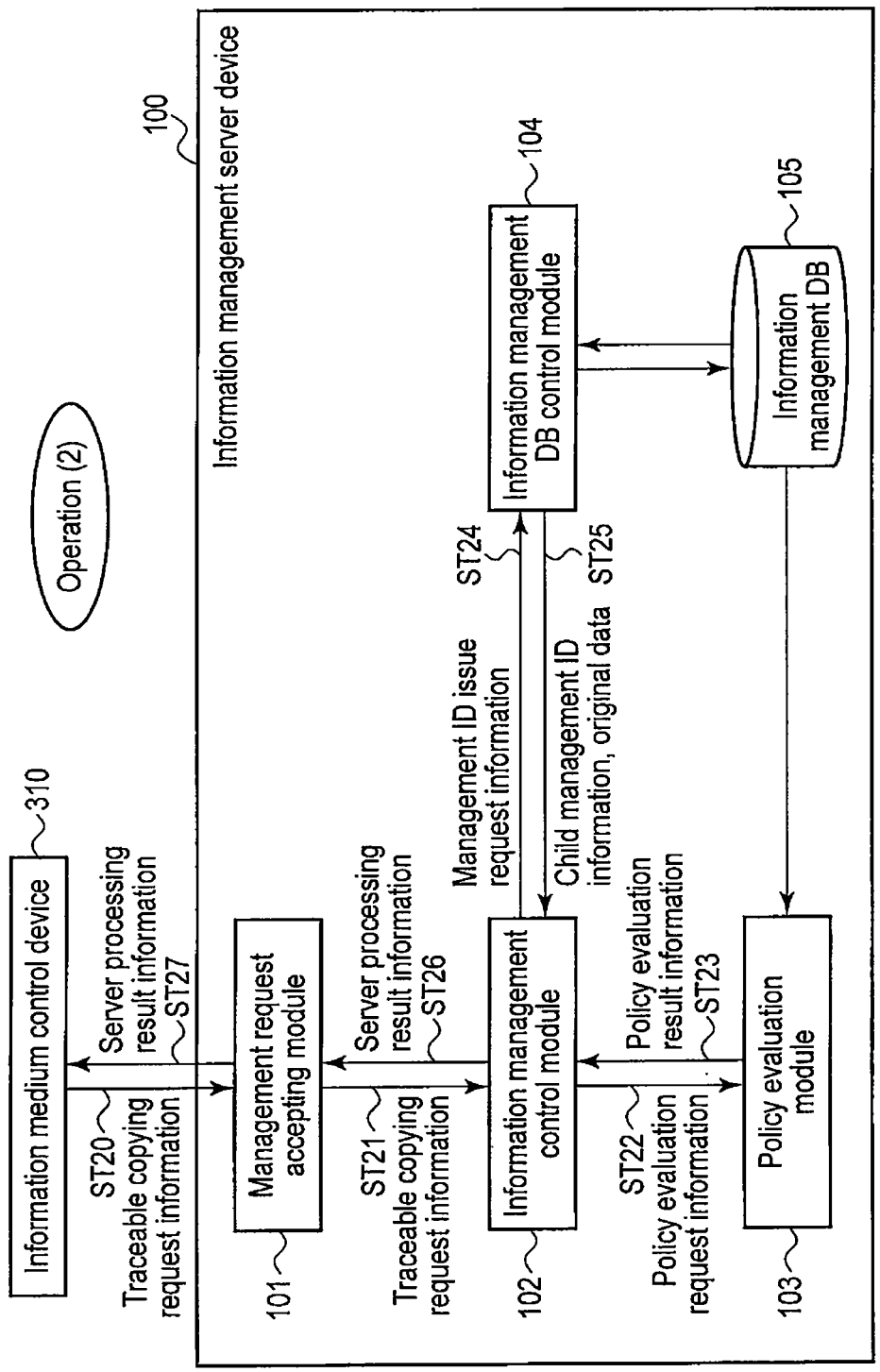
F I G. 21

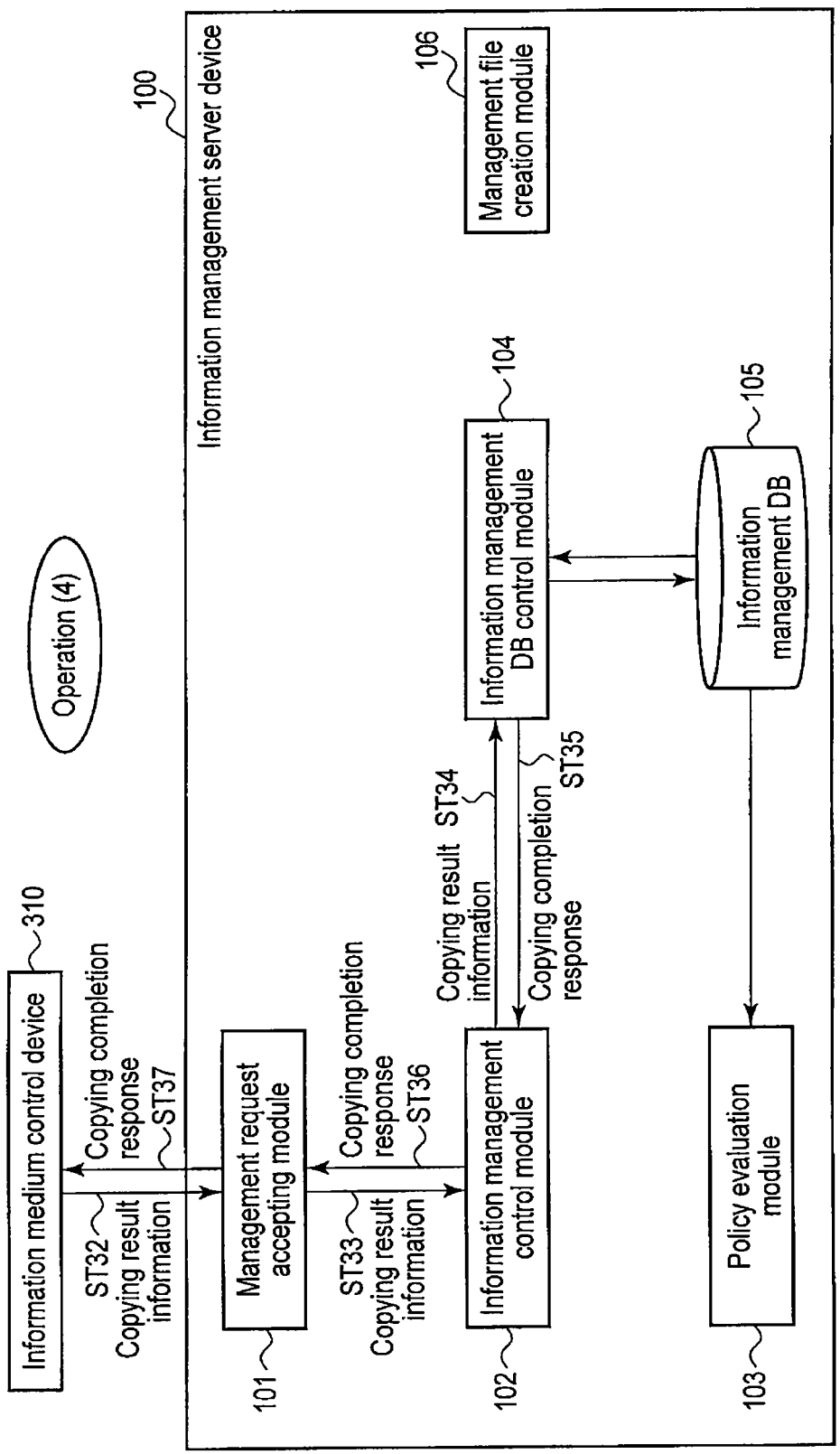
F I G. 23

G50

Employee number : 00000003 } g51
OΔ Saburo

Logout g52 {
The duplicating of "1002104 Vital client roster" has been completed for the distribution addresses below.

1  Department A   Person in charge   OΔ Goro     one copy
2  Department A   Person in charge   OΔ Rokuro   one copy Total                                two copies To continue the processing    To TOP screen

F I G. 29

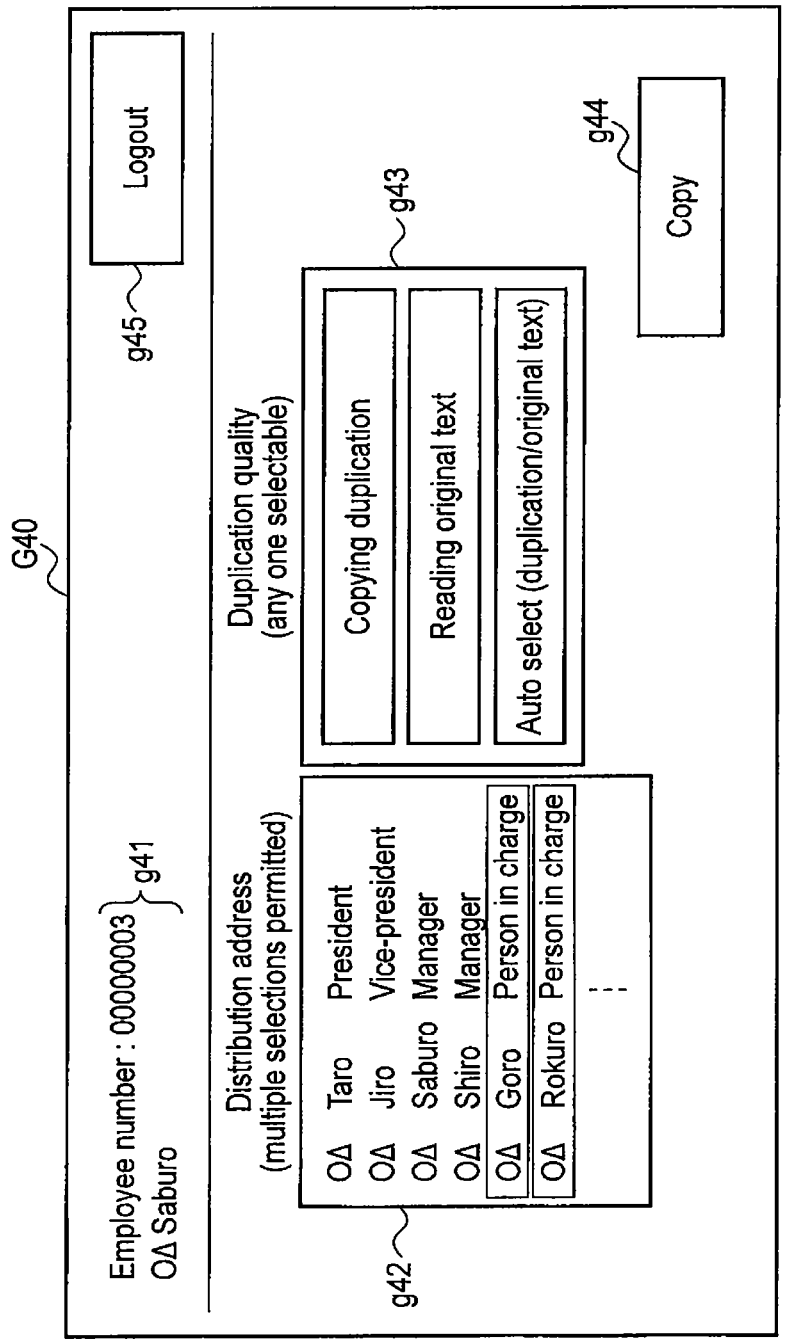
F I G. 30

Critical document management – Print screen　　　　　Login : O△ Saburo　Manager

Management file list

| | |
|---|---|
| 1000101 | Client A contract document |
| 1001102 | Client B contract document |
| 1001113 | X product design drawing |
| 1002104 | Vital client roster |
| | --- |

Distribution address
(multiple selections permitted)

- O△ Taro　President
- O△ Jiro　Vice-president
- O△ Saburo　Manager
- O△ Shiro　Manager
- O△ Goro　Person in charge
- ---

Duplication quality
(any one selectable)

- Copying duplication
- Reading original text

Print

G10

F I G. 36

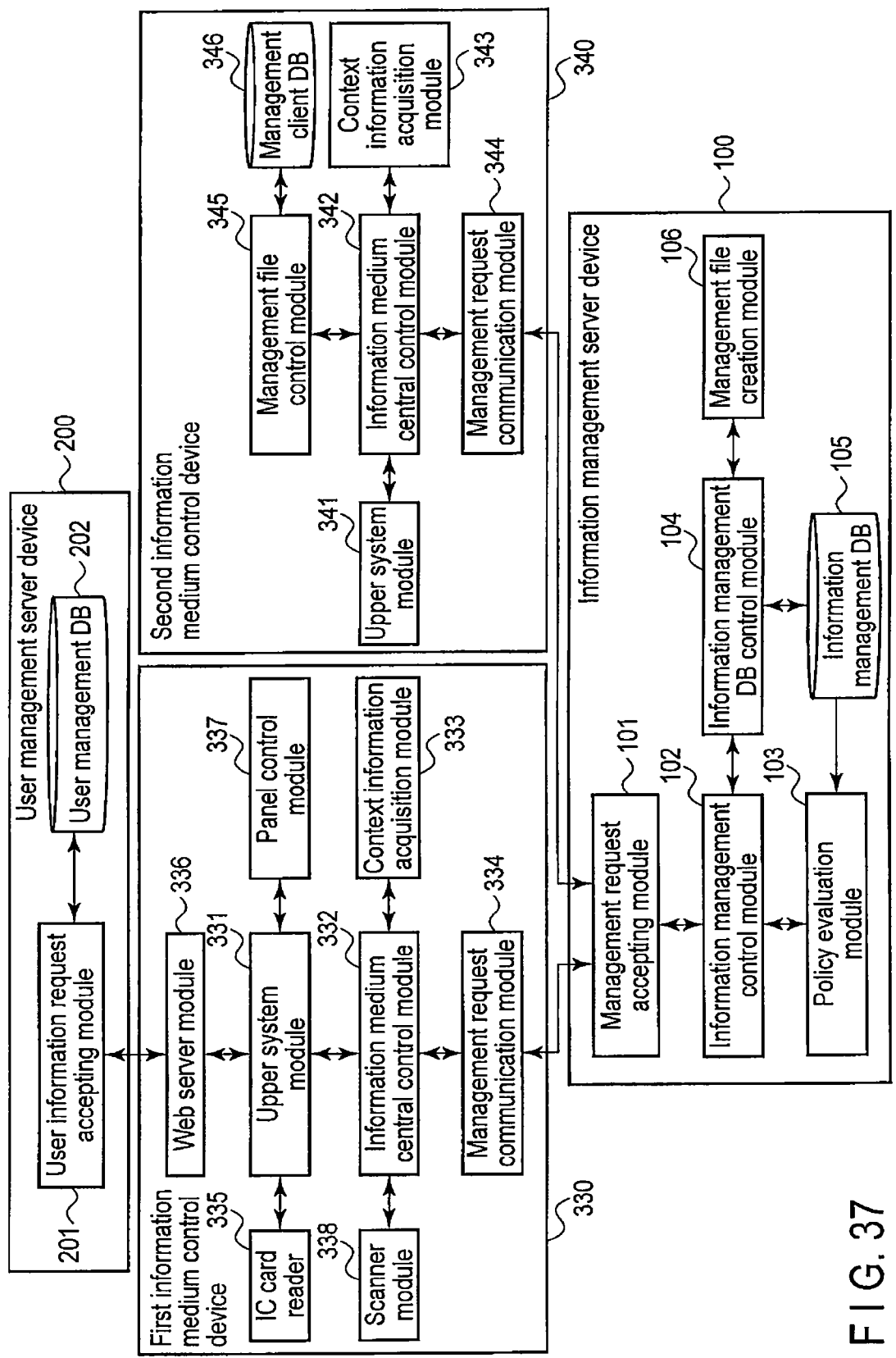
F I G. 37

| Post-office box management table |||
|---|---|---|
| Post-office box ID | Number of mailed files | Management ID list |
| 1000001 | 0 | null |
| 1000002 | 0 | null |
| 1000003 | 2 | #100001111 (Posting date : 2009/05/02)<br>#100002111 (Posting date : 2009/06/12) |
| 1000004 | 1 | #100002112 (Posting date : 2009/06/12) |
| 1000005 | 0 | null |
| 1000007 | 1 | #100002113 (Posting date : 2009/06/12) |

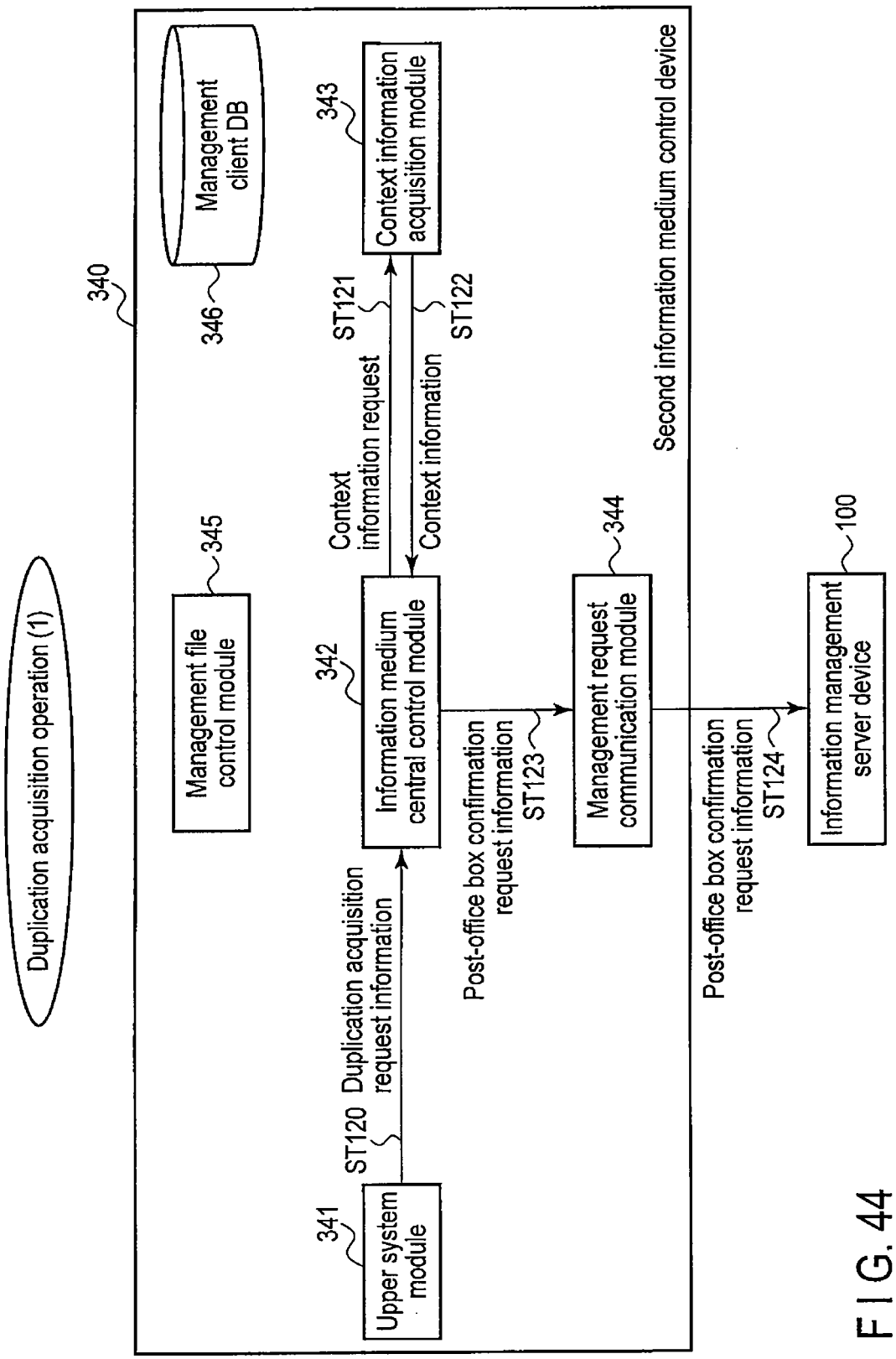
F I G. 44

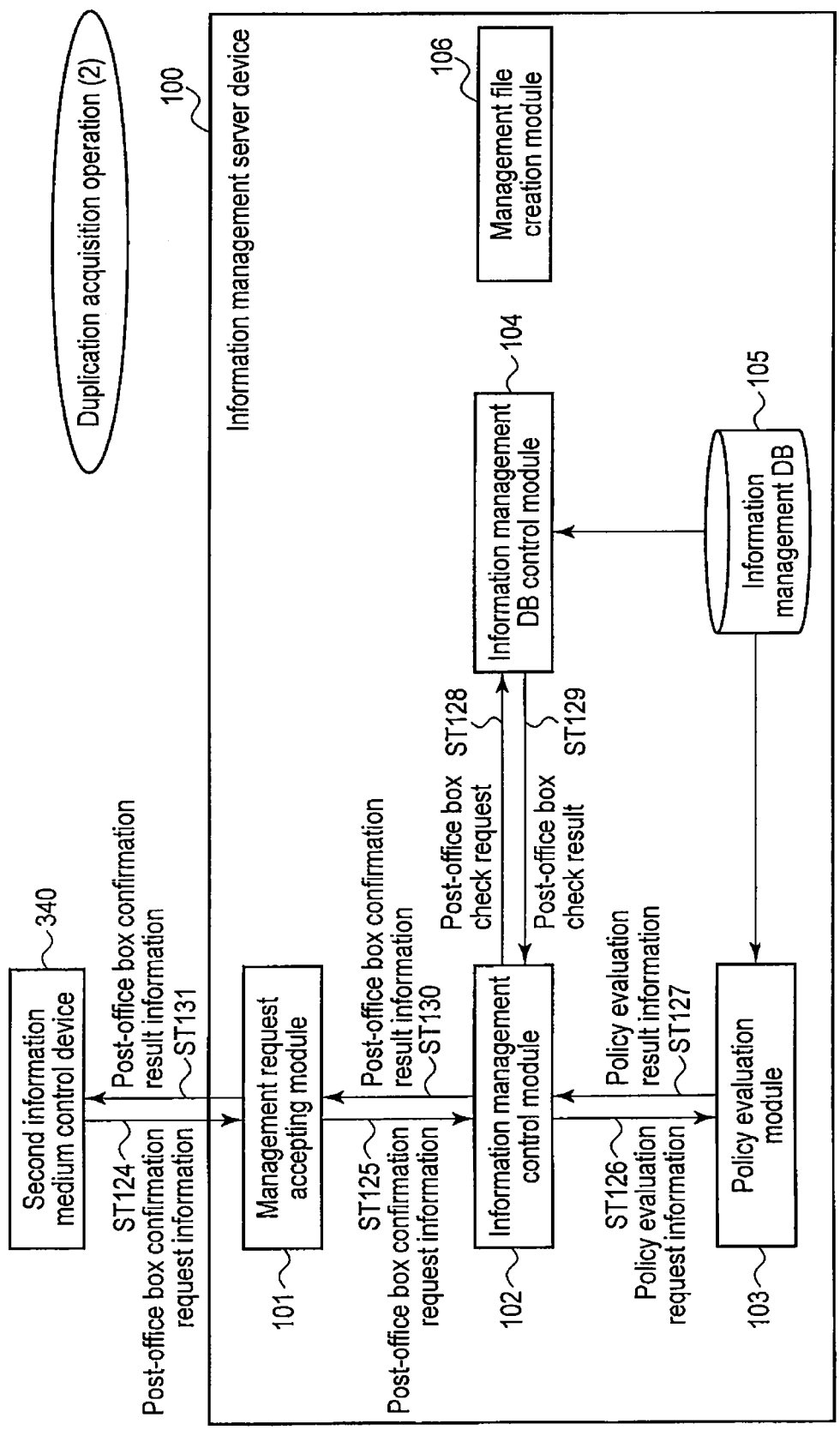
F I G. 45

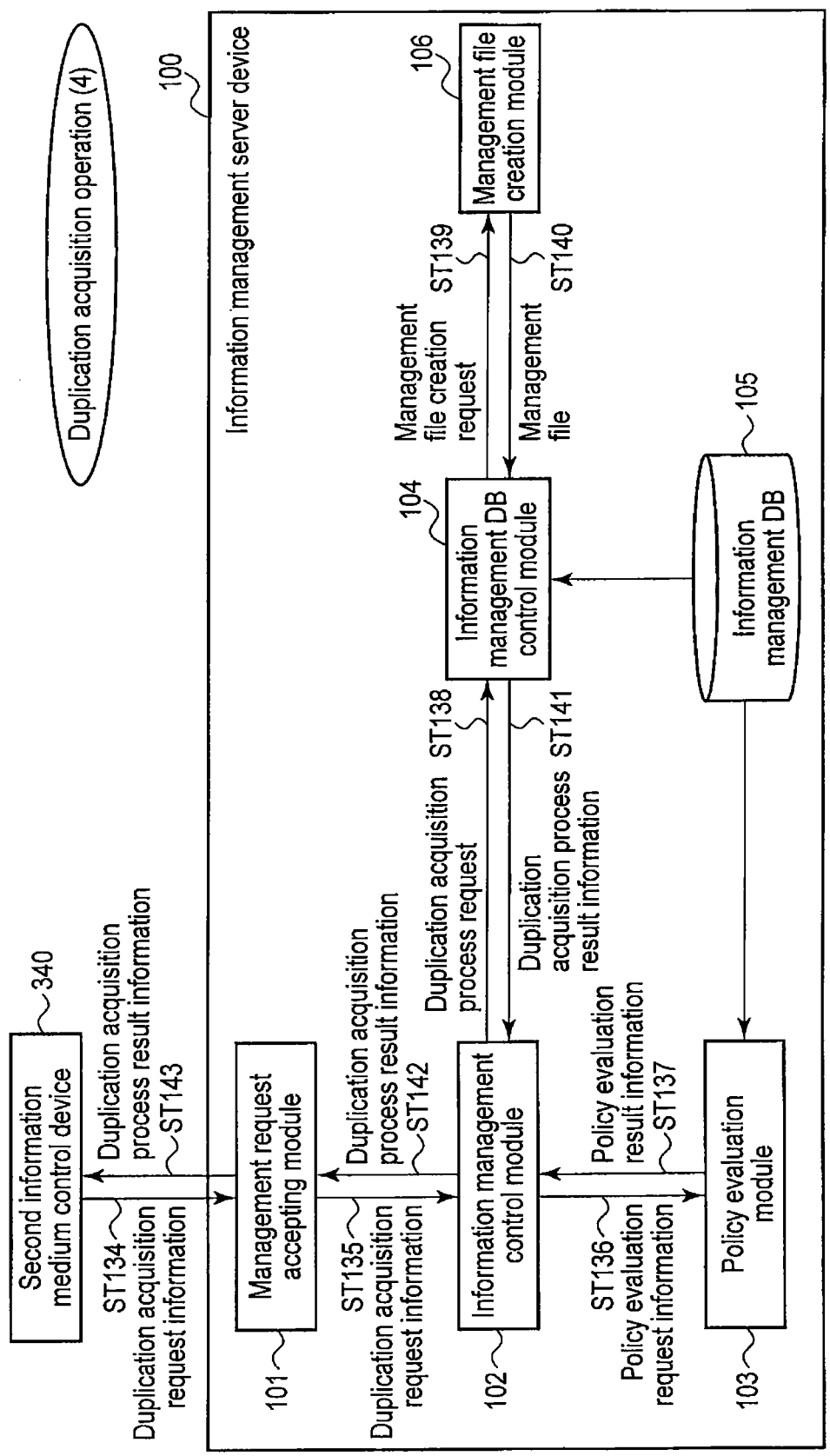
F I G. 47

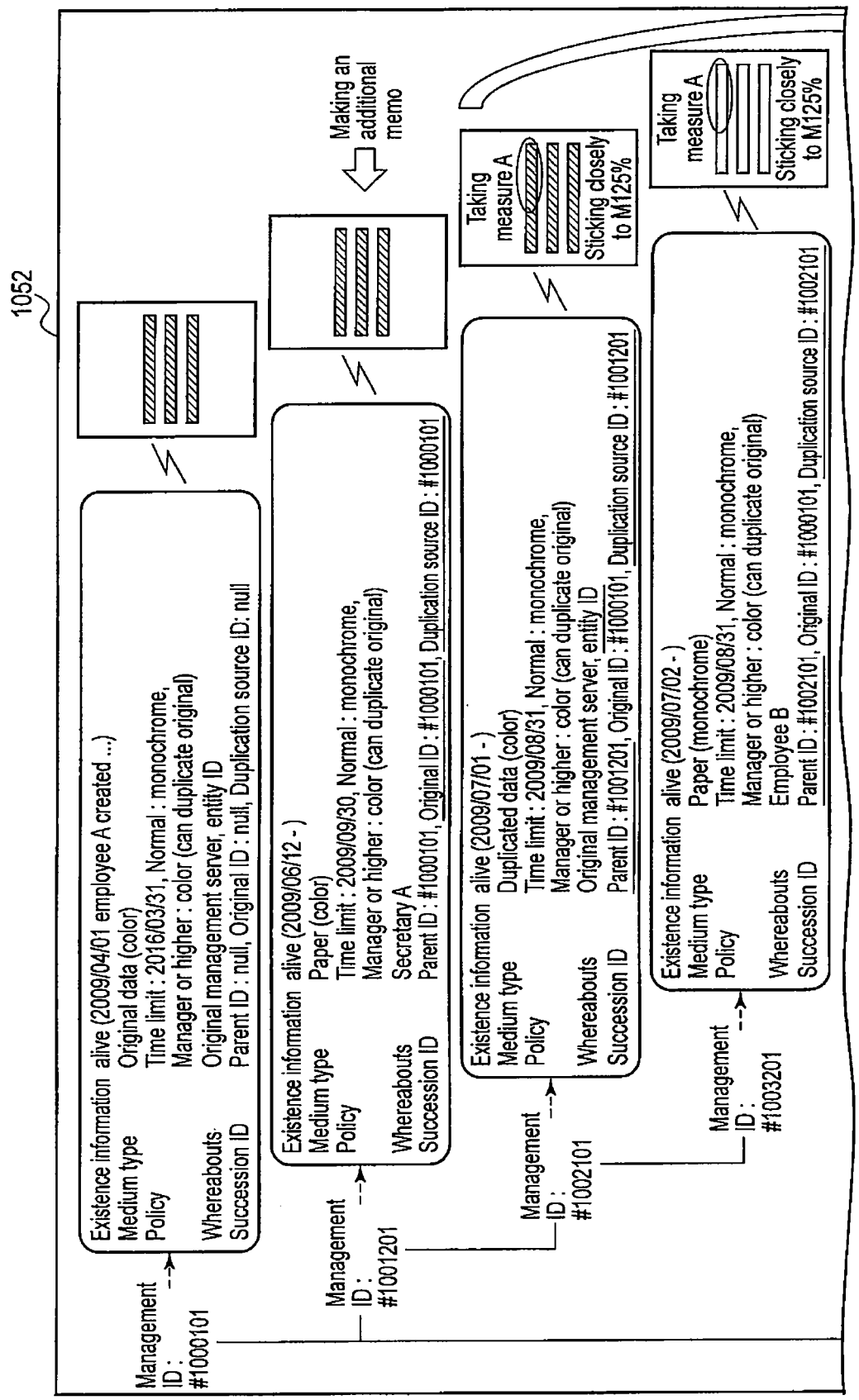
F I G. 50A

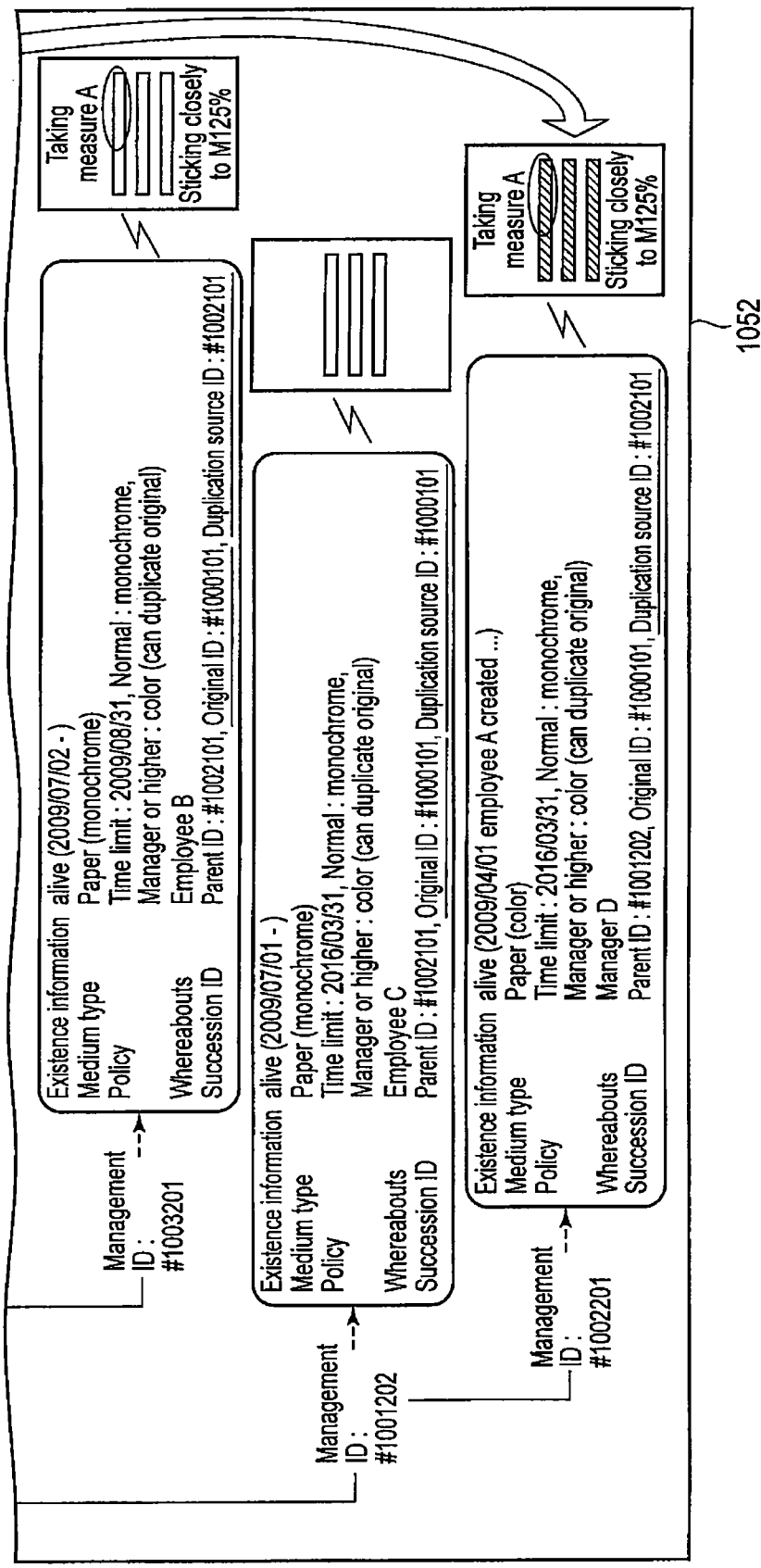
F I G. 50B

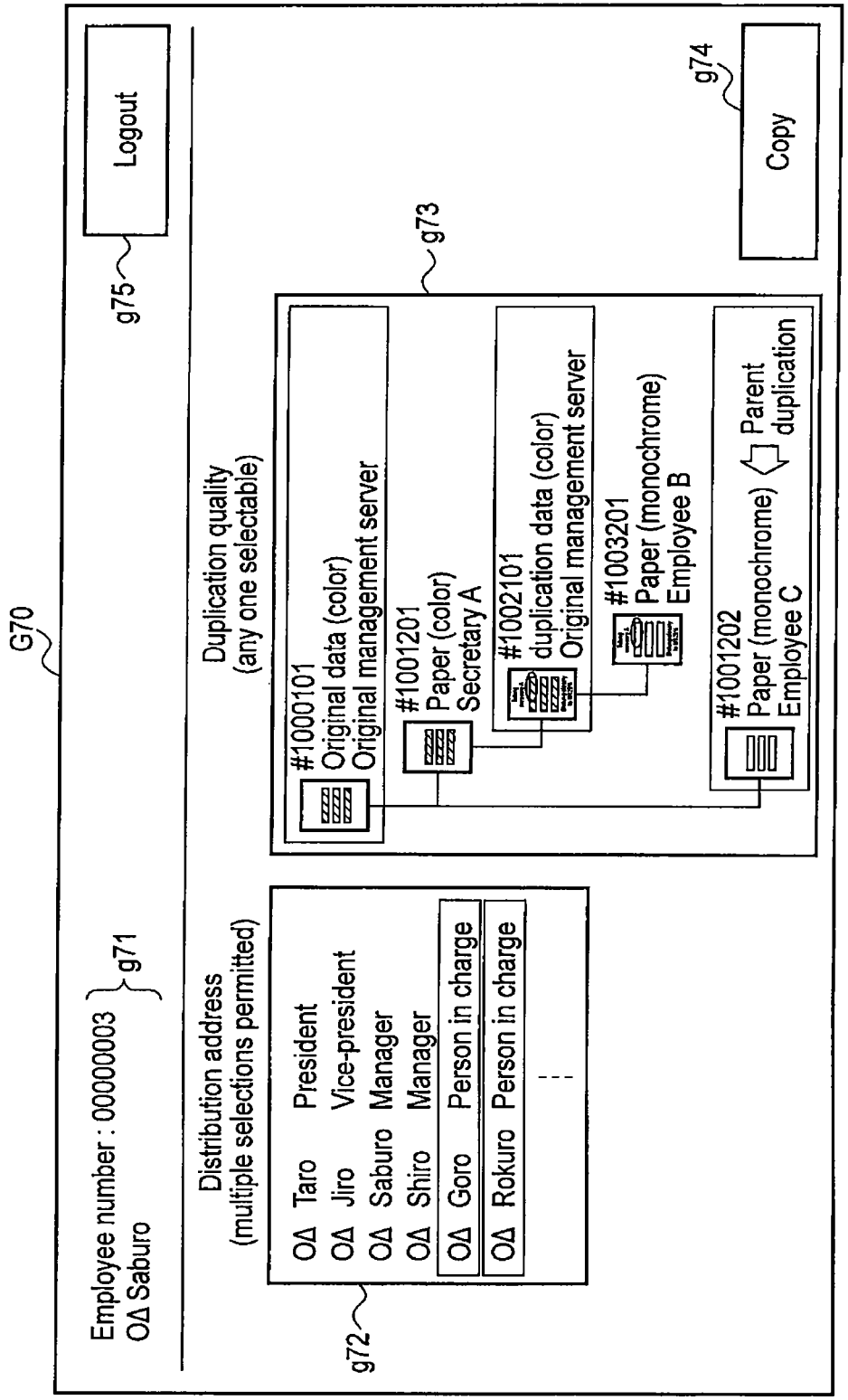
F I G. 51

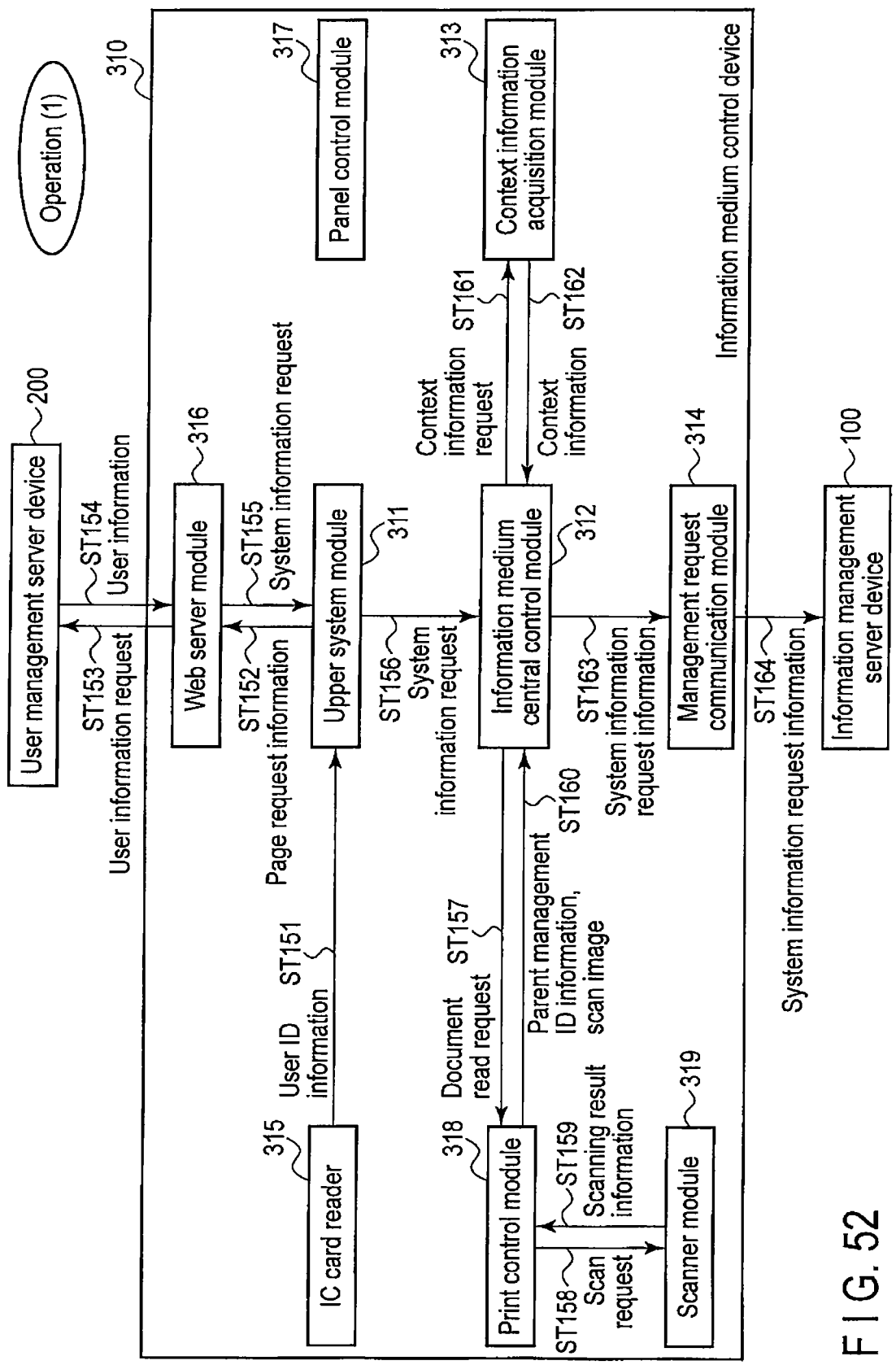
F I G. 52

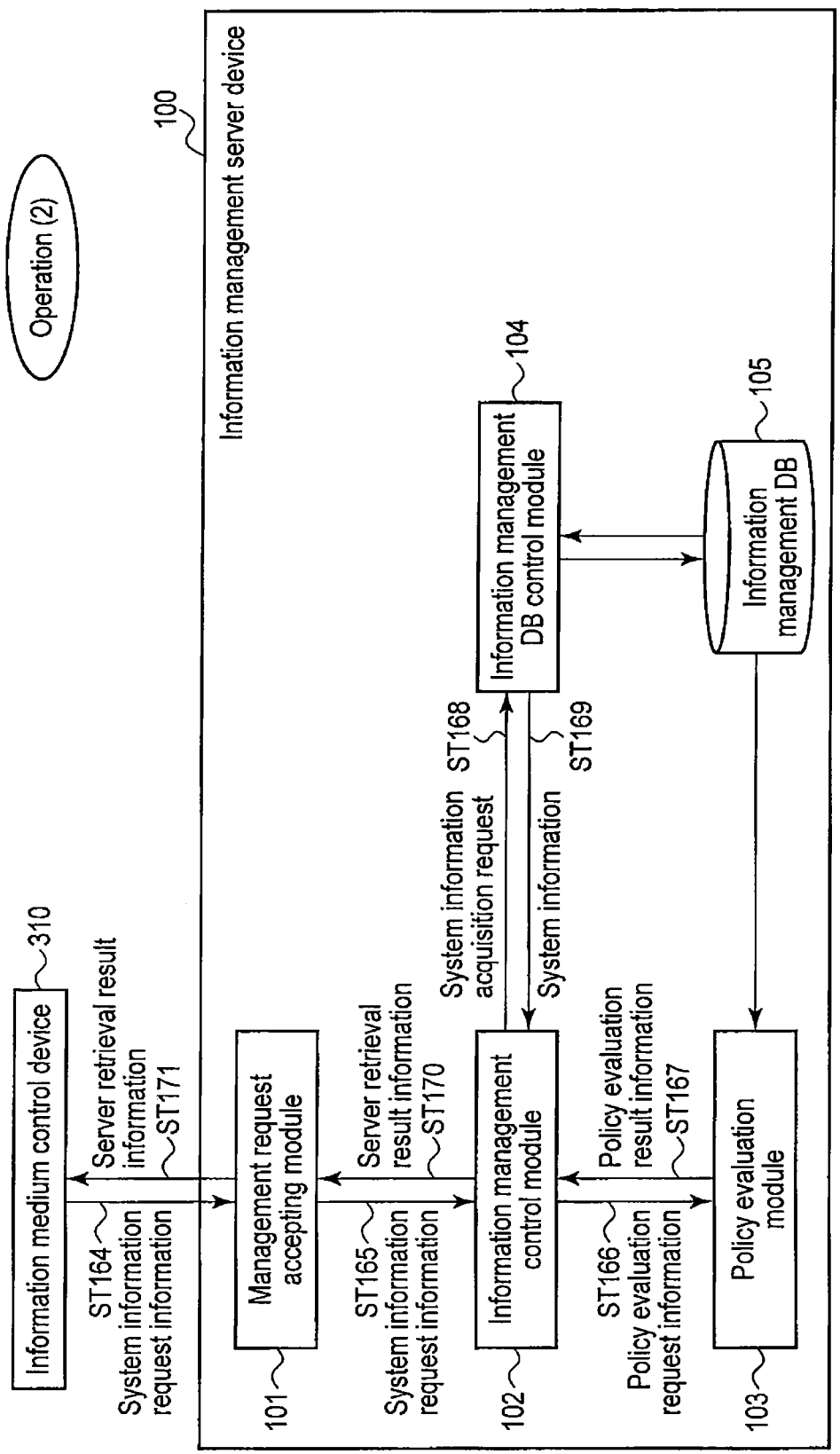
F I G. 53

SELECTIVE DUPLICATING SYSTEM AND INFORMATION MANAGEMENT SERVER DEVICE

CROSS REFERENCE TO RELATED APPLICATIONS

This application is a Continuation Application of PCT Application No. PCT/JP2011/053404, filed Feb. 17, 2011 and based upon and claiming the benefit of priority from Japanese Patent Application No. 2010-033820, filed Feb. 18, 2010, the entire contents of all of which are incorporated herein by reference.

FIELD

Embodiments described herein relate generally to a selective duplicating system and an information management server device.

BACKGROUND

Paper documents duplicated from original data might deteriorate in readability quality as compared with original data in such a manner that the original data would be printed in monochrome instead of color, overwritten with memos, printed with a woven pattern, or deteriorate in image quality. In addition, duplicated data or paper documents might be deteriorated in readability quality purposely so as to be duplicated with such an important part as a personal information field, including a personal name in the original data, being masked.

Paper documents or duplicated data further duplicated from the duplicated paper documents or duplicated data deteriorate in quality more than the original data.

To produce a duplicate of the same quality as that of the original data from a certain duplicate, it is necessary to independently retrieve original data corresponding to the duplicate from an information system and perform duplicating.

As this type of duplicating technology, for example, a method has been proposed which enters original images of documents in a server in advance, retrieves an original image by image matching based on a scanned image of a document at the time of duplicating and, if the original image is found in the server, replaces the scanned image with the original image, and outputs a high-quality duplication.

The aforementioned method has no problem in ordinary practice. However, the inventor's examination has shown that it is conceivable that the method has room for improvement, taking into account inconveniences caused in some cases.

For example, when a duplicated image has been deteriorated, the following inconveniences are caused: the original image cannot be retrieved because retrieving is performed based on image matching and therefore the retrieval efficiency is low.

In addition, when the original data includes an important part, the following inconvenience is caused: the operation of producing a duplication of the same quality as that of the original data from a certain duplication cannot be suppressed according to permission or conditions because there is neither a security rule to determine whether to permit duplicating nor a criterion for determining conditions for the permission of duplicating.

An object of the invention is to provide a selective duplicating system and an information management server device which are capable of not only preventing inconveniences from being caused when a duplicated image has deteriorated or when original data includes an important part but also producing a duplication of the same quality as that of the original data from a certain duplication.

BRIEF DESCRIPTION OF THE DRAWINGS

FIG. 11 is a schematic diagram showing the configuration of a selective duplicating system according to the first embodiment;

FIG. 12 is a schematic diagram showing the configuration of an information management DB in the first embodiment;

FIG. 13 is a schematic diagram showing the configuration of a management ID table in the first embodiment;

FIG. 15 is a schematic diagram showing the configuration of an access log management table in the first embodiment;

FIG. 16 is a schematic diagram showing the configuration of a master policy table in the first embodiment;

FIG. 17 is a schematic diagram showing the configuration of a client management table in the first embodiment;

FIG. 18 is a schematic diagram showing the configuration of a data original management table in the first embodiment;

FIG. 19 is a schematic diagram showing the configuration of a user management DB in the first embodiment;

FIG. 20 is a schematic diagram to explain an operation of the first embodiment;

FIG. 21 is a schematic diagram to explain an operation of the first embodiment;

FIG. 23 is a schematic diagram to explain an operation of the first embodiment;

FIG. 29 is a schematic diagram showing an example of the configuration of a copy operation screen in the first embodiment;

FIG. 30 is a schematic diagram showing a modification of the configuration of a copy operation screen in the first embodiment;

FIG. 36 is a schematic diagram showing an example of the configuration of a print operation screen in the second embodiment;

FIG. 37 is a schematic diagram showing the configuration of a selective duplicating system according to a third embodiment;

FIG. 44 is a schematic diagram to explain an operation of the third embodiment;

FIG. 45 is a schematic diagram to explain an operation of the third embodiment;

FIG. 47 is a schematic diagram to explain an operation of the third embodiment;

FIG. 50A is a schematic diagram showing the configuration of a system management table according to a fourth embodiment;

FIG. 50B is a schematic diagram showing a configuration of the system management table in the fourth embodiment;

FIG. 51 is a schematic diagram showing an example of the configuration of a duplication operation screen in the fourth embodiment;

FIG. 52 is a schematic diagram to explain an operation of the fourth embodiment;

FIG. 53 is a schematic diagram to explain an operation of the fourth embodiment.

DETAILED DESCRIPTION

Figure 1:
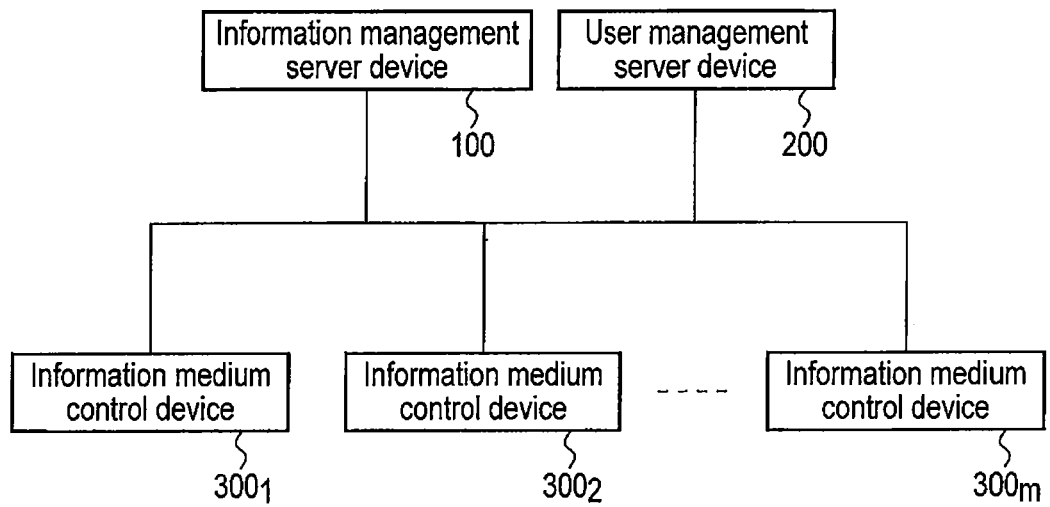
FIG. 1 is a block diagram showing the configuration of a selective duplicating system.

In general, according to one embodiment, a selective duplicating system according to an embodiment comprises a paper medium duplicating device and an information management server device which are capable of communicating with each other.

The information management server device comprises a first storage unit and a second storage unit.

The first storage unit, regarding original data, stores a management ID, an entity ID, and an electronic data body which are associated with each other.

The second storage unit, regarding paper mediums duplicated sequentially from the original data, stores policy information to indicate whether a user is permitted to duplicate each of the paper mediums, original data, and the individual items of the original data and a management ID of the original data which are associated with each other on a management ID basis.

The information management server device reads policy information related to a management ID in a duplication request from the second storage unit when having received the duplication request that includes a management ID indicating a paper medium to be duplicated, duplication source selection information that has selected the paper medium or original data as a duplication source, and user information.

The information management server device collates the read policy information with the user information in the duplication request and determines whether to permit the duplicating of the paper medium or original data selected in the duplication source selection information.

The information management server device reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body.

The information management server device transmits the created duplicated original data to the paper medium duplicating device.

The information management server device transmits a new management ID to the paper medium duplicating device when the determination result for the paper medium has shown that the duplicating is permitted.

The paper medium duplicating device transmits the duplication request to the information management server device.

The paper medium duplicating device creates duplicated paper medium data by giving the new management ID received from the information management server device to image data read from the paper medium to be duplicated.

The paper medium duplicating device prints and outputs the duplicated original data received from the information management server device or the created duplicated paper medium data.

Hereinafter, each embodiment will be explained with reference to the accompanying drawings. Each of the devices described below can be implemented on a device basis by either a hardware configuration or a combined configuration of hardware resources and software. As software in the combined configuration, a program is used which is installed in a computer of a corresponding device from a network or a storage medium in advance to realize the function of the corresponding device.

First, terms, general descriptions, and the like on which a selective duplicating system in this specification is based will be explained. FIG. 1 is a schematic diagram showing the configuration of a selective duplicating system according to each embodiment.

The selective duplicating system is so configured that an information management server device 100 for managing information mediums in an integrated fashion on a system basis and selectively making a duplication, a user management server device 200 for managing information on users in an integrated fashion, and a plurality of information medium control devices $300_1$ to $300_m$ for obtaining a duplication selected from information mediums managed in an integrated fashion on a system basis can communicate with one another.

Figure 2:
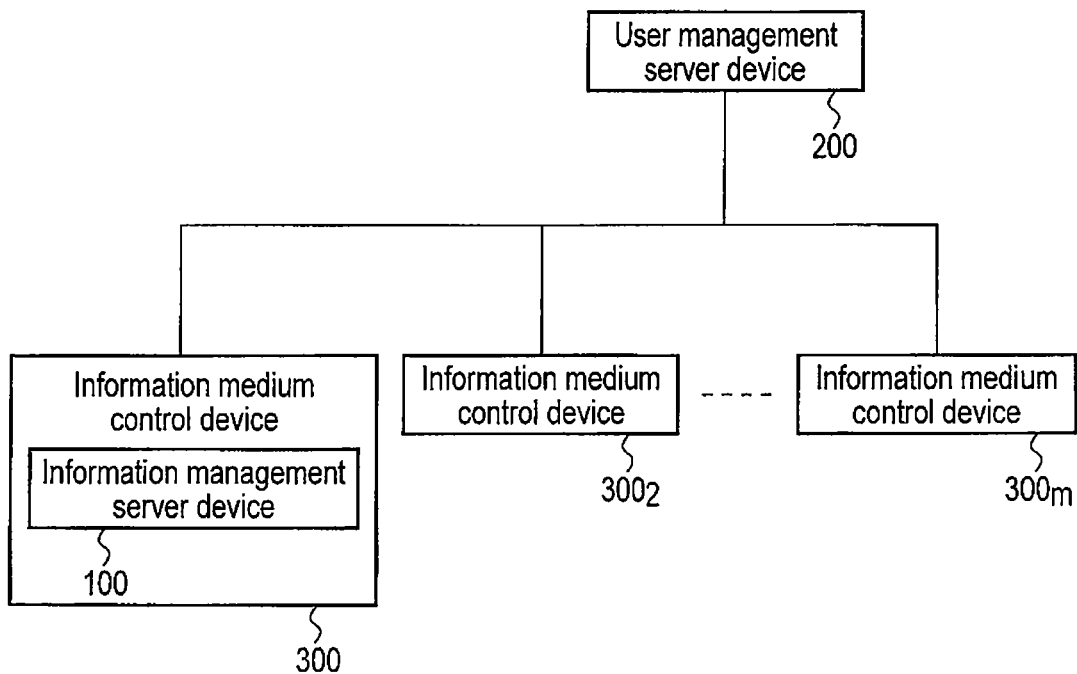
FIG. 2 is a schematic diagram showing a modification of each embodiment.

Here, of the information medium control devices $300_1$ to $300_m$, an arbitrary information medium control device is represented as an "information medium control device 300." For convenience of explanation, one information management server device 100 is described as a device differing from an m number of information medium control devices $300_1$ to $300_m$. In addition to this, as shown in FIG. 2, an arbitrary information medium control device 300 may be configured to include an information management server device 100. Alternatively, as shown in FIG. 3, an i number of information medium control devices 300 (i being not less than 2 but not more than m) may be configured to be assigned an n number of functions of the information management server device 100 (i≤n) and to execute the functions.

Figure 3:
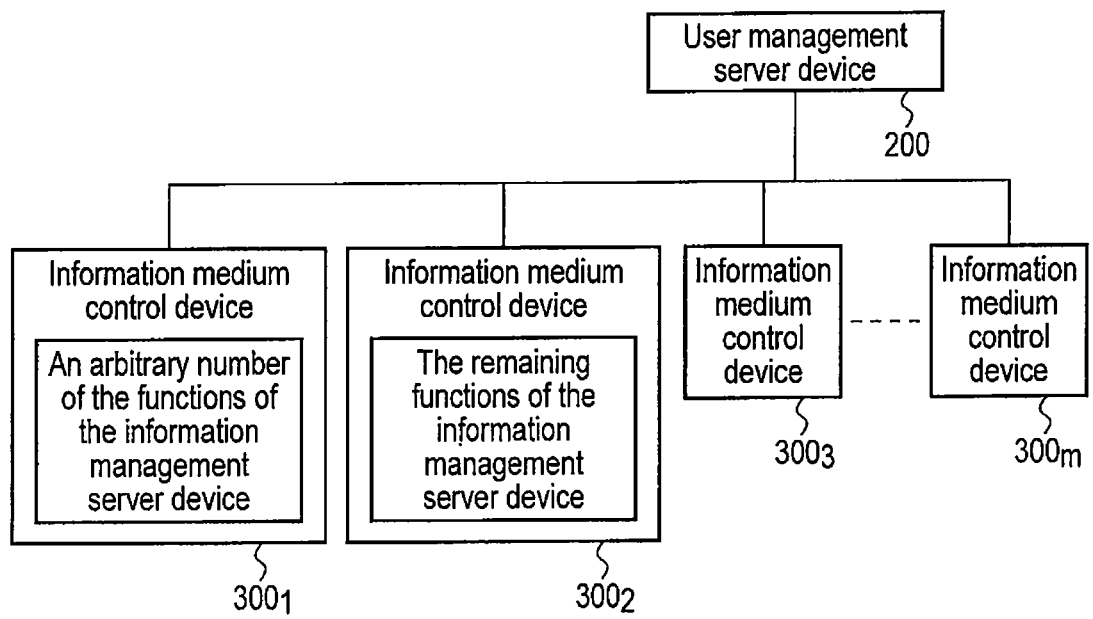
FIG. 3 is a schematic diagram showing another modification of each embodiment.

In a modification shown in FIG. 3, the functions of the information management server device 100 may be assigned to an i number of information medium control devices 300 one for one (when i=n). Alternatively, at least one of the i number of information medium control devices 300 may be assigned not less than two of the functions of the information management server device 100 (when i<n).

When an F (less than n) number of function blocks (e.g., modules 101 to 106 in FIG. 11) arrange an information management server device 100 with an n number of functions in a distributed manner, an i number of information medium control devices 300 may be configured to be assigned the F number of function blocks (where i≤F).

When i=F and when i<F, it is all right if "function" described when i=n and when i<n is read as "function block."

In other words, FIG. 3 shows that the n number of functions of the information management server device 100 or the F number of function blocks may be assigned to an i number of information medium control devices 300 on the basis of the expression 2≤i≤F<n.

The user management server device 200 includes a user management DB in which user information, including user name, post, and department, is written so as to be related to the user's user ID information and the function of transmitting user information related to the user ID information to an information medium control device 300 when having received a user information request including the user ID information.

Here, an information medium means "a medium that holds information," such as electronic data or a physical medium (a paper medium, a recording medium, and the like). As a recording medium, for example, a CDROM, a DVD, an SD card, an FD, and the like can be used.

Therefore, the information medium control devices $300_1$ to $300_m$ can be realized, provided that they are devices in which electronic data can be input. For example, according to an information medium to be used, they are realized in the form of various devices, including a mobile phone, a PC (Personal Computer), a digital complex machine, a printer, a copier/scanner, a shredder, a microfilm reader, a DVD reader, and a multi-drive. They operate in cooperation with the information management server device 100.

Such a selective duplicating system gives a unique management ID (Identification) to identify the information medium individually and relates conditions concerning the creation and disposal of information mediums, correlation between information mediums (in system or medium type), and medium use to the information original on the basis of the management ID to manage information mediums in an integrated fashion on a system basis.

When an information medium is electronic data, the selective duplicating system converts the electronic data into an electronic file in a file format including a management ID. The converted electronic file is called a management file.

A management file includes not only an electronic data body of information to be managed but also header information including a management ID and attribute information, access control policy, and authentication information on the management file. As shown in an example of the configuration of FIG. 4, the management file includes a header part, an access control policy part, a body part, and a data authentication part.

The header part is configured to include a management ID of the electronic data, a management ID of a parent information medium, generation number, medium type, file information, file storage information, and information management server information. The configuration of the header part is not limited to this.

As the management ID of a parent information medium, for example, a management ID of original electronic data when electronic data is copied, a management ID of the original electronic data when the electronic data is printed and a paper medium is output, and a management ID given to a paper medium when the paper medium is converted by a scanner into electronic data are used.

A generation number is a generation numeric value that shows what generation the management file falls on in a system relation where management files are managed in the order of parent, child, and grandchild, with a management file entered in the management system for the first time as a starting point. For example, if the generation number of a parent management file is 1, the generation number of a child information medium, a duplication of the parent management file, is 2, and the generation number of a grandchild information medium, a duplication of the child information medium, is 3. The representational form of the generation number is not limited to this.

The file information includes the file format of the electronic data, file size, information on the creator of the electronic data, information on the date and time of creation, and information on the creation place.

The file storage information includes information that indicates whether the electronic data body stored in the body part has been encrypted. If the electronic data body has been encrypted, the file storage information further includes information on its cryptographic algorithm, a cryptographic key, and a cryptographic module.

The information management server information is information for validating the MAC address, IP address, and URI of an information management server, and an authentication data part. Information for validating the authentication data part may be cryptographic key information or use the mode of storing a cryptographic key certificate of the key.

Stored in the access control policy part is access control policy information on use restrictions that writes the processing of the electronic file to be permitted or inhibited under use conditions for the electronic data, including the availability period of the electronic file, information on the disclosure of available places, organizations, and the like, network environments, users and available device information, and the number of times of use.

In the body part, the electronic data itself or encrypted data obtained by subjecting the electronic data to cryptographic processing is stored.

Stored in the data authentication part is authentication data information obtained by subjecting the header part, access control policy part, and body part to cryptographic processing at the information management server device. As data authentication information, not only electronic signatures based on a public-key cryptosystem, such as DSA (Digital Signature Algorithm), RSA (Rivest-Shamir-Adleman Scheme), or ECDSA (Elliptic Curve DSA) but also MAC (Message Authentication Code) based on a hash function or symmetric-key cryptosystem can be used.

What has been described above is an explanation of the terms, general descriptions, and the like on which the system in this specification is based. The name "selective duplicating system" indicating the system may be referred to as, for example, "replication management system," "information life cycle management system," or "information asset management system" as needed. In addition, the terms "information," "document," and "material" can be used interchangeably.

Hereinafter, embodiments of such a selective duplicating system will be explained in sequence. Before that, an expanded or generalized one of each embodiment will be described.

<Expanded or Generalized One of a First Embodiment>
[Copying (Paper→Paper)]

Figure 5:
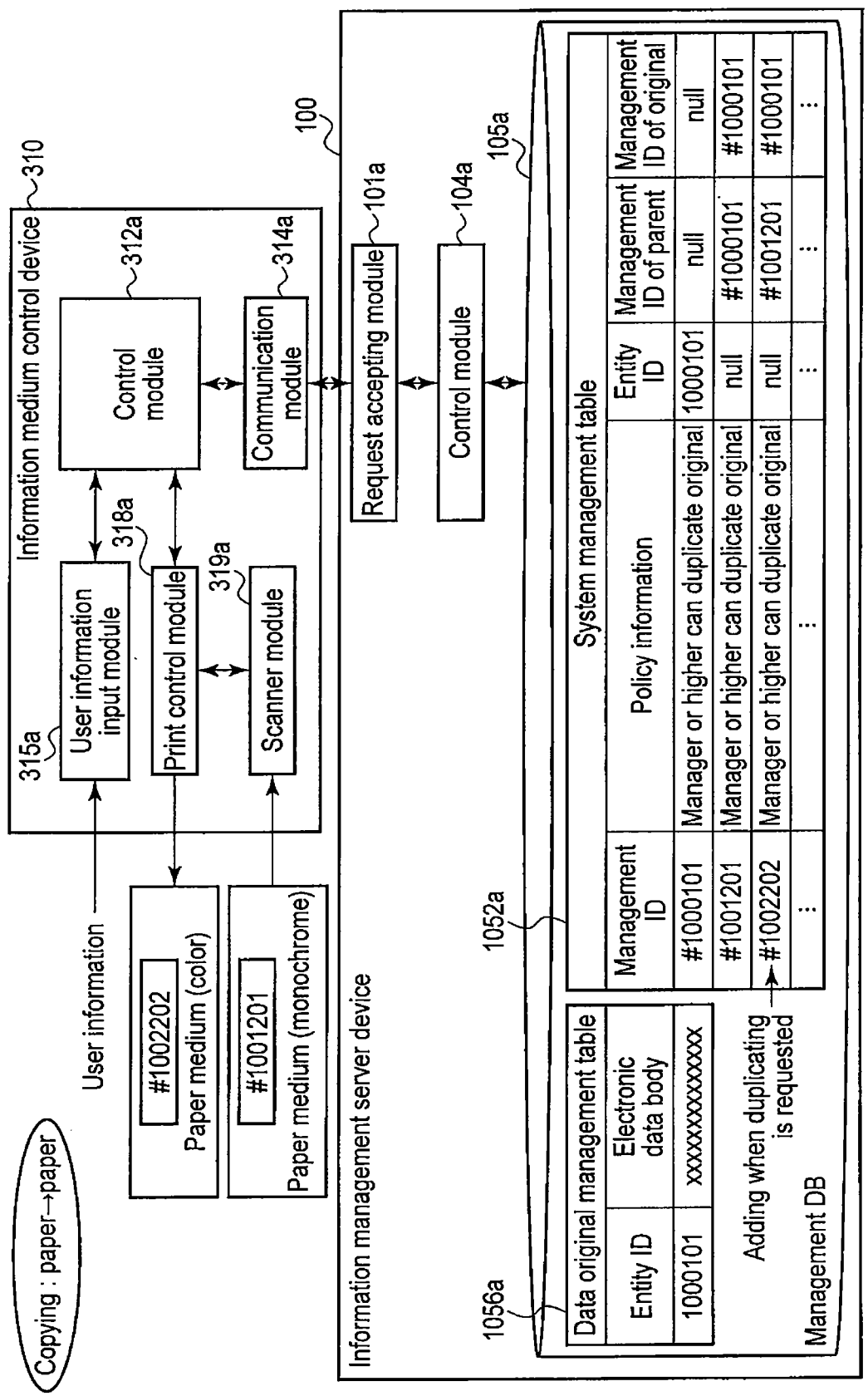
FIG. 5 is a schematic diagram showing the configuration of a selective duplicating system according to an expanded or generalized one of a first embodiment.

FIG. 5 is a schematic diagram showing the configuration of a selective duplicating system according to an expanded or generalized one of a first embodiment. The selective duplicating system comprises an information management server device 100 and an information medium control device (a paper medium duplicating device) 310 which are capable of communicating with each other.

Here, the information management server device 100 includes a management DB 105a, a control module 104a, and a request accepting module 101a.

The management DB 105a stores a data original management table 1056a and a system management table 1052a. The tables 1056a, 1052a may be integrated into one table, provided that correlation between data items is the same (it is all right if a null value is set as data in an inapplicable item as needed when they are integrated into one table). Alternatively, they may be separated into different tables (e.g., the data original management table 1056 and a part (a first row) of the system management table 1052a may be integrated into a table and another part (a second and later rows) of the system management table 1052a may be integrated into another table). Similarly, as for all the other tables, they may be integrated into one table or separated into different ones, provided that correlation between data items is the same.

The data original management table 1056a and a part (a first row) of the system management table 1052a are for, regarding original data, correlating a management ID, an entity ID, and electronic data body with one another storing the resulting data.

Another part (a second and later rows) of the system management table 1052a is for, regarding paper mediums duplicated sequentially from the original data, correlating policy information to indicate whether a user is permitted to duplicate each of the paper mediums, original data, and the individual items of the original data and a management ID of the original data with one another on a management ID basis and storing the resulting data. Here, whether a user is permitted to duplicate means whether at least a duplication client is permitted to duplicate. Depending on a request, whether a user is permitted to duplicate may mean whether a duplication client permits duplicating at a duplication distribution address. Similarly, this holds true for policy information in each embodiment below.

The control module 104a has the following functions (f104a-1) to (f104a-3):

the function (f104a-1) of reading policy information related to a management ID in a duplication request when having received the duplication request including the management ID indicating a paper medium to be duplicated, duplication source selection information that has selected the paper medium or original data as a duplication source, and user information from the request accepting module 101a, the function (f104a-2) of collating the read policy information with user information in the duplication request and determining whether to permit the duplicating of the paper medium or original data selected in the duplication source selection information, and the function (f104a-3) of reading the management ID of the original data related to the management ID in the duplication request and the electronic data body related to the entity ID with reference to the management DB 105a when the determination result for the original data has shown that the duplicating is permitted and creating duplicated original data by giving a new management ID to duplicated data obtained by duplicating the electronic data body.

The request accepting module 101a has the function of sending a duplication request received from the information medium control device 310 to the control module 104a, the function of transmitting duplicated original data created by the control module 104a to the information medium control device 301, and the function of transmitting a new management ID to the information medium control device 310 when the determination for a paper medium has shown that duplicating is permitted.

The information medium control device 310 includes a user information input device 315a, a scanner module 319a, a print control module 318a, a control module 312a, and a communication module 314a.

The user information input device 315a has the function of inputting user information stored in a mobile device, such as an IC card (not shown), to the control module 312a. User information includes at least duplication requester information and may further include copy distribution address information as requested. This holds true for user information in each embodiment below.

The scanner module 319a has the function of sending image data read from a paper medium to be duplicated to the print control module 318a.

The print control module 318a has the function of sending a management ID extracted from the image data received from the scanner module 319a to the control module 312a, the function of creating duplicated paper medium data by giving a new management ID received from the control module 312a to the image data, and the function of printing and outputting duplicated original data received from the control module 312a or the created duplicated paper medium data.

The control module 312a has the function of causing the communication module 314a to transmit to the information management server device 100 a duplication request that includes user information input from the user information input device 315a, the management ID received from the print control module 318a, and duplication source selection information that has selected the paper medium or original data as a duplication source from a selection module (not shown), and the function of sending to the print control module 318a the new management ID or duplicated original data received by the communication module 314a from the information management server device 100.

With the above configuration, it is possible to determine whether to permit the duplicating of original data, on the basis of policy information to indicate whether a user is permitted to duplicate, and if the duplicating is permitted, read an electronic data body of the original data via the management ID of the original data from the management ID in the duplication request to prevent not only the inconvenience of degrading a duplicated image due to reading based on the management ID of the original data but also the inconvenience of permitting the original data to include an important part according to a policy on whether to permit duplicating, thereby enabling a duplication of the same quality as that of the original data to be obtained from a certain duplication.

For example, even when a paper medium with management ID "#1001201" has been read, if original data is selected on the basis of duplication source selection information and user information satisfies policy information, duplicated data can be obtained by duplicating an electronic data body related to the entity ID of the original data with management ID "#1001201" with reference to the management DB 105a and duplicated original data with a new management ID "1002202" can be printed and output on the basis of the duplicated data.

In addition, when the original data has not been duplicated as the duplication source and a paper medium to be duplicated has been selected as requested, use of image data on the paper medium enables duplicated paper medium data to be printed and output, while preventing not only the inconvenience of making a search when a duplicated image has deteriorated but also the inconvenience of permitting the paper medium to include an important part according to a policy on whether to permit duplicating. That is, the selective duplicating system in this specification is capable of selectively outputting duplicated data of original data or duplicated data from a duplication according to the selection of a duplication source, thereby enabling a duplication of a desired quality to be obtained.

<Expanded or Generalized One of a Second Embodiment>
[Printing (Electronic Data→Paper)]

Figure 6:
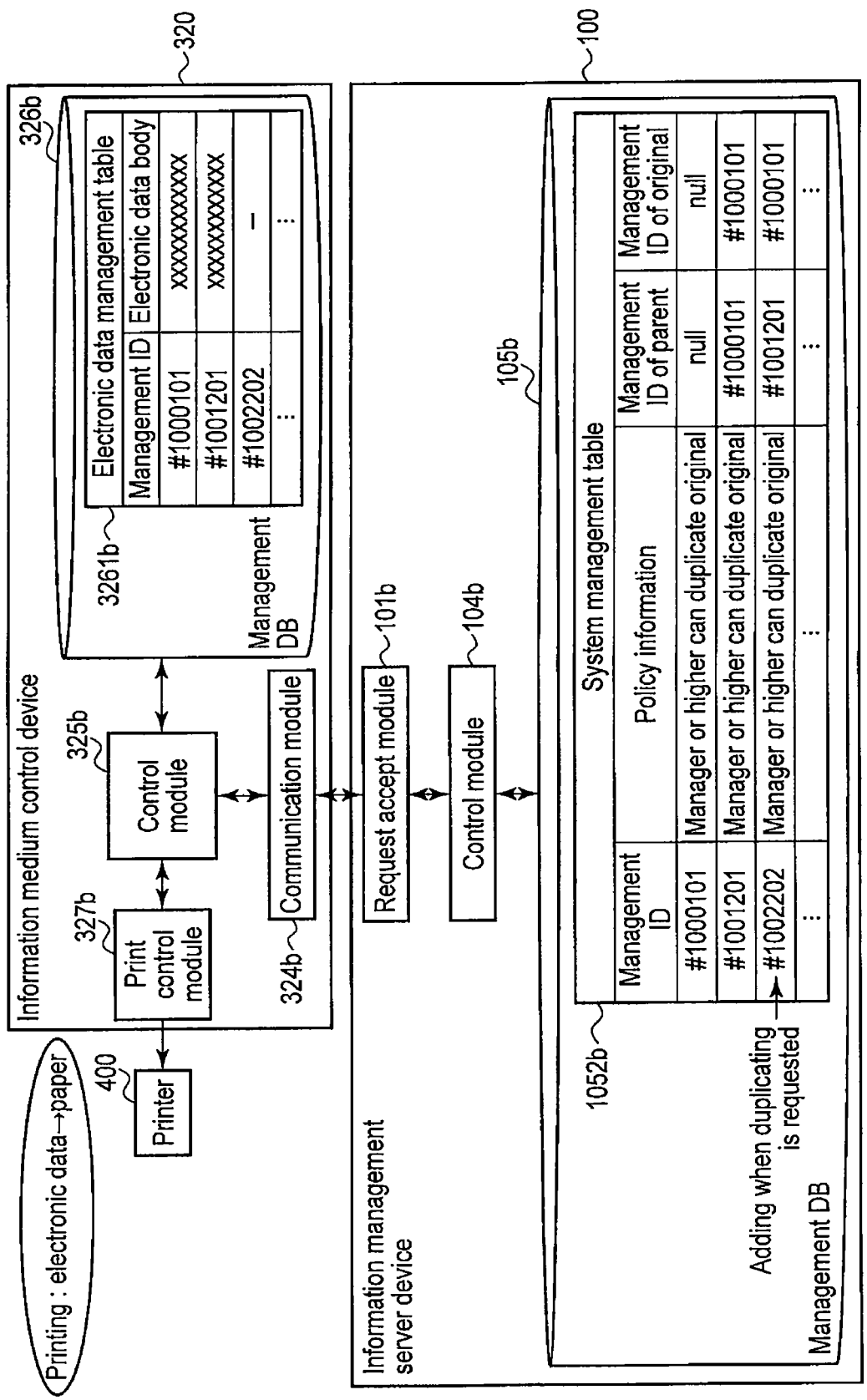
FIG. 6 is a schematic diagram showing the configuration of a selective duplicating system according to an expanded or generalized one of a second embodiment.

FIG. 6 is a schematic diagram showing the configuration of a selective duplicating system according to an expanded or generalized one of a second embodiment. The selective duplicating system comprises an information medium control device (a print control device) 320 and an information management server device 100 which are capable of communicating with each other.

The information medium control device 320 includes a management DB 326b, a control module 325b, a communication module 324b, and a print control module 327b.

The management DB 326b is for, regarding each of original data and electronic data bodies duplicated sequentially from the original data, correlating a management ID and an electronic data body with one another and storing them. Here, storing the electronic data body includes storing a management file entity including the electronic data body. That is, storing an electronic data body is the expansion or generalization of storing a management file entity including an electronic data body. The same holds true for other generalized embodiments. Similarly, that the management DB stores ○○ data includes that the management DB stores a management table including ○○ data. That is, that the management DB stores ○○ data is the expansion or generalization of storing a management table including ○○ data. The same holds true for other generalized embodiments.

The control module 325b has the function of causing the communication module 324b to send the information management server 100 a duplication request that includes a management ID indicating an electronic data body to be duplicated, duplication source selection information that indicates selection of the electronic data body or original data as a duplication source, and user information, and the function of sending to the print control module 327b a new management ID received by the communication module 324b from the information management server device 100 and an electronic data body in the management DB related to the management ID in the duplication request.

The print control module 327b has the function of creating duplicated data by giving the new management ID to the electronic data body when receiving the new management ID and electronic data body from the control module 325b and the function of outputting the created duplicated data to a printer 400.

The information management server device 100 includes a management DB 105b, a control module 104b, and a request accepting module 101b.

The management DB 105b stores a system management table 1052b that, regarding each of original data and electronic data bodies duplicated sequentially from the original data, correlates policy information to indicate whether a user is permitted to duplicate each of the electronic data body, original data, and the individual items of the original data, and a management ID of the original data with one another on a management ID basis and stores the resulting data.

The control module 104b has the following functions (104b-1) to (104b-3):

the function (104b-1) of reading policy information related to a management ID in a duplication request from the management DB when having received the duplication request from the information medium control device 320 via the request accepting module 101b, the function (104b-2) of collating the read policy information with user information in the duplication request and determining whether to permit the duplicating of the electronic data body or original data selected in the duplication source selection information, and the function (104b-3) of causing the request accepting module 101b to transmit a new management ID to the information medium control device 320 when the determination result has shown that the duplicating is permitted.

The request accepting module 101b has the function of sending a duplication request received from the information medium control device 320 to the control module 105b and the function of transmitting a new management ID received from the control module 105b to the information medium control device 320.

With the above configuration, even when a duplication of an electronic data body with management ID "#1001201" has been requested, if original data is selected on the basis of duplication source selection information and user information satisfies policy information, duplicated data can be obtained by giving a new management ID to an electronic data body related to management ID "#1001201" with reference to the management DB and duplicated original data with a new management ID "1002202" can be printed and output on the basis of the duplicated data as described in the operational advantage of the expanded or generalized one of the first embodiment.

<Expanded or Generalized One of a Third Embodiment>
[Scanner (Paper→Electronic Data)]

Figure 7:
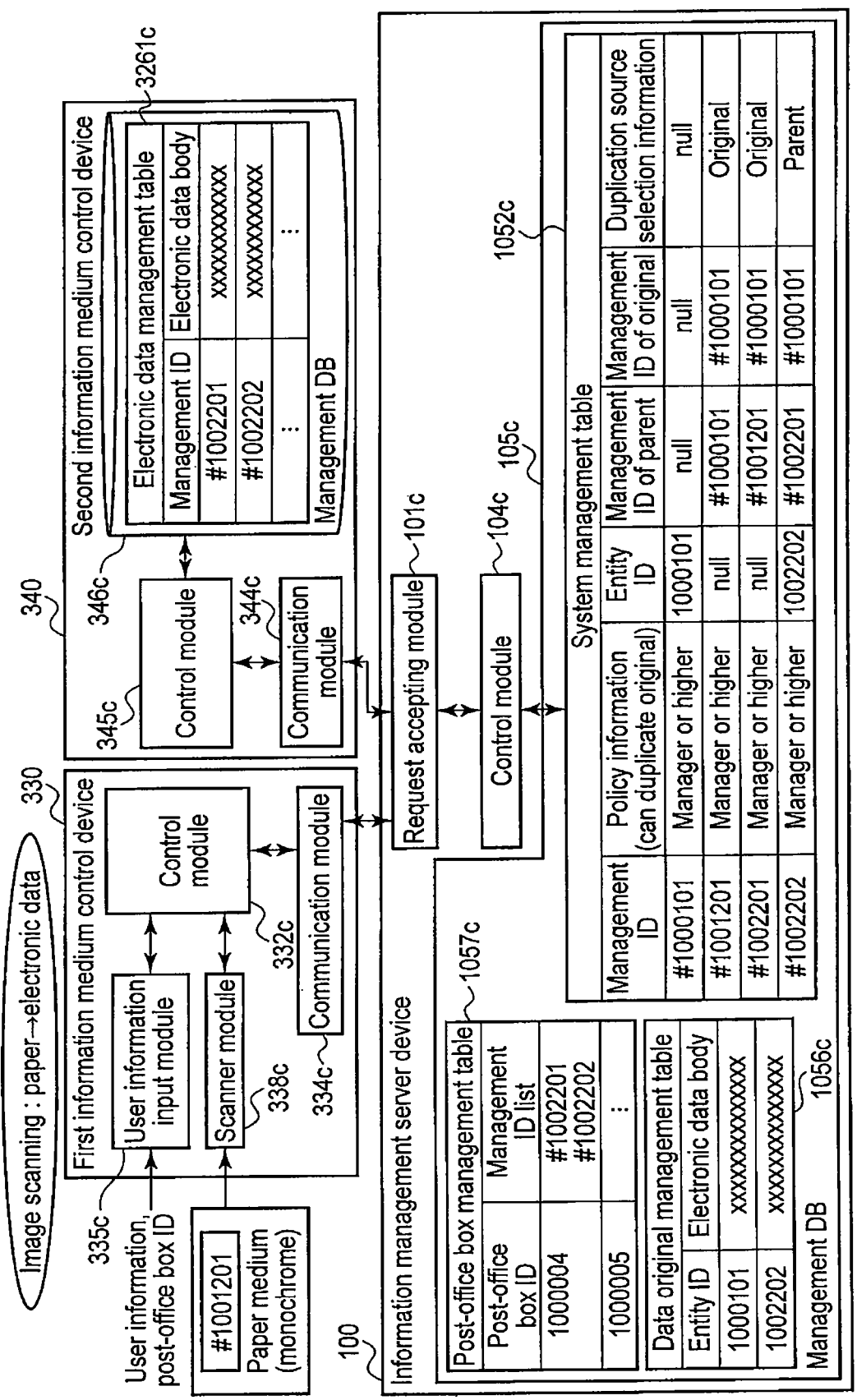
FIG. 7 is a schematic diagram showing the configuration of a selective duplicating system according to an expanded or generalized one of a third embodiment.

FIG. 7 is a schematic diagram showing the configuration of a selective duplicating system according to an expanded or generalized one of a third embodiment. The selective duplicating system comprises a first information medium control device (a scanner device) 330, a second information medium control device 340, and an information management server device 100 which are capable of communicating with one another.

The first information medium control device 330 includes a user information input module 335c, a scanner module 338c, a control module 332c, and a communication module 334c.

The user information input module 335c has the function of reading user information stored in a mobile device, such as an IC card (not shown), and inputting the user information to the control module 332c.

The scanner module 338c has the function of sending image data read from a paper medium to be duplicated to the control module 332c.

The control module 332c has the function of extracting a management ID from the image data received from the scanner module 338c and the function of causing the communication module 334c to transmit to the information management server device 100 a duplication request that includes the extracted management ID, user information input from the user information input module 335c, duplication source selection information that indicates selection of the paper medium or original data as a duplication source from a selection module (not shown), and a post-office box ID input from an input module (not shown).

The information management server device 100 includes a management DB 105c, a control module 104c, and a request accepting module 101c.

The management DB 105c stores a system management table 1052c, a data original management table 1056c, and a post-office box management table 1057c.

A part (a first row) of the data original management table 1056c and a part (a first row) of the system management table 1052c are for, regarding original data, correlating a management ID, an entity ID, and an electronic data body with one another and storing the resulting data.

Another part (a second and later rows) of the system management table 1052c is for, regarding electronic data bodies duplicated sequentially from the original data, correlating policy information indicating whether a user is permitted to duplicate each of the electronic data body, original data, and the individual items of the original data, a management ID of the original data, and duplication source selection information with one another on a management ID basis and storing the resulting data.

Another part (a second row) of the data original management table 1056c and still another part (a fourth row) of the system management table 1056c are for, regarding electronic data bodies duplicated sequentially from the original data, correlating the electronic data body and entity ID with a management ID in the system management table 1056c and storing the resulting data.

The post-office box management table 1057c is for correlating a post-office box ID corresponding to the second information medium control devices 340 with a management ID indicating a duplicated electronic data body and storing the resulting data.

The control module 104c has the following functions (f104-1) to (f104-6):

the function (f104-1) of reading policy information related to a management ID in a duplication request from the system management table 1052c when having received, from the first information medium control devices via the request accepting module, the duplication request that includes image data read from a paper medium to be duplicated, a management ID indicating the paper medium read from the image data, duplication source selection information that indicates selection of the paper medium or original data as a duplication source, user information, and a post-office box ID, the function (f104-2) of collating the read policy information with user information in the duplication request and determining whether to permit the duplicating of the paper medium or original data selected in the duplication source selection information, and the function (f104-3) of updating the system management table 1052c so that the system management table may, regarding a new management ID, correlate policy information to indicate whether a user is permitted to duplicate the electronic data bodies duplicated from the original data, a management ID of the original data, and duplication source selection information with one another and store the resulting data when the determination result for the original data has shown that the duplicating is permitted, the function (f104-4) of not only updating the system management table 1052c so that the system management table may, regarding a new management ID, correlate policy information indicate whether a user is permitted to duplicate image data as the electronic data bodies duplicated from the paper medium, a management ID of the original data, and duplication source selection information with one another and store the resulting data but also updating the data original management table 1056c and system management table 1052c so that the table 1056c may, regarding a new management ID in the table 1052c, correlate the image data and entity ID with one another and store the resulting data when the determination result for the paper medium has shown that the duplicating is permitted, the function (f104-5) of correlating the new management ID with a post-office box ID in the duplication request and writing the resulting data in the post-office box management table 1057c when the determination result for the original data or paper medium has shown that the duplicating is permitted, and the function (f104-6) of causing the request accepting module 101c to transmit, to the second information medium control devices 340 based on a post-office box ID, a management ID in the post-office box management table 340, the electronic data body related to duplication source selection information corresponding to the management ID, and an entity ID when having received a post-office box confirmation request including the post-office box ID from the second information medium control devices 340.

The request accepting module 101c has the function of sending a duplication request received from the first information medium control device 330 to the control module 104c, the function of transmitting a post-office box confirmation request received from the second information medium control device 340 to the control module 104c, and the function of transmitting the management ID and electronic data body received from the control module 104c to the second information medium control device 340.

The second information medium control device 340 includes a management DB 346c, a control module 345c, and a communication module 344c.

The management DB 346c is for, regarding electronic data bodies sequentially duplicated from the original data, correlating management IDs with the electronic data bodies.

The control module 345c has the function of causing the communication module 344c to transmit a post-office box confirmation request including a post-office box ID to the information management server device 100 and the function of writing in the management DB 346c the management ID and electronic data body received from the information management server device 100 via the communication module 344c in response to a post-office box confirmation request.

With the above configuration, even when a paper medium with management ID "#1001201" has been read, if original data is selected on the basis of duplication source selection information and user information satisfies policy information, duplicated data can be obtained by duplicating an electronic data body related to the entity ID of the original data with management ID "#1001201" with reference to the management DB and duplicated original data with a new management ID "1002201" can be delivered to the second information medium control device on the basis of the duplicated data as described in the operational advantage of the expanded or generalized one of the first embodiment.

Even when a paper medium with management ID "#1002201" has been read, if the paper medium is selected on the basis of duplication source selection information and user information satisfies policy information, duplicated data with a new management ID "1002202" can be delivered to the second information medium control device on the basis of the image data in the duplication request.

<Expanded or Generalized One of a Fourth Embodiment>
[a Duplication Source can be Selected from Arbitrary Duplications]

Figure 8:
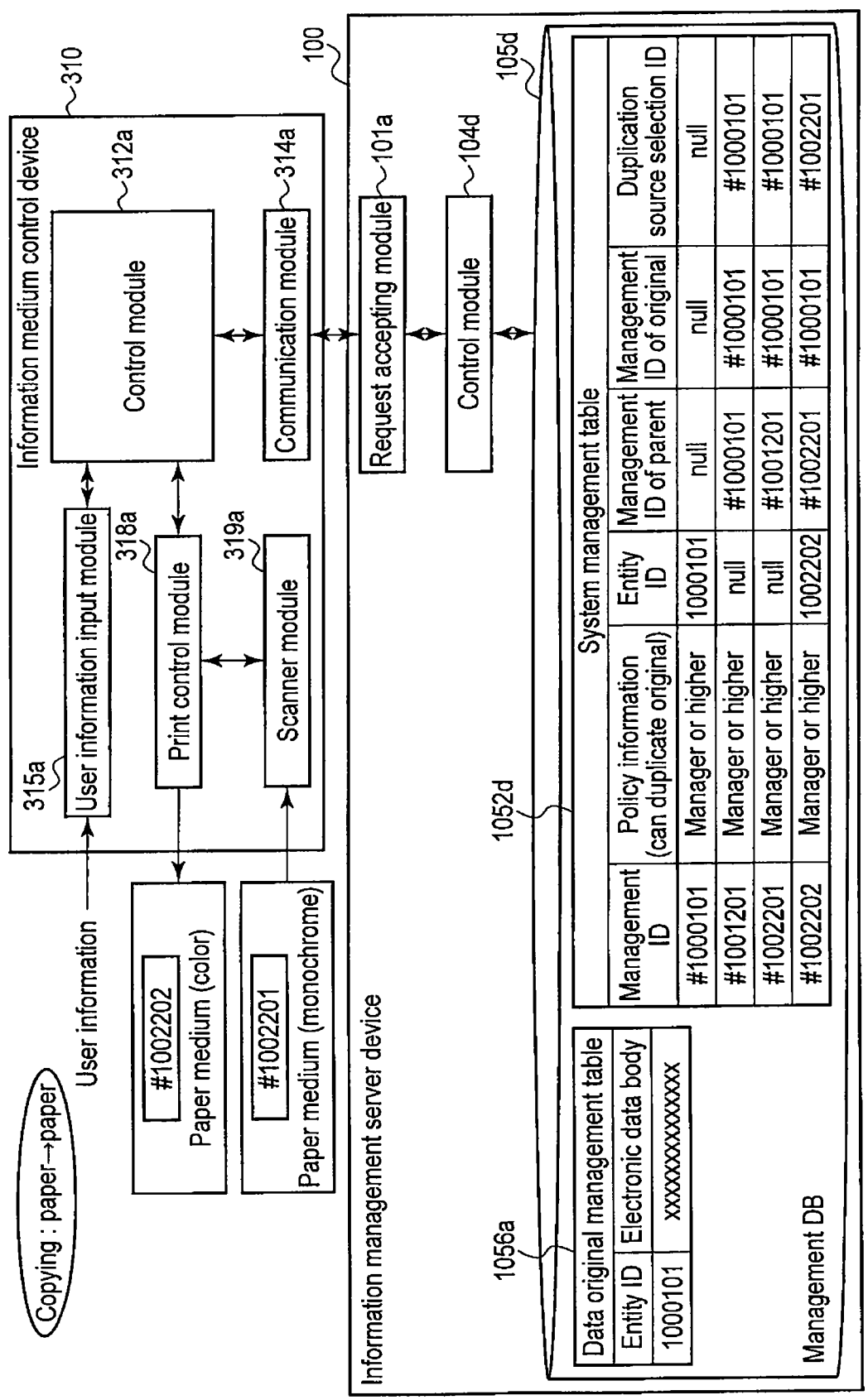
FIG. 8 is a schematic diagram showing the configuration of a selective duplicating system according to an expanded or generalized one of a fourth embodiment.
Figure 9:
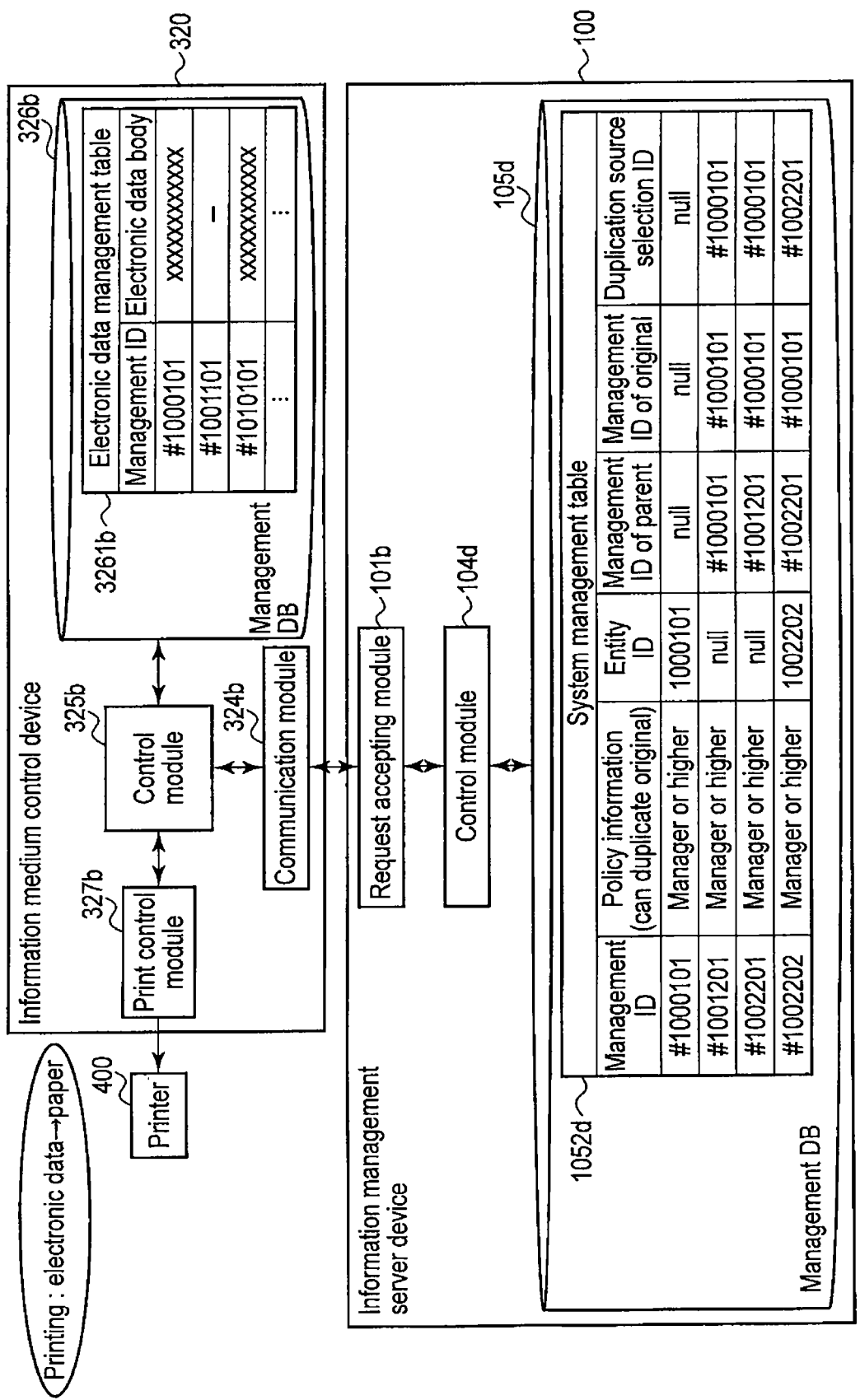
FIG. 9 is a schematic diagram showing the configuration of a selective duplicating system according to an expanded or generalized one of the fourth embodiment.
Figure 10:
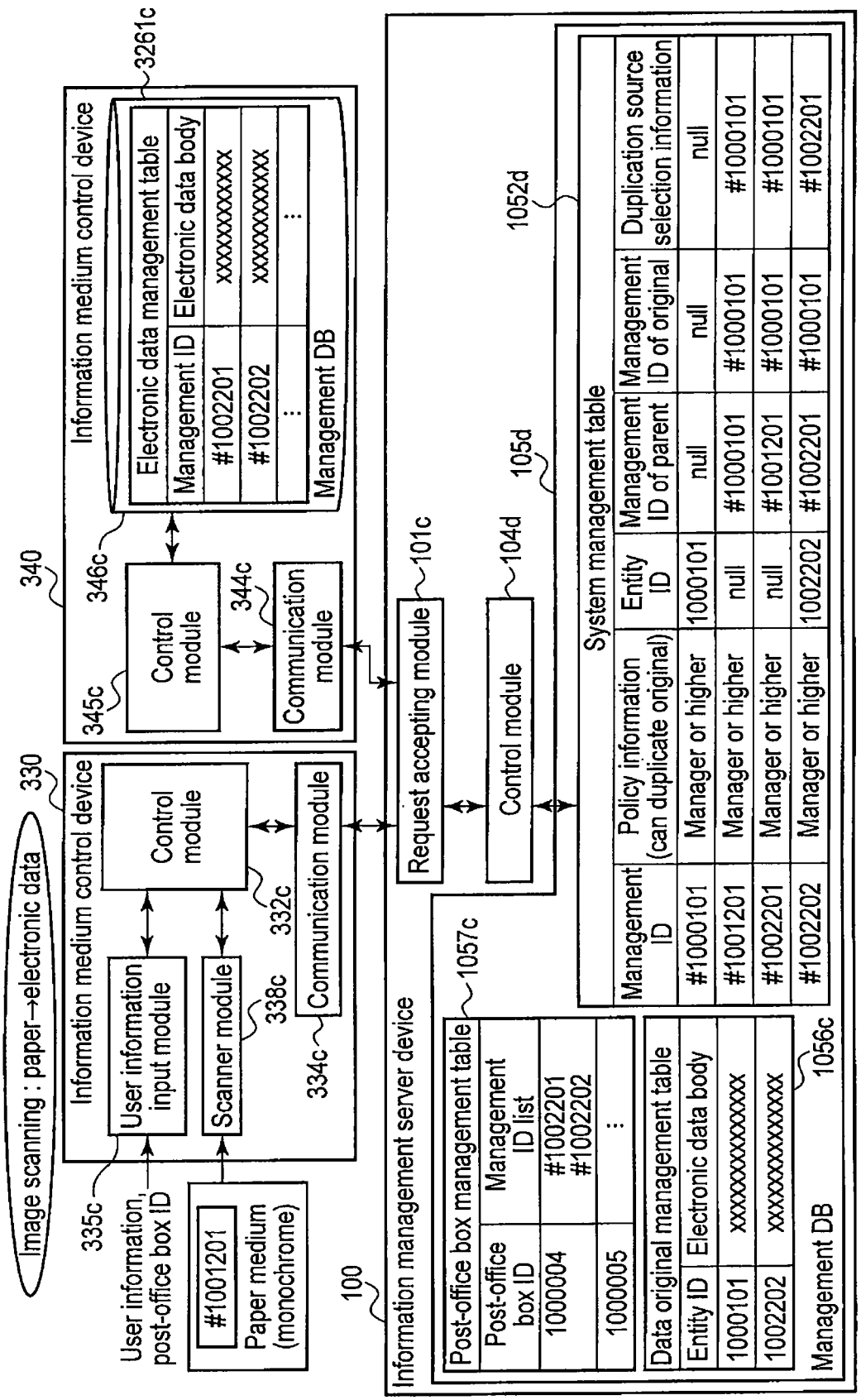
FIG. 10 is a schematic diagram showing the configuration of a selective duplicating system according to an expanded or generalized one of the fourth embodiment.

FIGS. 8 to 10 are schematic diagrams showing the configurations of selective duplicating systems according to expanded or generalized ones of a fourth embodiment. FIG. 8 corresponds to a modification of an expanded or generalized one of the first embodiment. FIG. 9 corresponds to a modification of an expanded or generalized one of the second embodiment. FIG. 10 corresponds to a modification of an expanded or generalized one of the third embodiment.

That is, expanded or generalized ones of the fourth embodiment are modifications of expanded or generalized ones of the first to third embodiments. They are not limited to a case where either original data or an owned copy is selected as a duplication source and correspond to a case where a desired copy between original data and an owned copy is specified and selected as a duplication source.

Specifically, the expanded or generalized ones of the fourth embodiment use a duplication source selection ID obtained by selectively specifying a management ID of the original data or any one of the electronic data bodies as a duplication source concerning the original data and each of electronic data bodies sequentially duplicated from the original data in place of duplication source selection information in the expanded or generalized ones of the first to third embodiments.

The control modules 104a to 104c in the information management server device 100 further have the function of correlating duplication source selection IDs in a duplication request with management IDs in the system management tables 1052a to 1052c and writing the resulting data in the system management tables 1052a to 1052c and the function of sending back duplication system information including the management IDs in the system management tables 1052a to 1052c and the duplication source selection IDs to a sender of the system information request. In FIGS. 8 to 10, the control modules 104a to 104c are represented as a control module 104d and the management DBs 105a to 105c are represented as a management DB 105d.

With the above configuration, since a system information request can be transmitted to the information management server device 100 before the transmission of a duplication request and a duplication request including a duplication source selection ID indicating a management ID of a desired duplication source can soon be transmitted to the information management server device 100 on the basis of duplication system information received from the information management server device 100, an electronic data body of a desired duplication source can be duplicated in addition to the operational advantages of the expanded or generalized ones of the first to third embodiments.

The above have explained the expanded or generalized ones of the first to fourth embodiments. Next, a first to a fourth embodiment detailed by adding arbitrary additional items to the expanded or generalized ones of the first to fourth embodiment will be explained in sequence.

<First Embodiment> [Copying (Paper→Paper)]

FIG. 11 is a schematic diagram showing the configuration of a selective duplicating system according to each embodiment. In the configuration shown in FIG. 1, an information management server device 100 and an arbitrary information medium control device 300 are shown. In the first embodiment, of the information medium control devices 300, a device with an operation panel which has the function of copying a paper document from a paper document, such as a Multi-Function Peripheral or a copier, is regarded as an information medium control device 310.

The information management server device 100 includes a management request accepting module 101, an information management control module 102, a policy evaluation module 103, an information management DB control module 104, and an information management DB 105.

When sending received information without modification, each module may be integrated into one unit or omitted as needed. For example, when sending received information without modification, the management request accepting module 101 and information management control module 102 may be integrated into one unit or omitted. Similarly, in other devices and each of the embodiments described below, each module may be integrated into one unit or omitted when sending received information without modification.

The management request accepting module 101, information management control module 102, policy evaluation module 103, and information management DB control module 104 are functional blocks realized by, for example, a CPU (not shown) executing a program including each step in the information management server device 100 described later.

The program including each step in the information management server device 100 has only to realize each of the following functions (a1) to (a6). In this case, what are obtained by adding arbitrary additional items, such as various pieces of information or the function of each step, to the functions (a1) to (a6) as requested are used. Since the following functions (a1) to (a6) are representative examples, arbitrary additional items are included a little. For example, a second determination function (a4) and address information related to the function (a4) can be omitted by lowering the level of regimentation of document management based on policy. In addition, a child management ID tag indicating a child management ID can be omitted by using the child management ID as it is.

The function (a1) of writing in the information management DB 105 a system management table 1052 in which a child management ID and status information related to a management ID, and an access control policy based on duplication requester information and distribution address information are written on a management file management ID basis.

The function (a2) of writing a permission policy based on address information of the information medium control device 300 in a master policy table 1054 of the information management DB 105.

A first determination function (a3) of determining whether duplication requester information and distribution address information in traceable duplication request information received from the information medium control device 300 satisfy an access control policy in the system management table 1052 corresponding to a management ID in the traceable duplication request information.

A second determination function (a4) of determining whether address information in the received traceable duplication request information satisfies a permission policy.

The function (a5) of issuing a child management ID differing from the management ID in the received traceable duplication request information when the results of determination by the first and second determination modules have shown that the access control policy and permission policy are satisfied and of writing not only the child management ID in the system management table 1052 on the basis of the management ID in the traceable duplication request information but also the management ID of the original data selected as a duplication source material or a duplicated parent management ID.

The function (a6) of creating copy process information including a child management ID tag indicating an issued child management ID, the management ID in the traceable duplication request information, and distribution address information and transmitting processing result information including the copy process information to the information medium control device 300, a sender of the traceable duplication request information.

As shown in FIG. 3, when a plurality of information medium control devices 300 are caused to share the functions of the information management server device 100, for example, the information medium control devices 300 should be modified as follows. In place of the information management server device 100, not less than two but not more than six of the information medium control devices 300 are used. Means for realizing the functions (a1) to (a6) the information management server device 100 has are allocated to the not less than two but not more than six information medium control devices 300 in a distributed manner. When six information medium control devices 300 are used, any one of the functions (a1) to (a6) is allocated to each of the information medium control devices 300. When two information medium control devices 300 are used, one to five of the functions (a1) to (a6) are allocated to one information medium control device 300. The remaining one to five of the functions (a1) to (a6) are allocated to the other information medium control device 300. When three to six information medium control devices 300 are used, the functions (a1) to (a6) are similarly allocated to the information medium control devices 300 in a distributed manner.

The information management DB 105 can be realized as a storage device that can be read from/written into by a CPU (not shown). As shown in FIG. 12, the information management DB 105 stores a management ID table 1051, a system management table 1052, an access log management table 1053, a master policy table 1054, a client management table 1055, and a data original management table 1056.

As shown in FIG. 13, the management ID table 1051 correlates an issued management ID, issue date and time, and issue client information with one another. When a management ID has expired, the management ID table 1051 further correlates an expiry date and expired client information with the preceding items.

Figure 14A:
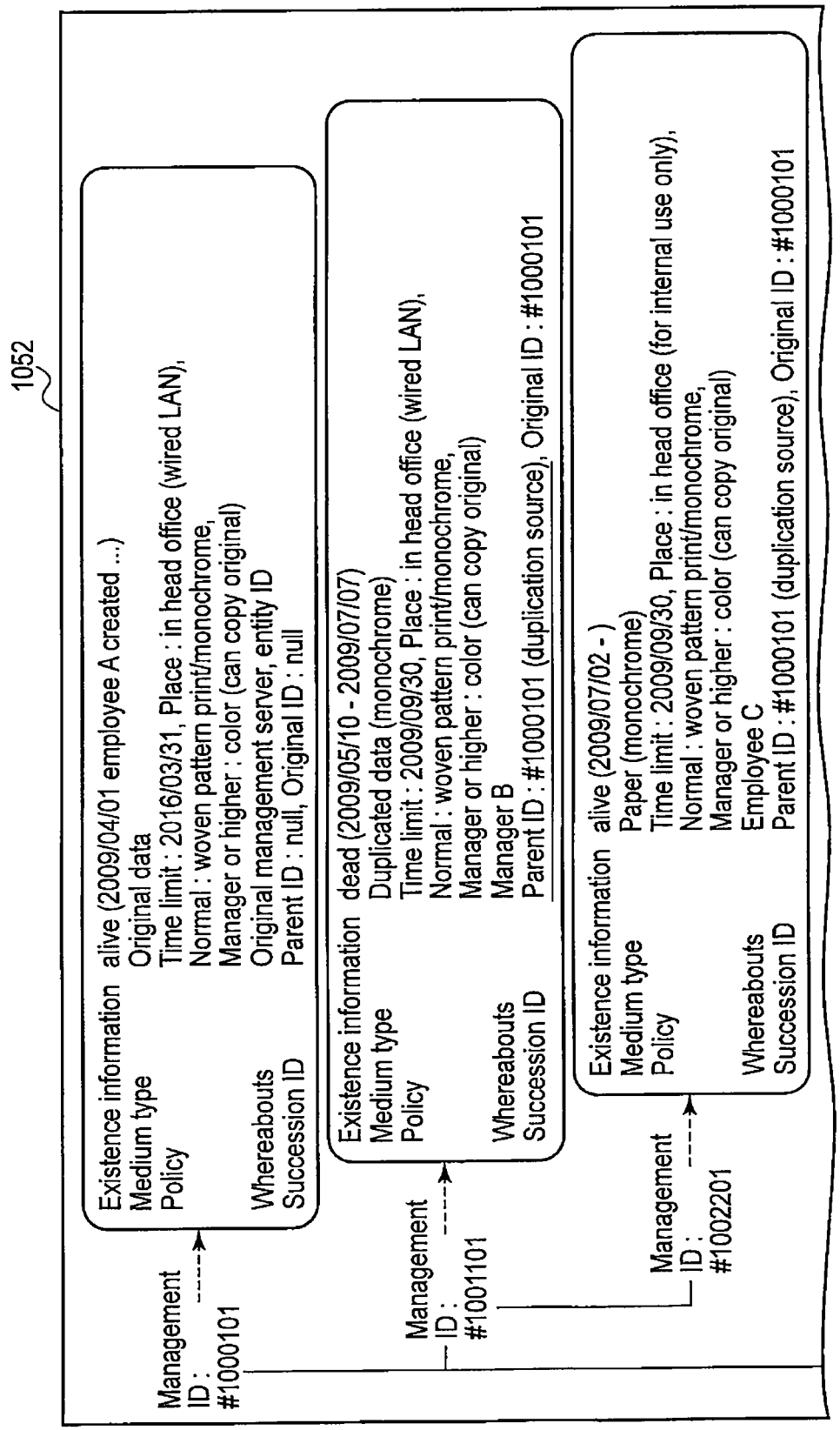
FIG. 14A is a schematic diagram showing the configuration of a system management table in the first embodiment.
Figure 14B:
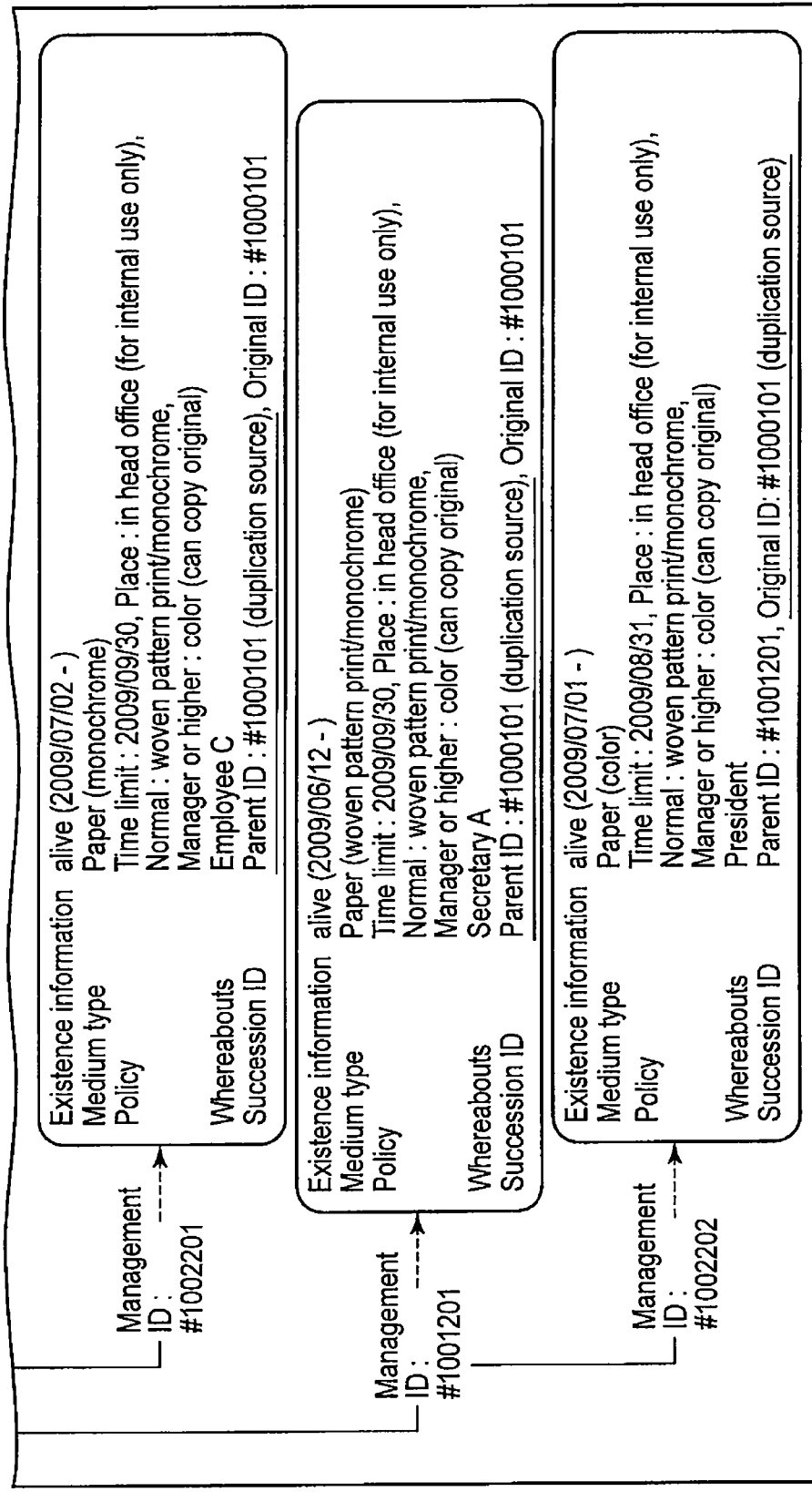
FIG. 14B is a schematic diagram showing the configuration of the system management table in the first embodiment.
Figure 22:
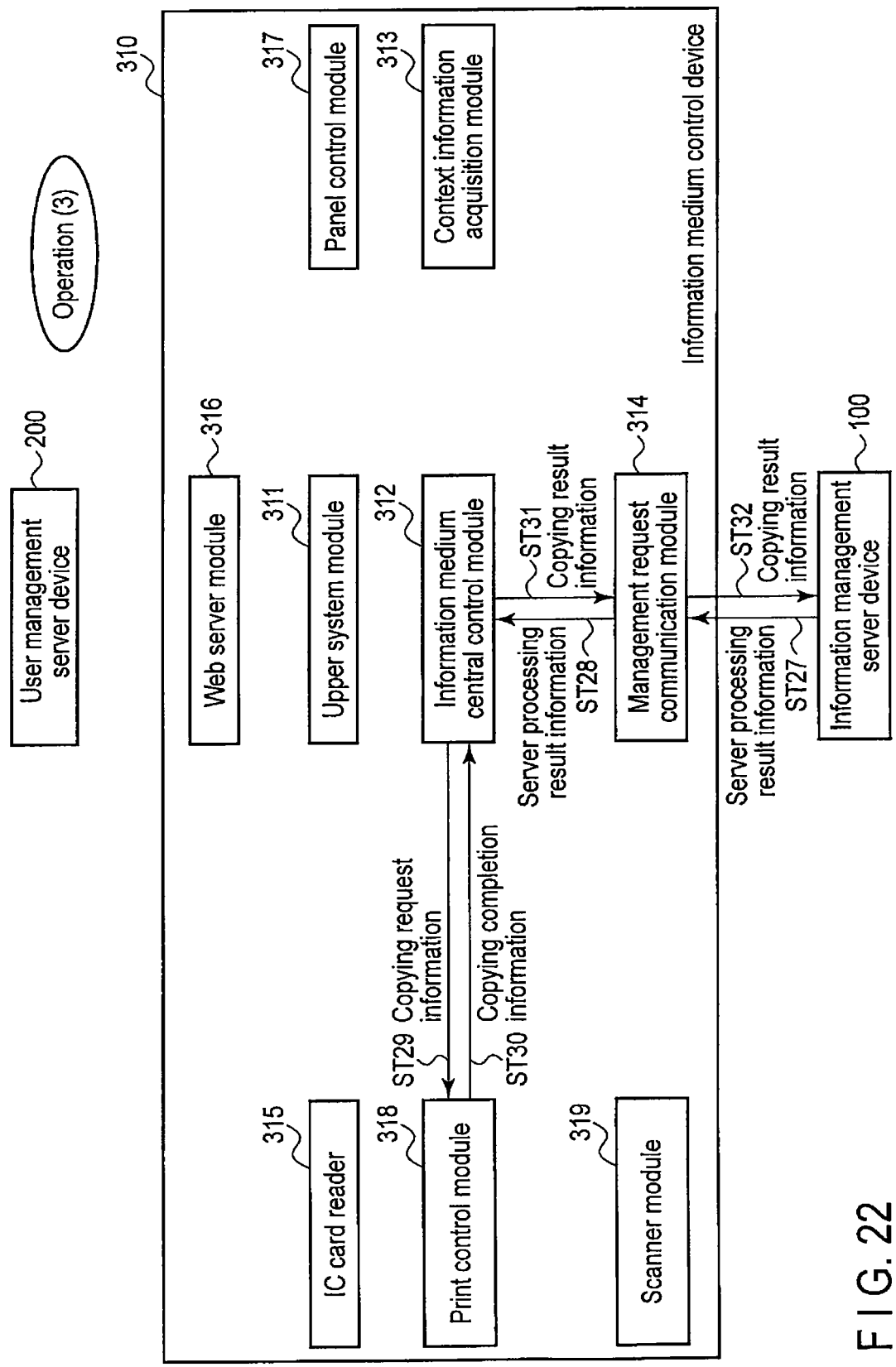
FIG. 22 is a schematic diagram to explain an operation of the first embodiment.
Figure 24:
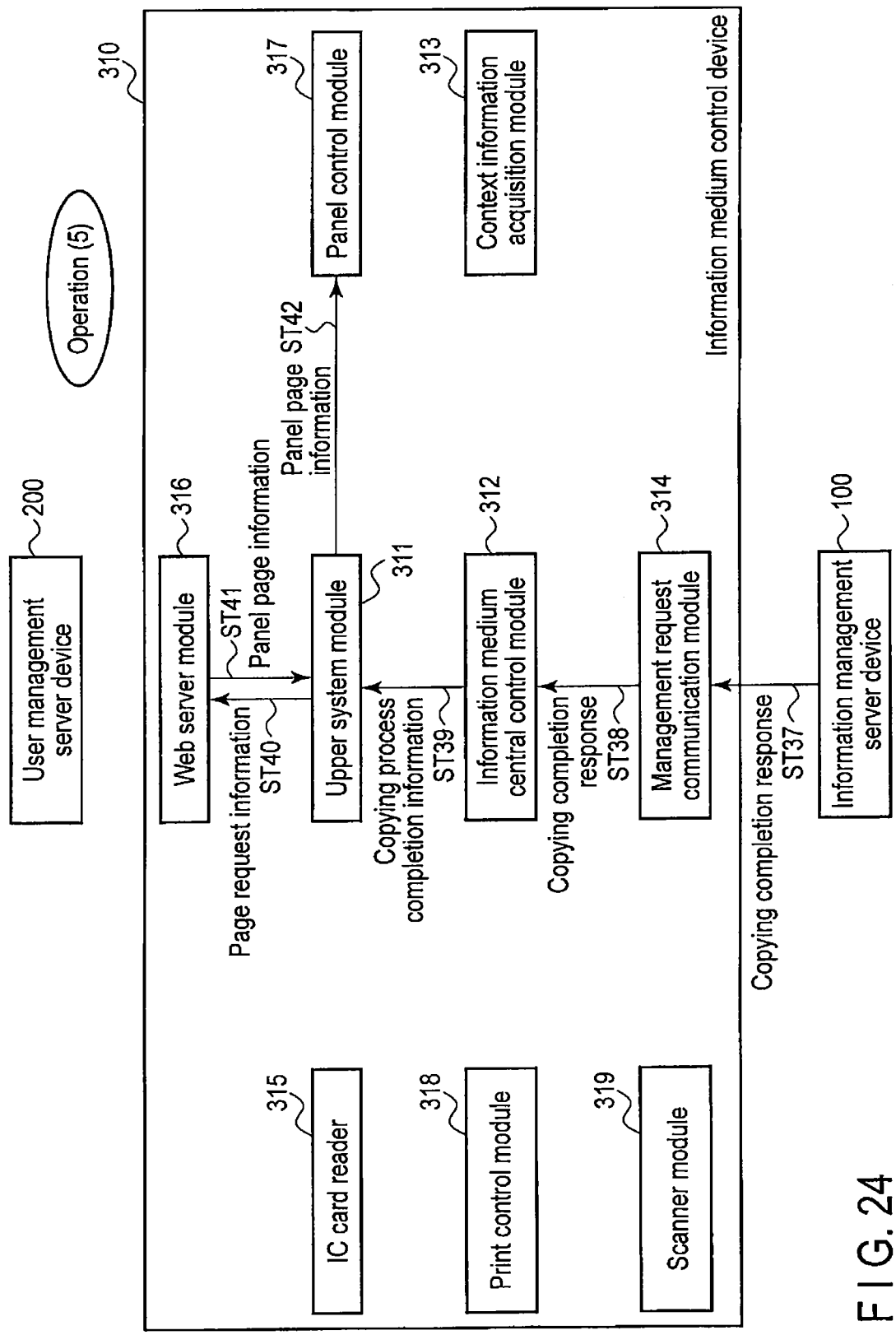
FIG. 24 is a schematic diagram to explain an operation of the first embodiment.

The system management table 1052 stores original data and duplicated system management information as shown in FIGS. 14A and 14B.

The system management table 1052 stores a management ID corresponding to the parent-child relationship of an electronic data body, existence information (alive, dead, date and time of creation and disappearance of an electronic data body), status information (the present situation (distributed, recovered) while being alive, the situation (disposal, break) while being dead), user information, medium type, access control policy (time limit, place (distribution address at which delivery is permitted), access (a duplication client who permits duplicating)), whereabouts information, and an entity ID as original data and duplicated system management information in such a manner that these items are correlated with one another. In the case of duplicating, the system management table 1052 correlates a newly issued management ID for duplicating, creation date and time information in a header part in a duplicated (child) management file, user information, medium type, access control policy, whereabouts information, an entity ID, and a management ID of the original data selected as a duplication source material or a duplicated parent management ID with an electronic data body of a duplication source (parent) or a management ID of the management file and stores the resulting data.

In the system of issuing management ID, a serial number may be used, provided that the uniqueness of the serial number in the system is guaranteed and duplicated parent-child relationships are managed in connection with management IDs. The configuration of a management ID may be caused to have a meaning so as to make the parent-child relationship of each management ID understood. For example, this is achieved by setting the value of a specific digit as a parent-child relationship value.

In examples shown in FIGS. 14A and 14B, the lower fourth digit (thousands place) represents a parent-child relationship value, with "0" indicating the top-level parent, "1" a child of the parent, and "2" a child of the child (=a grandchild of the parent). The lower third digit (hundreds place) represents a medium type, with "1" indicating electronic data, "2" a paper medium, and "3" a recording medium. The lower first to second digits (ones place to tens place) are identification numbers in the same generation and the same medium type. The lower fifth to eighth digits (# and the values of the three digits on the right of #) are an electronic data ID. In the case of a management file with the same electronic data ID, the file includes the same electronic data, regardless of the parent-child relationship. Since each of devices X, Y, Z, employee B, and others in whereabouts information corresponds to any one of the information medium control devices 310*x*, 310*y*, 310*z*, 310B, they may be read as the information medium control devices 310*x*, 310*y*, 310*z*, 310B. A management file is not created for the top-level parent indicated by a parent-child relationship value of "0." A management file is created for a parent indicated by a parent-child relationship value of not less than "1." The entity ID is information for identifying an electronic data body (data original). When electronic data is duplicated, the entity ID differs from the aforementioned management ID. The entity ID of a duplication source (parent) is the same as the entity ID of a duplication (child).

The access log management table 1053 includes a client ID, an operation type, a management ID, and a processing status for each date and time on and at which an operation was performed as shown in FIG. 15. The client ID is an ID indicting an employee who performed an operation. An operator ID may be read as an employee ID. The operation type indicates the type of an operation, such as a login status, a new entry, an electronic data duplication, viewing, or erasure. The management ID is a management ID indicating manipulated electronic data. The processing status is status information indicating the processing result, such as the success or failure (e.g., authentication error) of processing indicated by the operation type. The contents managed in the access log management table 1053 are not limited to the pieces of information shown in FIG. 15. In addition to them, place information (in the company/outside the company, GPS information) on the device which manipulated a target management file may be used.

The master policy table 1054 stores a policy type and reject/permit policy on a policy number basis in such a manner that they are correlated with each other as shown in FIG. 16. A policy number is policy identification information and therefore may be read as a policy ID. The policy type is information that indicates the type of an object to be controlled by the reject/permit policy. For example, location control, time control, and permission control can be used as needed. The reject/permit policy is information that indicates determination conditions and the contents of control when the determination conditions are fulfilled. The contents of control include an object to be permitted or rejected (e.g., a command or a request). They may sometimes include in-company wire-line connection or in-company wireless connection.

The client management table 1055 stores a client ID, an employee number, an authorization class, a terminal type, and a MAC address in such a manner that they are correlated with one another as shown in FIG. 17. The client management table 1055 may include information on an information medium control device acting as a target, including OS information and a device management number.

The data original management table 1056 stores an entity ID, a file name, a size, a hash value, an electronic data body, and external storage information in such a manner that they are correlated with one another as shown in FIG. 18. The entity ID is identification information on an electronic data body (data original). The file name is a file name of a management target data body (electronic data body) stored in a management file. The size is a file size of a management target data body stored in the management file. The hash value is a hash value of a management target data body stored in the management file. The electronic data body is a management target data body stored in a management file. The external storage information is information on storage destination information when a management target data body is stored outside the information management DB 105. When the management target data body is stored in the information management DB 105, external storage information is made null.

The user management server device 200 includes a user information request accepting module 201 and a user management DB 202. The user information request accepting module 201 is a functional block realized by, for example, a CPU (not shown) executing a program that includes each step in the user management server device 200 described later.

The user management DB 202 can be realized as a storage device which can be read from/written into by a CPU (not shown). As shown in FIG. 19, the user management DB 202 stores a user management table 2021.

The user management table 2021 stores a name, a post, and a department on a user ID basis in such a manner that they are correlated with one another.

The information medium control device 310 includes an upper system module 311, an information medium central control module 312, a context information acquisition module 313, a management request communication module 314, an IC card reader 315, a Web server module 316, a panel control module 317, a print control module 318, and a scanner module 319.

The upper system module 311 has the following functions (f311-1) and (f311-2):

the function (f311-1) of acquiring user ID information on a copy requester from the IC card reader 315 and screen selection information from the panel control module 317 and sending them as copying request information to the information medium central control module 312, and the function (f311-2) of acquiring user ID information and screen selection information and requesting a Web page from the Web server module 316 as needed to acquire panel display page information.

The information medium central control module 312 has the following functions (f312-1) to (f31203):

the function (f312-1) of receiving copying request information from an upper system module 321, requesting paper document information serving as a copy original from the print control module 318, and acquiring parent management ID information on the copy original, the function (f312-2) of acquiring context information from the context information acquisition module 313, and the function (f312-3) of sending traceable duplication request information including parent management ID information on the copy original and context information to the management request communication module 314.

The context information acquisition module 313 has the function of acquiring context information on the medium control device 310, including an IP address and a MAC address, from related functions or the like in an operating system in conformity with a context information request from the information medium central control module 312 and sending the context information to the information medium central control module 312.

The management request communication module 314 has the function of communicating with the information management server device 100 when having received traceable duplication request information from the information medium central control module 312 and the function of receiving server processing result information from the information management server device and sending the result information to the information medium central control module 312.

The IC card reader 315 has the function of reading user ID information from the IC card of a copy requester and sending the user ID information to the upper system module 311.

The Web server module 316 has the function of creating panel page information to be displayed on the panel of the information medium control device in response to a page request from the upper system module 311 and sending the panel page information to the upper system module 311 and the function of acquiring user information necessary in creating the panel page information from the user management server device 200.

The panel control module 317 has the function of displaying panel page information received from the upper system module 311 on the panel of the information medium device 310 and the function of sending screen selection information selected on the panel screen to the upper system module 311.

The print control module 318 has the following functions (f318-1) to (f318-4):

the function (f318-1) of requiring the scanner module 319 to scan copied parent document information in response to a document read request from the information medium central control module 312, the function (f318-2) of analyzing and extracting management ID information attached to the copied parent document information from the scanner module 319 and sending the extracted information to the information medium central control module 312, the function (f318-3) of creating an optical code, such as a bar code, a two-dimensional code, a color code, or a watermark in which child management ID information has been stored, in response to a copying request from the information medium central control module 312, and the function (f318-4) of creating print data overlaid with the optical code and of printing the print data.

The scanner module 319 has the function of reading a scan image of a parent document in response to a parent document scanning request from the print control module 318 and sending scanning result information including the scan image information to the print control module 318.

Next, the operation of copying a duplicated document with the selective duplicating system configured as described above will be explained in detail with reference to configuration diagrams shown in FIGS. 20 to 24.

Figure 25:
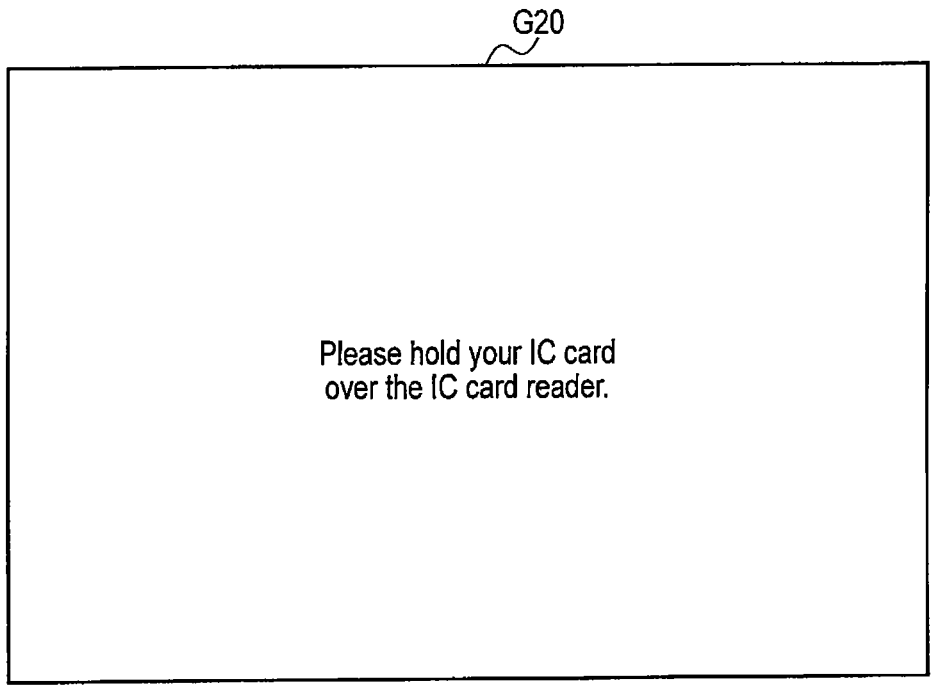
FIG. 25 is a schematic diagram showing an example of the configuration of a copy operation screen in the first embodiment.

As shown in a configuration of a screen of FIG. 25 in a screen standby state, a screen G20 that prompts the user to hold the user's ID card over an IC card reader of the information medium control device 310 is displayed on the panel of the information medium control device 310. When the ID card is held over the IC card reader, the IC card reader 315 transmits the read user ID information to the upper system module 311 (ST1).

The upper system module 311 sends page request information including the received user ID information to the Web server module 316 (ST2).

The Web server module 316 sends a user information request including the user ID information included in the page request information to the user management server device 200 (ST3).

The user management server device 200 acquires user information related to the user ID from the management client DB 202 by the user information request accepting module 201 and sends the user information to the Web server module 316 (ST4).

Here, "user information related to the user ID" includes user information indicated by the user ID and user information that has a part (e.g., family name, or department) in common may be added to the user information indicated by the user ID as needed.

The Web server module 316 creates panel page information for displaying a panel operation screen Web page including the obtained user information and an operation button and sending the panel page information to the upper system module 311 (ST5).

Figure 26:
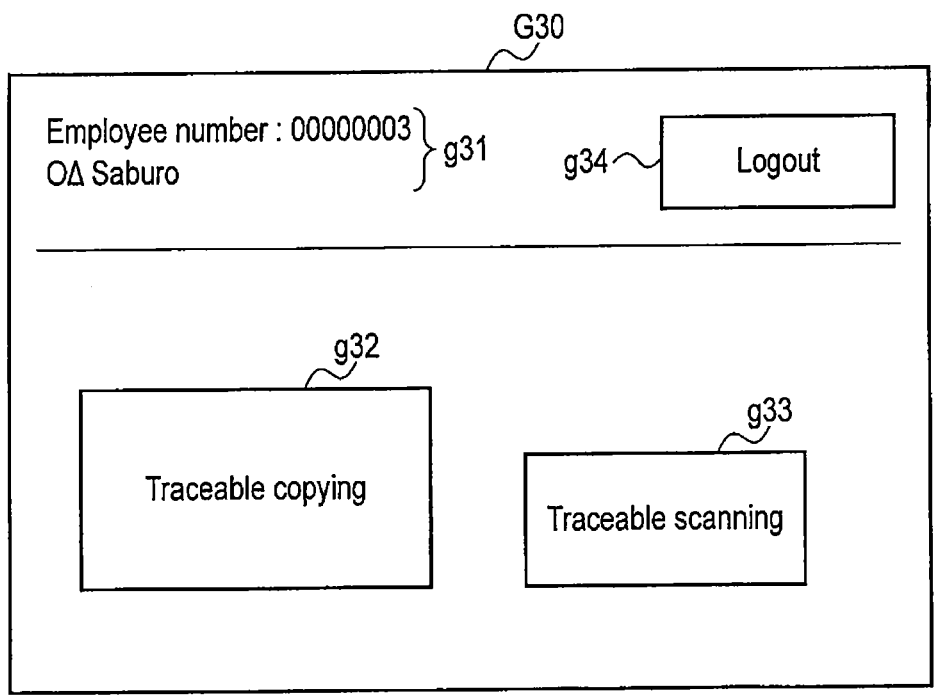
FIG. 26 is a schematic diagram showing an example of the configuration of a copy operation screen in the first embodiment.

As shown in a configuration of a copy operation screen G30 of FIG. 26, the Web page has only to include a display field g31 for client information (user information indicated by the user ID) and a copy operation button g32 displayed as "Traceable copying." A scan operation button g33 and a logout operation button g34 may be omitted as needed.

The upper system module 311 sends the received panel page information to the panel control module 317.

The panel control module 317 displays the received panel page information on the panel of the information medium control device 310. When the copy operation button g32 has been selected via input means, such as a touch panel, on the panel, the panel control module 317 sends the selected information as screen selection information to the upper system module 311 (ST7).

The upper system module 311 sends page request information for requesting a traceable copying panel page related to the user ID to the Web server module 316 (ST8).

Figure 27:
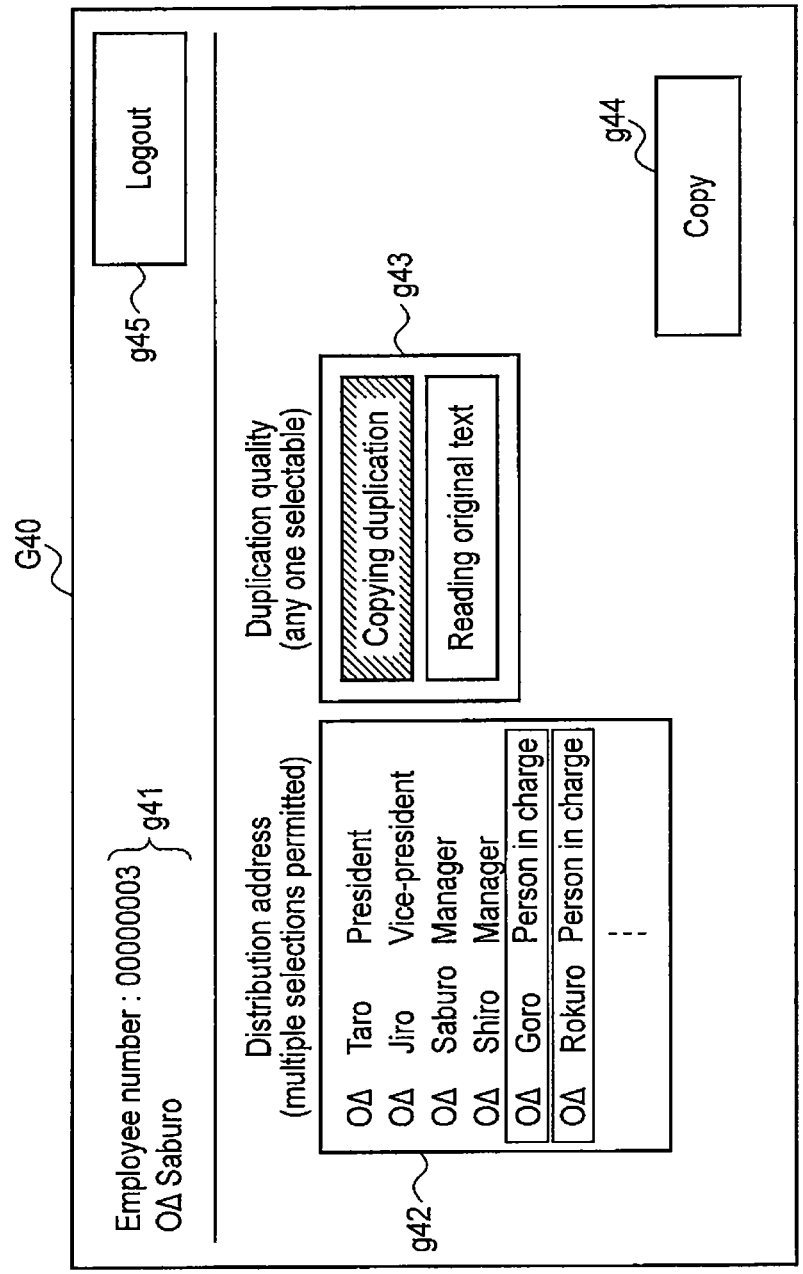
FIG. 27 is a schematic diagram showing an example of the configuration of a copy operation screen in the first embodiment.

The Web server module 316 creates panel page information for displaying a screen G40 that includes client information g41, a distribution address information selection area g42, a duplication quality selection area g43, a copy start button g44, and a logout operation button g45 as shown in FIG. 27 and sends the panel page information to the upper system module 311 (ST9).

As for the duplication quality, either a method of copying, in g43, a duplicated document to be inserted in the information medium control device 310 (Copying duplication) or a method of reading original data from the data original management table 1056 of the information management DB 105 in the information management server device 100 in connection with the management ID of the duplicated document and setting the original data as the duplication source data (Reading original text) can be selected at g43.

As distribution address information, user information (user information with common attributes) acquired in step ST4 may be used. Alternatively, (when user information with common attributes has not been acquired,) user information acquired by executing a similar process to that in step ST4 again may be used.

The upper system module 311 sends panel page information to the panel control module 317 (ST10).

The panel control module 317 displays the received panel page information on the panel of the information medium control device 310. Next, the panel control module 317 sends screen selection information including distribution address information and duplication quality information selected on the panel to the upper system module 311 (ST11). The following explanation will be given on the assumption that "Reading original text" has been selected in the duplication quality selection area g43.

The upper system module 311 sends copying request information including user ID information on the copy requester, distribution address information, and duplication quality information to the information medium central control module 312 (ST12).

The information medium central control module 312 sends a document read request to the print control module 318 so as to read a document to be copied (ST13).

Having received the document read request, the print control module 318 sends a scan request requesting scan image information on the document to the scanner module 319 (ST14).

Having received the scan request, the scanner module 319 sends scanning result information including scan'image information obtained by reading the document to be copied to the print control module 318 (ST15).

The print control module 318 acquires management ID information on the embedded document information from scan image information and sends the management ID information as parent management ID information to the information medium central control module 312 (ST16).

Having received the parent management ID information, the information medium central control module 312 sends a context information request for acquiring information on the information medium control device 310 at the time of request to the context information acquisition module 313 (ST17).

The context information acquisition module 313 acquires information that enables the use position and use pattern of the information medium control device 310, such as an IP address of the information medium control device 310, to be grasped as context information by use of the function of an operating system and sends the context information to the information medium central control module 312 (ST18). When the information medium control device 310 can acquire place and space information, such as GPS, infrared addresses, or wireless nodes, the space information may be included in the context information. In addition, such information as MAC addresses, operating systems, or terminal product information may be included in the context information. The selective duplicating system determines on the basis of the context information whether the condition under which a specified duplicated document can be copied is satisfied and executes a copying process according to the determination.

The information medium central control module 312 sends traceable copying request information including the copying request information acquired from the upper system module 311, the parent management ID information acquired from the print control module 318, and the context information acquired from the context information acquisition module 313 to the management request communication module 314 (ST19).

The management request communication module 314 communicates with the information management server device 100 and sends traceable copying request information (ST20).

The management request accepting module of the information management server device 100 sends the traceable copying request information acquired by communicating with the information medium control device 310 to the information management control module 102 (ST21).

The information management control module 102 selects information necessary for determining whether to permit the copying request from copying request information and context information in the traceable copying request information and sends the selected information as policy evaluation request information to the policy evaluation module 103 (ST22).

The policy evaluation module 103 determines on the basis of the policy evaluation request information whether a required copying process is in the range of execution conditions, while referring to a duplicated document access control policy in the system management table 1052 and master policy table 1054 of the information management DB 105. The policy evaluation module 103 sends the determination result as policy evaluation result information to the information management control module 102 (ST23).

As examples of the determination condition, there are the following items: whether the time limit for copy use has been exceeded, whether the information medium control device 310 is accessed by a wired LAN, not by a wireless LAN, and whether the requester is an executive having the permission to copy. For example, in the case of policy numbers 001 to 003 in the master policy table 1054 shown in FIG. 16, it is determined whether an IP address in context information satisfies a permission policy. In addition, for example, in the case of the system management table 1054 shown in FIGS. 14A and 14B, it is determined whether an access control policy is satisfied, depending on whether duplication requester information indicates "secretary A," or whether distribution address information indicates "manager or higher" who can access a copy of original quality. In making a determination using the system management table 1042 and master policy table 1054, any one may be executed first. That is, the order of policy determination is arbitrary.

When the policy evaluation result has shown that the execution of copying has been rejected, the information management control module 102 informs the information medium control device 310 of an error in execution permission via the management request accepting module 101 and terminates the process. When the policy evaluation result has shown that the execution of copying has been permitted, the information management control module 102 sends management ID issue request information including traceable copying request information to the information management DB control module 104 and requests a duplicated document ID issuing process and an original data reading process (ST24).

Having received the management ID issue request information, the information management DB control module 104 issues as many management IDs (=child management IDs differing from management IDs in the traceable copying request information) as the number of duplicated documents and writes issue information in the management ID table 1051 and system management table 1052 in the information management DB 105. At this time, the information management DB control module 104 writes issue information so as not only to write the issued child management IDs in the system management table 1052 on the basis of the management IDs in the traceable copying request information but also to update status information in existence information corresponding to the written child management IDs to "Distributed." In addition, on the basis of an original data reading process request included in the management ID issue request information, the information management DB control module 104 reads original data managed in the data original management table 1056 of the information management DB 105 on the basis of the management ID of the original data related to the parent management ID. Moreover, the information management DB control module 104 writes log information on the copying request in the access log management table 1053. The information management DB control module 104 sends the original data and child management ID information including a child management ID issued for a duplicated document to the information management control module 102 (ST25).

The information management control module 102 sends policy evaluation result information and server processing result information including the child management ID information and original data to the management request accepting module 101 (ST26).

The management request accepting module 101 sends the server processing result information to the information medium control device 310 (ST27).

The management request communication module 314 sends the server processing result information received from the information management server device 100 to the information medium central control module 312 (ST28).

The information medium central control module 312 sends copying request information including the child management ID information and original data included in the server processing result information to the print control module 318 (ST29).

Figure 28:
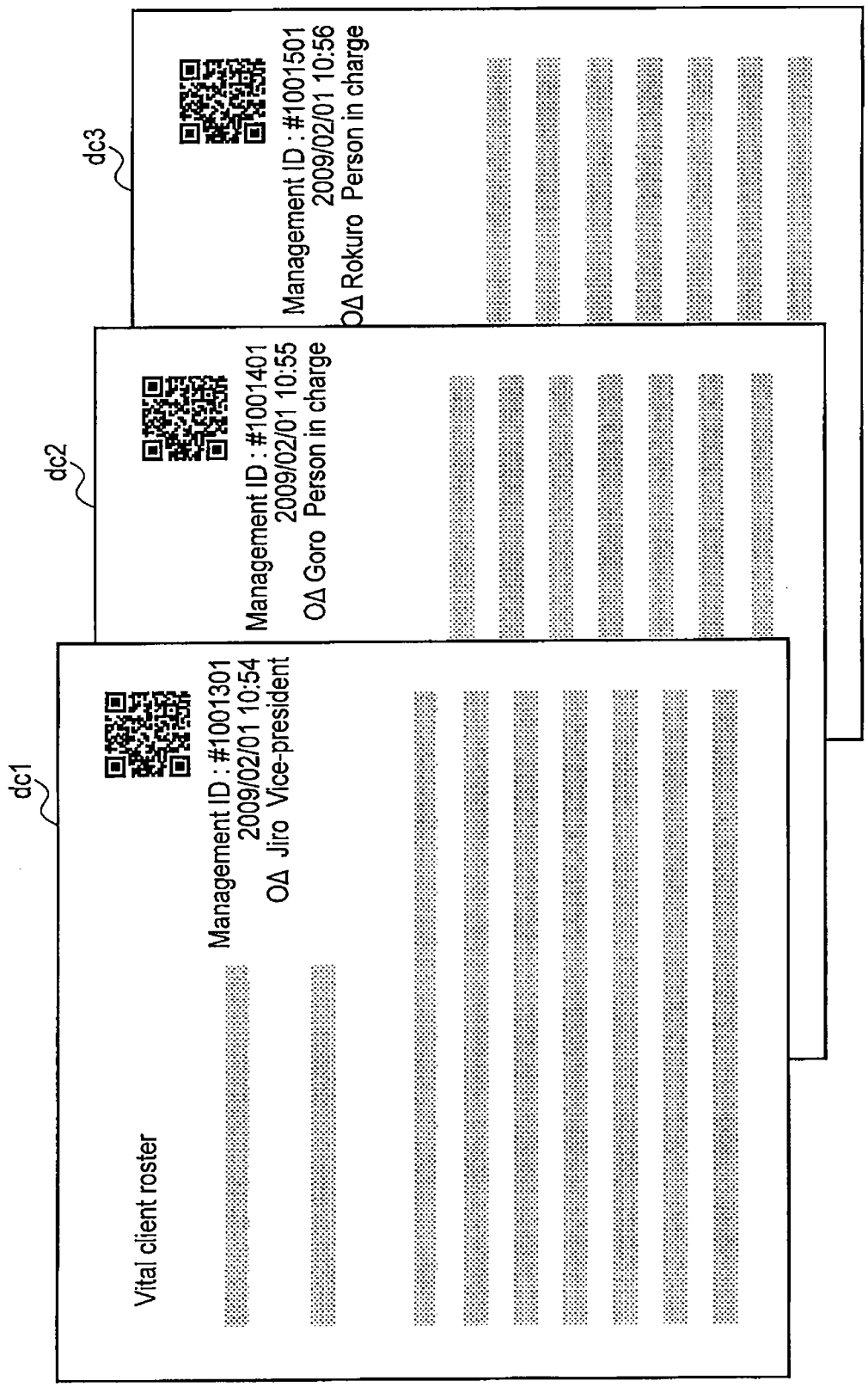
FIG. 28 is a schematic diagram showing an example of the configuration of duplicated documents in the first embodiment.

Having received the copying request information, the print control module 318 produces optical code in which child management ID information, such as a bar code, a two-dimensional code, a color code, or a watermark, has been stored from the child management ID information, creates print data obtained by overlying the original data with the code for each duplicated document, and outputs each paper document of the duplicated documents dc1 to dc3 as shown in FIG. 28.

When having completed each document output process, the print control module 318 sends copy completion information to the information medium central control module 312 (ST30).

When having received the copy completion information, the information medium central control module 312 sends copy result information to the management request communication module 314 (ST31).

The management request communication module 314 sends copy result information to the information management server device 100 (ST32).

The management request accepting module 101 sends the copy result information received from the information medium control device 310 to the information management control module 102 (ST33).

The information management control module 102 sends the copy result information to the information management DB control module 104 (ST34).

The information management DB control module 104 writes duplicated document information in the system management table 1052 of the information management DB 105. At this time, the information management DB control module 104 writes whereabouts information, including parent-child relationship, medium type, and distribution address information, in the system management table 1052 as a child information medium duplicated based on the management ID of a duplicated parent document. When having completed writing data in the information management DB 105, the information management DB control module 104 sends a copy completion response to the information management control module 102 (ST35).

The information management control module 102 sends a copy completion response to the management request accepting module 101 (ST36).

The management request accepting module 101 sends a copy completion response to the information medium control device 310 (ST37).

The management request communication module 314 sends the copy completion response received from the information management server device 100 to the information medium central control module 312 (ST38).

Having received the copy completion response, the information medium central control module 312 sends copying process completion information for showing copy completion on the panel to the upper system module 311 (ST39).

The upper system module 311 sends the copying process completion information as page request information to the Web server module 316 (ST40).

The Web server module 316 creates panel page information for displaying a screen G50 that includes requester information 51g and a copy completion message g52 including distribution address information and the number of copies as shown in FIG. 29 and sends the panel page information to the upper system module 311 (ST41).

The upper system module 311 sends panel page information to the panel control module 317 (ST42).

The panel control module 317 displays the screen G50 shown in FIG. 29 on the basis of the panel page information and completes the process.

Here, the operation when "Copying duplication" is selected instead of "Reading original text" in the duplication quality selection area g43 of FIG. 27 in step ST11 will be explained.

In steps ST12 to ST24, the same operations as in the case of "Reading original text" are performed.

In the case of "Reading original text," the information management DB control module 104 reads original data managed in the data original management table 1056 of the information management DB 105 from the management ID of the original data related to the parent management ID on the basis of an original data reading process request included in management ID issue request information. However, in the case of "Copying duplication," the information management DB control module 104 does not perform this operation. The information management DB control module 104 sends child management ID information including a child management ID issued for a duplicated document to the information management control module 102. At this time, the information management DB control module 104 does not send the original data.

In step ST26, the information management control module 102 sends server processing result information including policy evaluation result information and child management ID information to the management request accepting module 101. The original data is not included in the server processing result information.

When having received copying request information in step ST30, the print control module 318 produces an optical code in which child management ID information, such as a bar code, a two-dimensional code, a color code, or a watermark, has been stored from the child management ID information, creates print data obtained by overlying the optical code including the parent management ID of scan data read by the scanner module 319 in step ST15 with the optical code in which the child management ID information has been stored for each duplicated document, and prints the data.

As described above, the first embodiment is configured to determine whether to permit the duplicating of the original data, on the basis of an access control policy and a permission policy that indicate whether a user is permitted to duplicate and, if the duplicating is permitted, read an electronic data body of the original data via the management ID of the original data from the management ID in a duplicating request. With this configuration, reading on the basis of the management ID of the original data makes it possible to prevent not only the inconvenience when a duplicated image has deteriorated but also the inconvenience when the original data includes an important part in conformity with a policy on whether to permit duplicating, thereby making it possible to obtain a copy of the same quality as that of the original data from a certain copy.

In addition, when the original data has not been duplicated as the duplication source and a paper medium to be duplicated has been selected as requested, use of image data on the paper medium enables duplicated paper medium data to be printed and output, while preventing not only the inconvenience of making a search when a duplicated image is deteriorated but also the inconvenience of permitting the paper medium to include an important part in conformity with a policy on whether to permit duplicating.

That is, even when an information medium on which a strict copy policy has been prescribed is duplicated a lot of times, a copy of the same quality as that of original data can be output by selecting a duplication source from the original data or a copy of the original data according to the permission or condition, which makes it possible to realize a selective duplicating process.

Specifically, when duplicating request information received from the information medium control device 310 fulfils an access control policy and a permission policy, the information management server device 100 transmits processing result information including a child management ID. On the basis of a specified duplication quality and processing result information, the information medium control device 310 outputs a duplicated document including child management ID information or acquires duplicated data including child management ID information. This makes it possible to specify any one of the original data, duplicated data stored in an information medium control device, and a duplicated document to be input in the information medium control device 310 to acquire a duplicated document or duplicated data including a management ID with the same quality as that of the specified duplication source information even when information in which a strict policy has been prescribed is duplicated.

For example, if "Reading original text" is selected, a high-resolution color copy can be duplicated from a present monochrome duplicated document or a copy with the same quality as that of a new original can be obtained from a duplicated document to which a memo has been additionally written. When a present duplicated document printed with a woven pattern is copied directly, the woven pattern rises to the surface of the copy. This copy is made from the original data, making it possible to obtain a copy whose quality is higher than that of the present duplicated document. If "Copying duplication" is selected, a copy of the original to which additional information, such as a note, has been attached can be obtained, though its quality is lower than that of the original. Either "Reading original text" or "Copying duplication" can be selected, depending on the need and permission.

"Reading original data" and "Copying duplication" may be combined in a copying request. Specifically, when three copy destinations, i.e., the president, manager, and section chief, are specified, the "Reading original data" can be automatically selected for the president and "Copying duplication" can be automatically selected for the manager and section chief. For example, as shown in FIG. 30, an automatic selection button is added to the duplication quality selection area g43 of FIG. 27. When the automatic selection button has been selected and a copy destination that is permitted to perform "Reading original data" has been selected in step ST25 according to the access control policy and the post of the copy destination in the system management table 1052 of the information management DB 105, the information management DB control module 104 of the information management server device 100 sends the original data to the information management control module 102. At this time, whether each copy destination uses a duplication quality of either "Reading original data" or "Copying duplication" is included in each piece of child management ID information. Then, the resulting child management ID information is sent. The print control module 318 of the information medium control device 310 selects either the original data sent from the information management server device 100 or scan data sent from the scanner module 319 as a duplication source on the basis of the child management ID information in step ST30 and performs a printing process. The operation of switching duplication source information to original data or original copying as needed according to duplication destination information can be applied to embodiments described below.

<Second Embodiment>[Printing (Electronic Data→Paper)]

Figure 31:
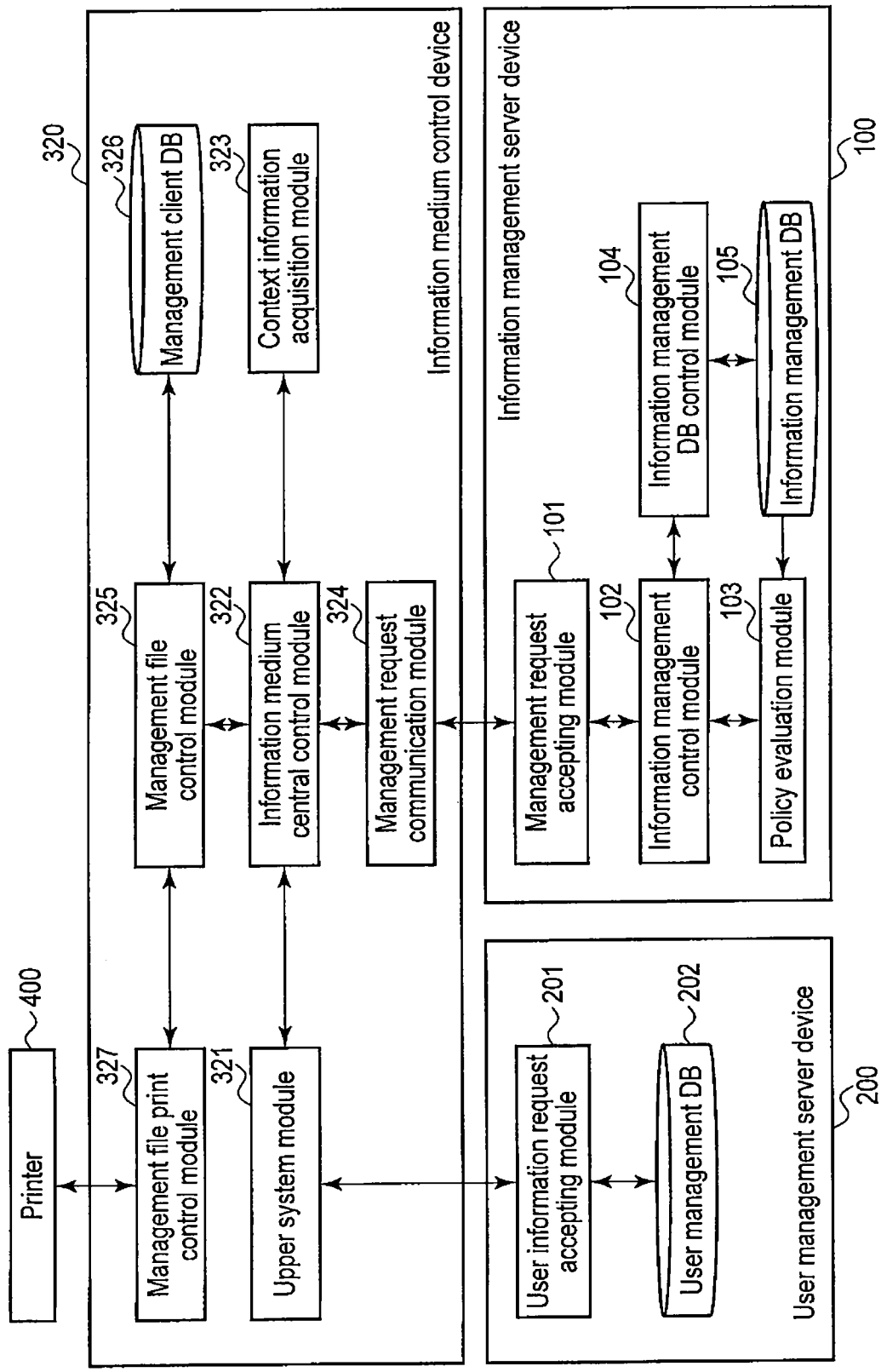
FIG. 31 is a schematic diagram showing the configuration of a selective duplicating system according to a second embodiment.

FIG. 31 is a schematic diagram showing the configuration of a selective duplicating system according to a second embodiment. The same parts as those of FIG. 11 are indicated by the same reference numerals and a detailed explanation of them will be omitted. What differ from those of FIG. 11 will be mainly described. Similarly, repeated explanations will be omitted in each embodiment below.

The second embodiment is a modification of the first embodiment. In the second embodiment, a management file to which a management ID has been given and document distribution address information are specified and a printer 400 is caused to output a printed document including a child management ID and distribution address information which differ on a distribution address basis. Of the information medium control devices 300, a unit that has the function of printing management files managed in the information medium control devices via higher-level applications, including a PC (Personal Computer) and a mobile terminal, is treated as an information medium control device 320.

The information medium control device 320 includes an upper system module 321, an information medium central control module 322, a context information acquisition module 323, a management request communication module 324, a management file control module 325, a management client DB 326, and a management file print control module 327.

The upper system module 321, information medium central control module 322, context information acquisition module 323, management request communication module 324, management file control module 325, and management file print control module 327 are functional blocks realized by, for example, a CPU (not shown) executing a program including each step in the information medium control device 320 described later.

The program including each step in the information medium control device 320 has only to realize each of the following functions (b1) to (b7). In this case, what are obtained by adding arbitrary additional items, such as various pieces of information or the function of each step, to the functions (b1) to (b7) as requested are used. Since the following functions (b1) to (b7) are representative examples, arbitrary additional items are included a little. For example, address information related to the aforementioned second determination function (a4) can be omitted. In addition, a child management ID tag indicating a child management ID can be omitted by using the child management ID as it is.

The function (b1) of writing a management file including a management ID and an electronic data body in a management file management table 3261 of the management client DB 326.

The function (b2) of accepting the input of a management ID corresponding to an electronic data body to be duplicated, duplication requester information, and distribution address information and sending duplication request information including the accepted management ID, duplication requester and distribution address information.

The function (b3) of transmitting traceable duplication request information including the sent duplication request information and address information on the information medium control device 320 to the information management server device 100.

The function (b4) of receiving processing result information including the management ID in the traceable duplication request information and a child management ID tag indicating a child management ID differing from the management ID from the information management server device 100 after the transmission of the traceable duplication request information.

The function (b5) of extracting the electronic data body from the management file on the basis of the management ID corresponding to the electronic data body to be duplicated included in the traceable duplication request information, creating document print data including the extracted electronic data body, the child management ID tag included in the processing result information, and the distribution address information, and outputting the document print data to the printer 400.

As shown in FIG. 2, when the information medium control device 300 has the individual functions of the information management server device 100, for example, a modification should be made as follows. The program including each step in the information medium control device 320 has only to realize each of the following functions (c1) to (c9). In this case, what are obtained by adding arbitrary additional items, such as various pieces of information or the function of each step, to the functions (c1) to (c9) as requested are used. Since the following functions (c1) to (c9) are representative examples as described above, arbitrary additional items are included a little. For example, the function (c7) is an arbitrary additional item and therefore can be omitted.

The function (c1) of storing a management file management table in which a management file including a management ID and an electronic data body is to be written.

The function (c2) of writing a child management ID related to a management ID, status information, and an access control policy based on duplication requester information and distribution address information in the system management table 1052 of the management client DB 326 for each management ID of a management file.

The function (c3) of writing a permission policy based on address information on an information medium control device in the master policy table 1054 of the management client DB 326.

The function (c4) of accepting the input of a management ID corresponding to an electronic data body to be duplicated, duplication requester information, and distribution address information and sending duplication request information including the accepted management ID, duplication requester, and distribution address information.

The function (c5) of transmitting traceable duplication request information including the sent duplication request information and address information on the information medium control device 300.

A first determination function (c6) of determining whether the duplication requester information and distribution address information in the sent traceable duplication request information satisfy the access control policy in the system management table 1052 corresponding to the management ID in the traceable duplication request information.

A second determination function (c7) of determining whether the address information in the sent traceable duplication request information satisfies the permission policy.

The function (c8) of not only issuing a child management ID differing from the management ID in the sent traceable duplication request information when the results of determinations made by the first and second determination functions have shown that the access control policy and permission policy have been satisfied and writing the child management ID in the system management table 1052 on the basis of the management ID in the traceable duplication request information, but also updating status information corresponding to the written management ID to "Distributed."

The function (c9) of extracting the electronic data body from the management file on the basis of the management ID in the sent processing result information, creating document print data including the extracted electronic data body and the child management ID tag and distribution address information in the processing result information, and outputting the document print data to the printer 400.

Figure 32:
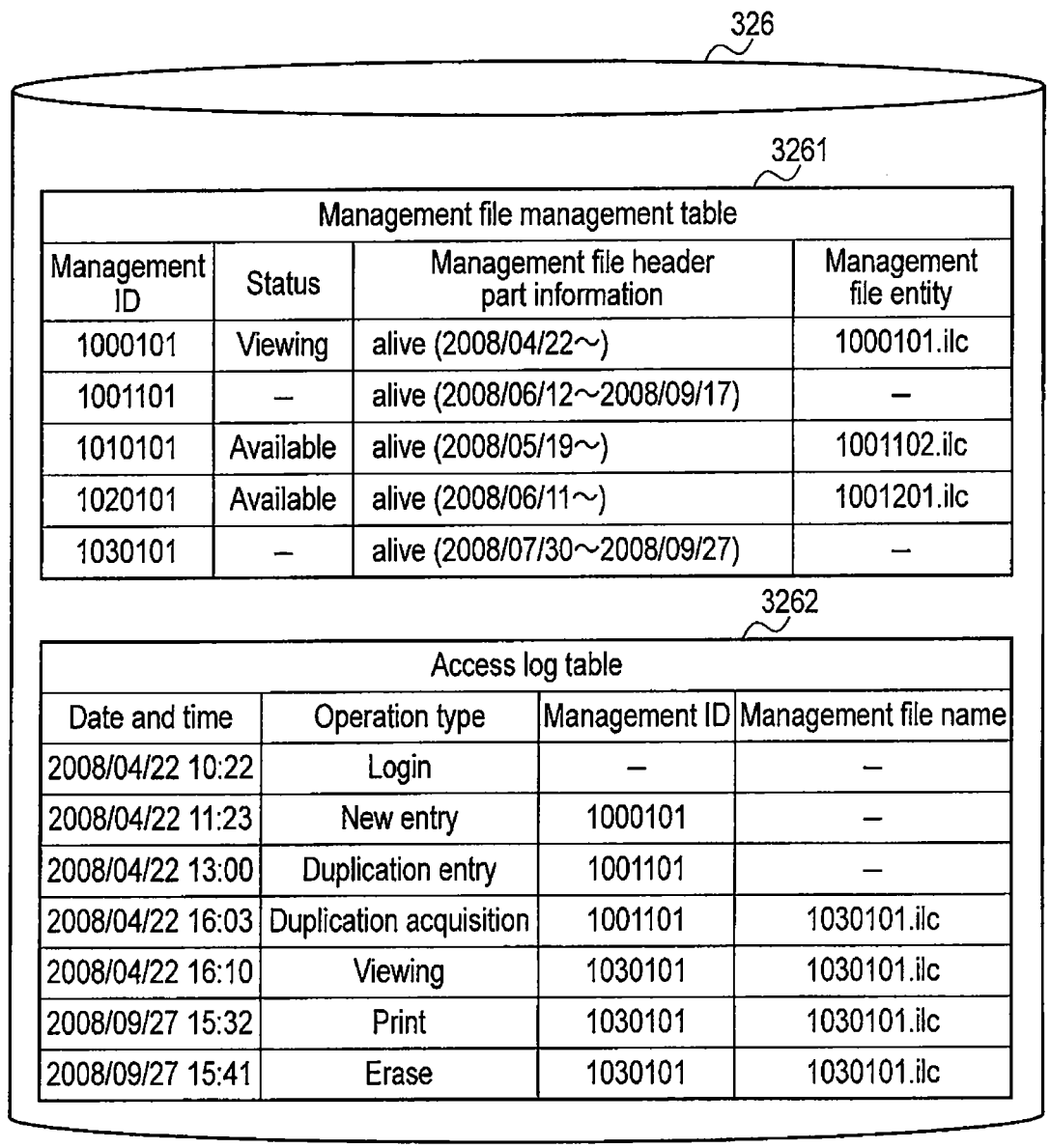
FIG. 32 is a schematic diagram showing the configuration of a management client DB in the second embodiment.

The management client DB 326 can be realized as a storage device that can be read from/written into by a CPU (not shown). As shown in FIG. 32, the management client DB 326 stores a management file table 3261 and an access log table 3262.

The management file table 3261 includes status information (e.g., viewing,—(removed), or available), management file attribute information (creation date and time (alive) and removal date and time when removed (dead)), and a management file entity. As management file attribute information, partial information (e.g., a management ID indicating a duplication source management file (a parent management file) of the management file in addition to the aforementioned creation/removal date and time) of the management file header part is used. Its writing range can take various forms on the basis of the environmental setting of the device and rules made in connection with the information management server device. In addition, the management file attribute information may include dynamic use information not written in the management file header part, such as the number of times the device accessed each management file.

The access log table 3262 includes an operation type, a management ID, and a management file name for each date and time that the device was operated. The operation type indicates the type of operation, such as login status, new entry, electronic data duplicating, browsing, or erasing. The management ID is a management ID indicating a manipulated electronic data item. The management file name is information obtained by concatenating an extension indicating the file format of the electronic data to the management ID of the electronic data. The contents managed in the access log table are not limited to these and may further include place information (in the company/outside the company, GPS information) on the device that manipulated a target management file.

The printer 400 is one of the information medium control devices 3001 to 300m. In this case, the printer 400 is used as an ordinary printer.

Figure 33:
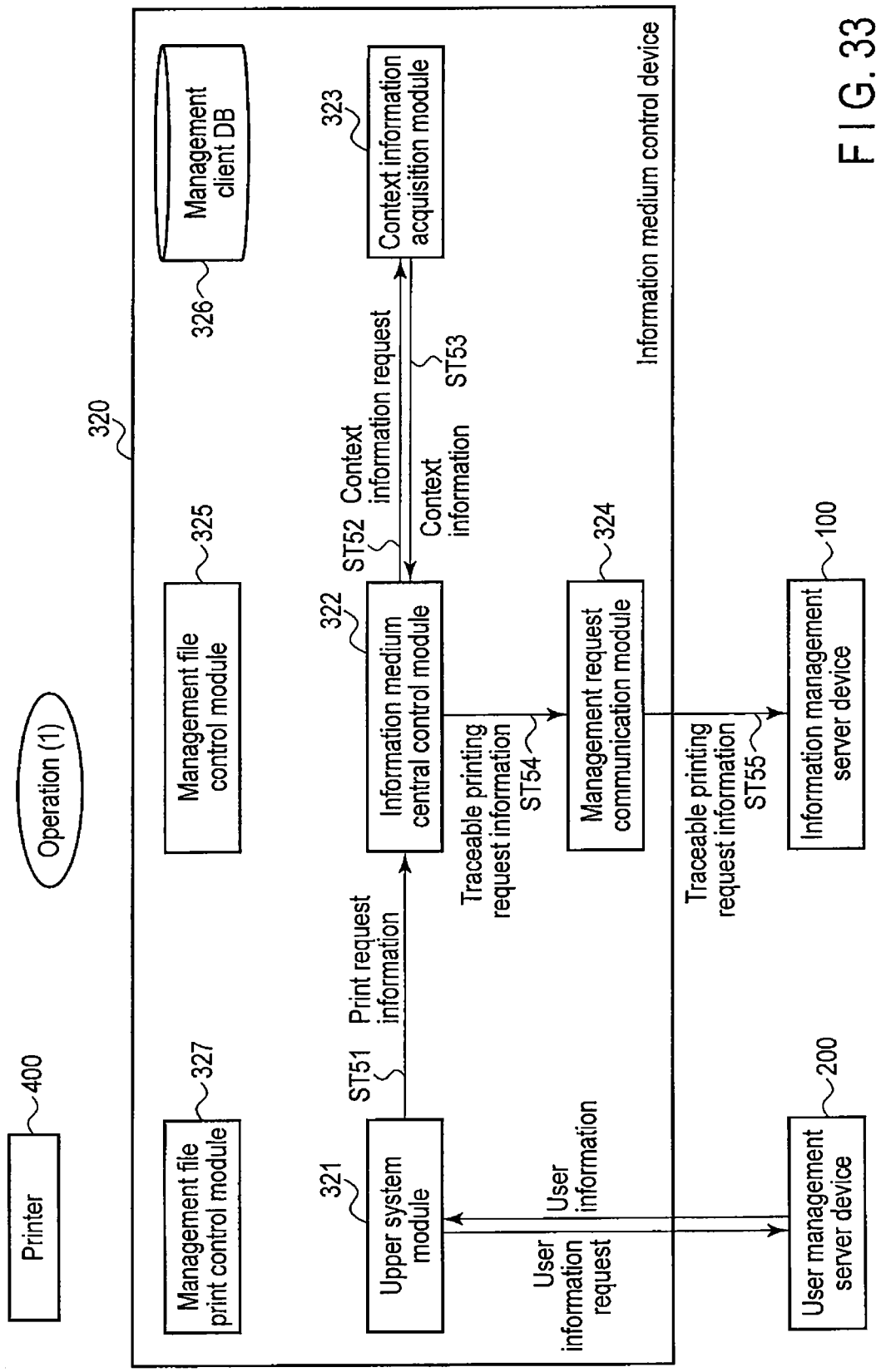
FIG. 33 is a schematic diagram to explain an operation of the second embodiment.
Figure 34:
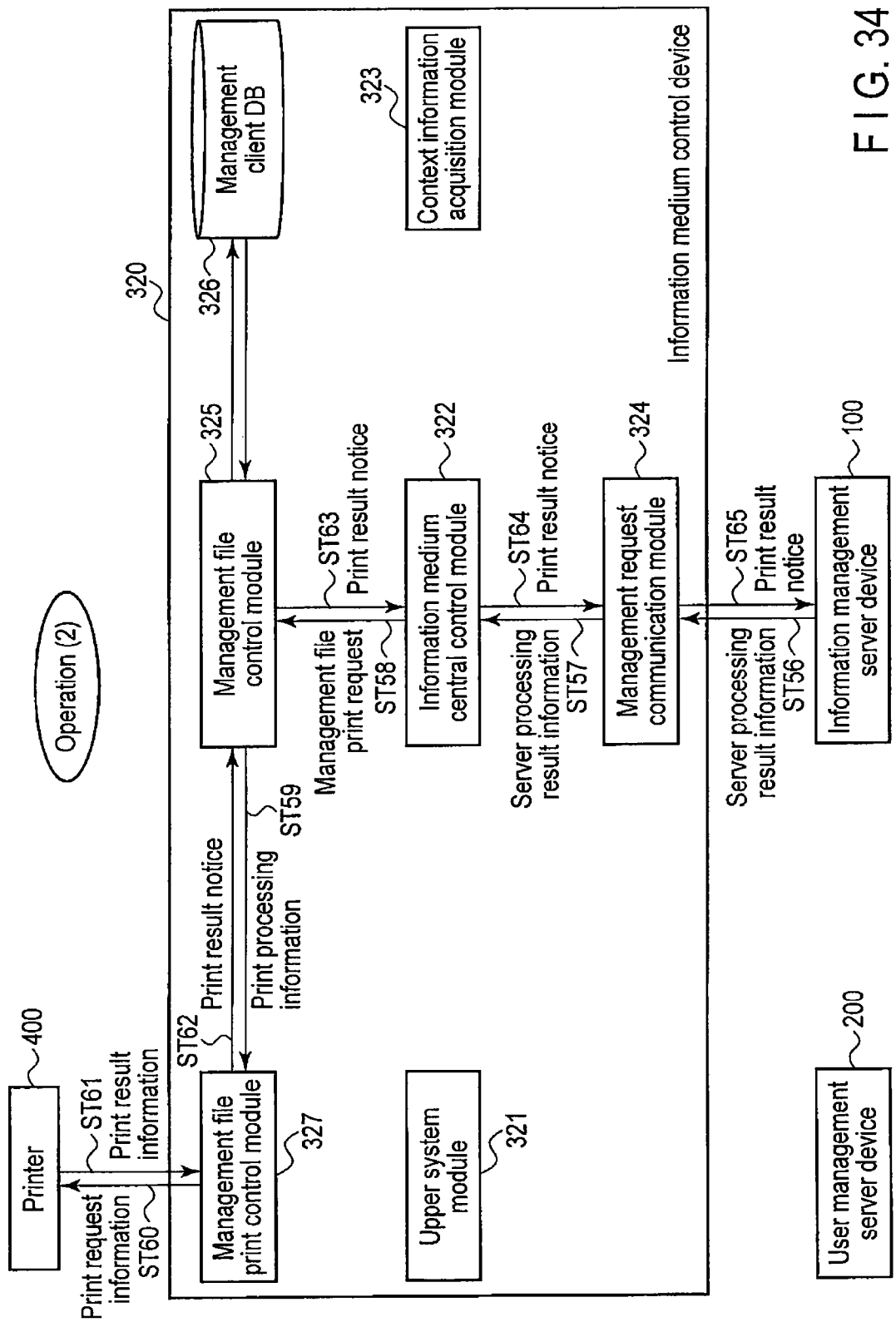
FIG. 34 is a schematic diagram to explain an operation of the second embodiment.
Figure 35:
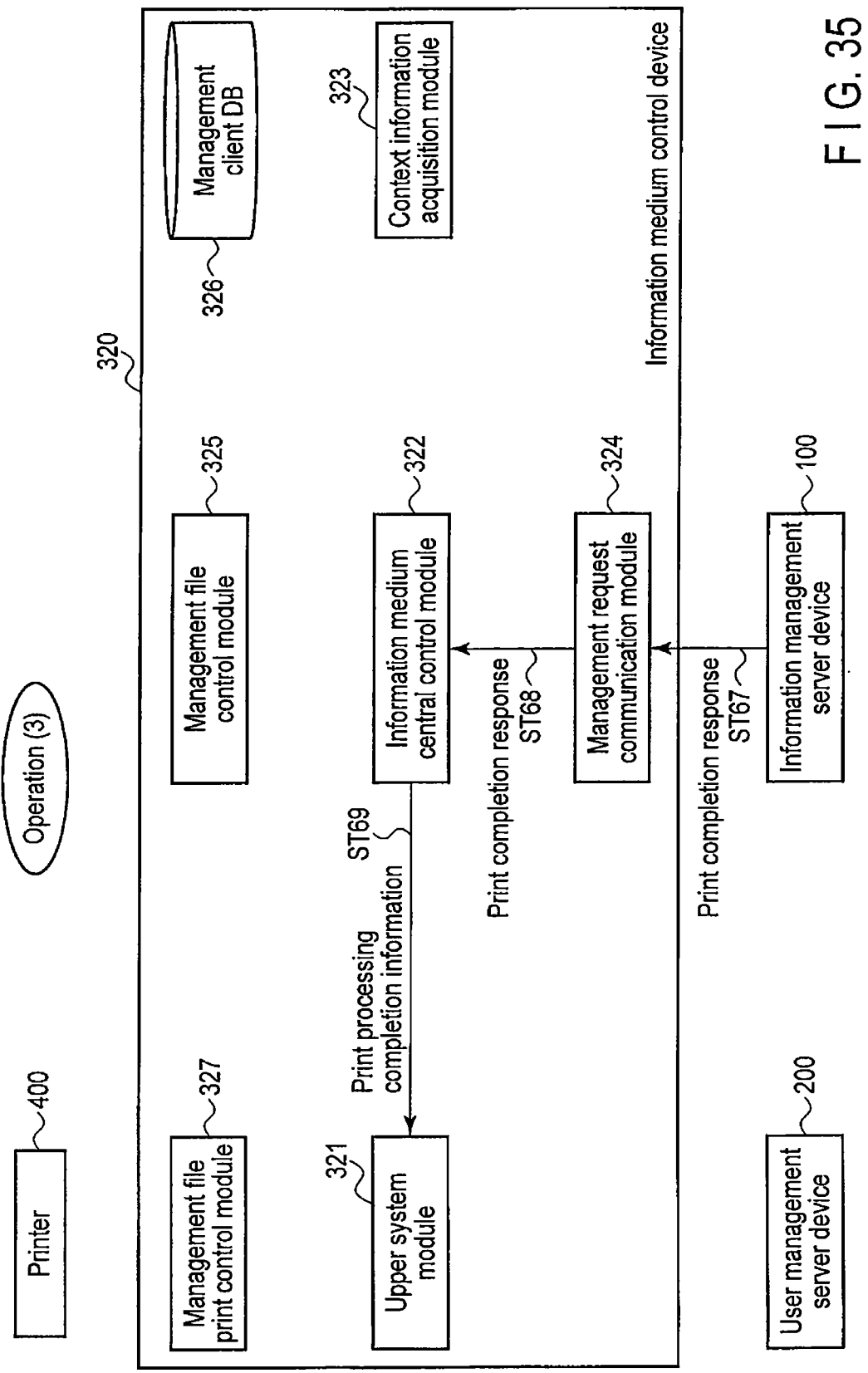
FIG. 35 is a schematic diagram to explain an operation of the second embodiment.

Next, the operation of the selective duplicating system configured as described above will be explained with reference to schematic diagrams of FIGS. 33 to 35. The following is an explanation of the operation of specifying a management file to which a management ID has been given and document distribution address information and causing the printer 400 to output a printed document including a child management ID and distribution address information which differ from one distribution address to another.

The upper system module 321 of the information medium control device 320 presents to the user a print screen G10 for selecting a management file, a distribution address, a duplication quality and making a printing request.

At this time, the upper system module 321 not only acquires a file name of a management file entity being alive and displays a management file list but also refers to the user information accept module 201 of the user management server device 200 as needed to acquire user information from the user management DB 202 and displays distribution address information.

In addition, to each duplicated document to be printed, an identification tag including a child management ID for recognizing documents individually copy by copy is given.

Moreover, pieces of information, including print time, distribution address name, and post, are printed on each duplicated document as needed. The identification tag is not limited to a QR code and may take any form, such as a bar code, a two-dimensional code, a color code, a watermark, or RFID, provided that the tag can be given (printed or stuck) with a printer and is an optical tag or an electronic tag capable of storing a management ID. Furthermore, the identification tag may include not only a management ID but also an expiration date, a generation number, URL, a telephone number, and a mail address.

This produces the effect of, for example, reading the QR code with the image-taking device of a mobile phone, making direct contact with a reference for the information on the basis of the telephone number or mail address displayed on the mobile phone, and accessing the URL of the management Web site stored in the mobile phone to acquire detailed information on the information or switch the status between recovery and discard smoothly.

Next, the operation of printing a duplicated document will be explained in detail.

The upper system module 321 of the information medium control device 320 sends printing request information including the selected management file information (including a management ID corresponding to an electronic data body to be duplicated), request client information, distribution address information, and management ledger output presence or absence information to the information medium central control module 322 (ST51). The printing request information may be read as duplication request information. Hereinafter, the operation will be explained on the assumption that "Printing the original" has been selected in duplication quality. In "Printing the original," printing is performed with the quality of a copy of management file information stored in the management client DB 325 of the information medium control device 320.

Having received printing request information, the information medium central control module 322 sends a context information request to acquire information on the information medium control device 320 at the time of request to the context information acquisition module 323 (ST52).

As in step ST18 of the first embodiment, the context information acquisition module 323 acquires information that enables the use position and use pattern of the information medium control device 320, such as an IP address of the information medium control device 320, to be grasped as context information by use of the function of the operating system and sends the context information to the information medium central control module 322 (ST53).

The information medium central control module 322 sends traceable printing request information including the printing request information acquired from the upper system module 321 and the context information acquired from the context information acquisition module 323 to the communication request communication module 324 (ST54). The traceable printing request information may be read as traceable duplication request information.

The management request communication module 324 communicates with the information management server device 100 and sends traceable printing request information (ST55).

The information management server device 100 performs the same processes as in steps ST21 to ST26 of the first embodiment and sends server processing result information to the information medium control device 320 (ST56).

The management request communication module 324 sends server processing result information received from the information management server device 100 to the information medium central control module 322 (ST57).

The information medium central control module 322 confirms that printing can be performed on the basis of policy evaluation result information in the server processing result information and sends a management file printing request including management file information serving as a duplication source and child management ID information to the management file control module 325 (ST58). The policy evaluation result information and the process of confirming the result information may be omitted because server processing result information including the child management ID information and management ledger information is received only when the policy evaluation result has shown "permission."

The management file control module 325 acquires a management file entity from the management file management table 3261 of the management client DB 325 on the basis of the management ID included in the management file information in the management file printing request. The management file control module 325 extracts the electronic data body stored in the body part from the management file entity and sends print processing information including the electronic data body and child management ID information to the management file print control module 327 (ST59).

In addition, the management file control module 325 writes a child management ID, status "Distributed," and management file header part information in the management file management table 3261 with respect to a child management file and further writes date and time, operation type "Print," a child management ID, and a management file name in the access log table 3262.

The management file print control module 327 creates document print data including a child management ID tag and distribution address information and outputs the document print data as printing request information to the printer 400 (ST60).

In creating print data, an optical code (a child management ID tag), such as a bar code, a two-dimensional code, a color code, or a watermark, is created from the child management ID and print data of an electronic data body is overlaid with (or optically overwritten with) the optical code. At this time, the print data may be overlaid with printing request date and time information and distribution address information together with the optical tag. Document attribute information, including printing request date and time information, distribution address information, and discard time limit, may be stored in the optical tag.

The printer 400 performs a document print data printing process of each duplicated document and outputs paper documents of duplicated documents dc1 to dc3 as shown in FIG. 28. When having completed the printing process, the printer 400 sends print result information to the management file print control module 327 (ST61). The print result information may be sent after all the duplicated documents required have been printed or each time each print document has been printed.

When having received the print result information, the management file print control module 327 sends a print result notice to the management file control module 325 (ST62). In the print result notice, print information, including output date and time, the number of sheets, paper type, print types of monochrome, color, and black-and-white, the number of pages per sheet, double-side printing, or woven pattern printing, may be included.

The management file control module 325 writes print output result information in the access log table 3262 of the management client DB 326. Having written the information in the management client DB 326, the management file control module 325 sends a print result notice to the management medium central control module 322 (ST63).

The information medium central control module 322 sends the print result notice to the management request communication module 324 (ST64).

The management request communication module 324 sends the print result notice to the information management server device 100 (ST65).

The information management server device 100 performs the same operations as in steps ST33 to ST37 of the first embodiment and sends server processing result information to the information medium control device 320 (ST66). Here, copy result information is read as print result information and the copy completion response is read as print a completion response.

The management request communication module 325 sends the print completion response received from the information management server device 100 to the information medium central control module 322 (ST67). The information medium central control module 322 sends the normal completion of the printing process as printing process completion information to the upper system module 321 and completes the process. In the printing process completion information, information on a duplicated document including issued child management ID information may be included.

As described above, the aforementioned second embodiment can produce a similar effect to that of the first embodiment even when the original data stored in the information management DB of the information management server device 100 is printed.

Specifically, the information management server device 100 sends server processing result information including the issued child management ID information and original data information to the information medium control device 320. The information medium central control module 322 sends a printing request using the child management ID information and original data information included in the server processing result information to the management file control module 325. Instead of reading a file entity serving as a duplication material from the management client DB 326, the management file control module 325 switches printing process information to original data information and sends the printing process information to the management file print control module 327. The management file print control module 327 sends printing request information including a child management ID tag, original data information, and distribution address information to the printer 400 and causes the printer 400 to print a duplicated document.

<Third Embodiment> [Image Scanning (Paper→Electronic Data)]

FIG. 37 is a schematic diagram showing the configuration of a selective duplicating system according to a third embodiment. The same parts as those of FIG. 11 are indicated by the same reference numerals and a detailed explanation of them will be omitted. The parts that differ from those of FIG. 11 will be mainly described.

The third embodiment is a modification of the first embodiment. In the third embodiment, a document distribution address and a duplication quality are specified from a management file to which a management ID has been given and a management file including a child management ID differing from one distribution address to another is delivered to each specified delivery destination. In the third embodiment, of the information medium control devices 300, a device with an operation panel which has the function of reading scan image data from a paper document, such as a digital complex machine or a scanner, is treated as a first information medium control device 330 and a device which has the function of receiving a management file including a child management ID created by the information management server device 100 via a higher-level application, including a PC (Personal Computer) and a mobile terminal, is treated as a second information medium control device 340.

The information management server device 100 includes a management request accepting module 101, an information management control module 102, a policy evaluation module 103, an information management DB control module 104, an information management DB 105, and a management file creation module 106.

The management request accepting module 101, information management control module 102, policy evaluation module 103, information management DB control module 104, and management file creation module 106 are functional blocks realized by, for example, a CPU (not shown) executing a program including each step in the information management server device 100 described later.

The program including each step in the information management server device 100 has only to realize each of the following functions (d1) to (d8). In this case, what are obtained by adding arbitrary additional items, such as various pieces of information or the function of each step, to the functions (d1) to (d8) as requested are used. Since the following functions (d1) to (d8) are representative examples, arbitrary additional items are included a little. For example, a second determination function (d4) and address information related to the function (d4) can be omitted by lowering the level of regimentation of document management based on policy. In addition, a child management ID tag indicating a child management ID can be omitted by using the child management ID as it is.

The function (d1) of writing in the information management DB 105 a system management table 1052 in which a child management ID and status information related to a management ID, and access control policy based on duplication requester information and copy distribution address information are written on a management file management ID basis.

The function (d2) of writing a permission policy based on address information of the information medium control device 300 in a master policy table 1054 of the information management DB 105.

A first determination function (d3) of determining whether duplication requester information and distribution address information in traceable duplication request information received from the information medium control device 300 satisfy an access control policy in the system management table 1052 corresponding to a management ID in the traceable duplication request information.

A second determination function (d4) of determining whether address information in the received traceable duplication request information satisfies a permission policy.

The function (d5) of issuing a child management ID differing from the management ID in the received duplication request information when the results of determination by the first and second determination modules have shown that the access control policy and permission policy are satisfied and of writing not only the child management ID in the system management table 1052 on the basis of the management ID in the traceable duplication request information but also the management ID of the original data selected as a duplication source material or a duplicated parent management ID.

The function (d6) of correlating the issued child management ID with a post-office box ID at a delivery destination and writing the resulting ID in the post-office box management table 1057.

The function (d7) of reading original text data or duplicated data stored in the data original management table 1056 on the basis of an entity ID related to the management ID of the original data selected as a duplication source material or the duplicated parent management ID and creating a management file that stores the issued child management ID and the read original data or duplicated data.

The function (d8) of creating copy process information including a child management ID tag indicating the issued child management ID, the management ID in the traceable duplication request information, and distribution address information and transmitting processing result information including the copy process information to the information medium control device 300, the sender of duplication entry request information.

The function (d9) of transmitting the issued management file to the information medium control device 300, the sender of a management file acquisition request.

As shown in FIG. 3, when a plurality of information medium control devices 300 are caused to share the functions of the information management server device 100, for example, the information medium control devices 300 should be modified as follows. In place of the information management server device 100, not less than two but not more than nine of the information medium control devices 300 are used. Means for realizing the functions (d1) to (d9) the information management server device 100 has are allocated to the not less than two but not more than nine information medium control devices 300 in a distributed manner. When nine information medium control devices 300 are used, any one of the functions (d1) to (d9) is allocated to each of the information medium control devices 300. When two information medium control devices 300 are used, one to eight of the functions (d1) to (d9) are allocated to one information medium control device 300. The remaining eight to one of the functions (d1) to (d9) are allocated to the other information medium control device 300. When three to eight information medium control devices 300 are used, the functions (d1) to (d9) are similarly allocated to the information medium control devices 300 in a distributed manner.

Figures 38, 39:
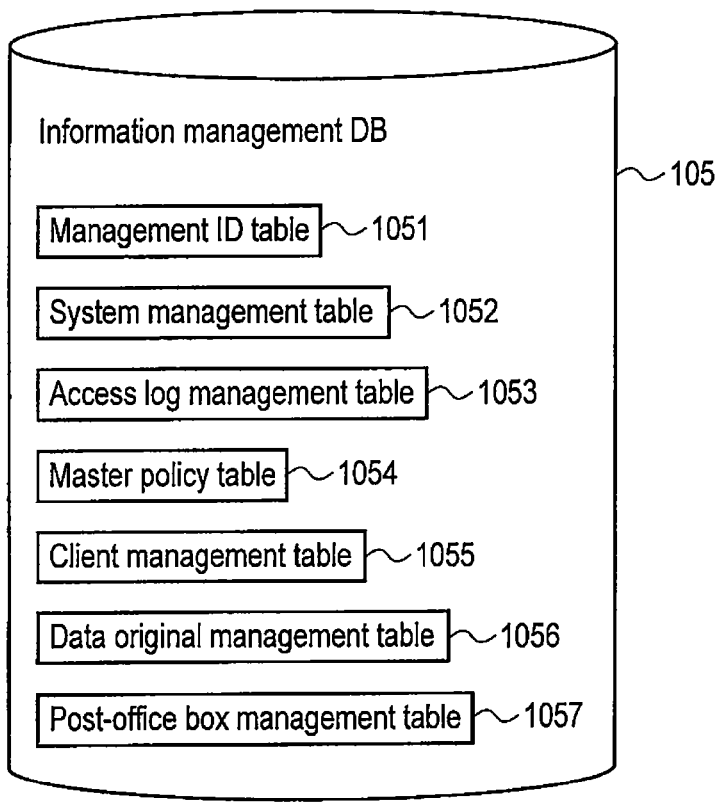
FIG. 38 is a schematic diagram showing the configuration of an information management DB in the third embodiment.
FIG. 39 is a schematic diagram showing the configuration of a post-office box management table in the third embodiment.

The information management DB 105 can be realized as a storage device that can be read from/written into by a CPU (not shown). As shown in FIG. 38, the information management DB 105 stores a management ID table 1051, a system management table 1052, an access log management table 1053, a master policy table 1054, a client management table 1055, a data original management table 1056, and a post-office box management table 1057.

The post-office box management table 1057 correlates the number of files mailed (the number of files obtained) meaning the number of child management files to be obtained with a management ID list that enumerates management IDs of child management files to be obtained on a post-office box ID basis and stores them as shown in FIG. 39. Although a post-office box ID will be described using a case where the ID is allocated to each information medium control device 300, this is not restrictive. An arbitrary information medium control device 300 may be configured to be capable of specifying an arbitrary post-office box ID. For example, an explanation will be given on the assumption that a client ID and a post-office box ID are similar things.

Figure 40A:
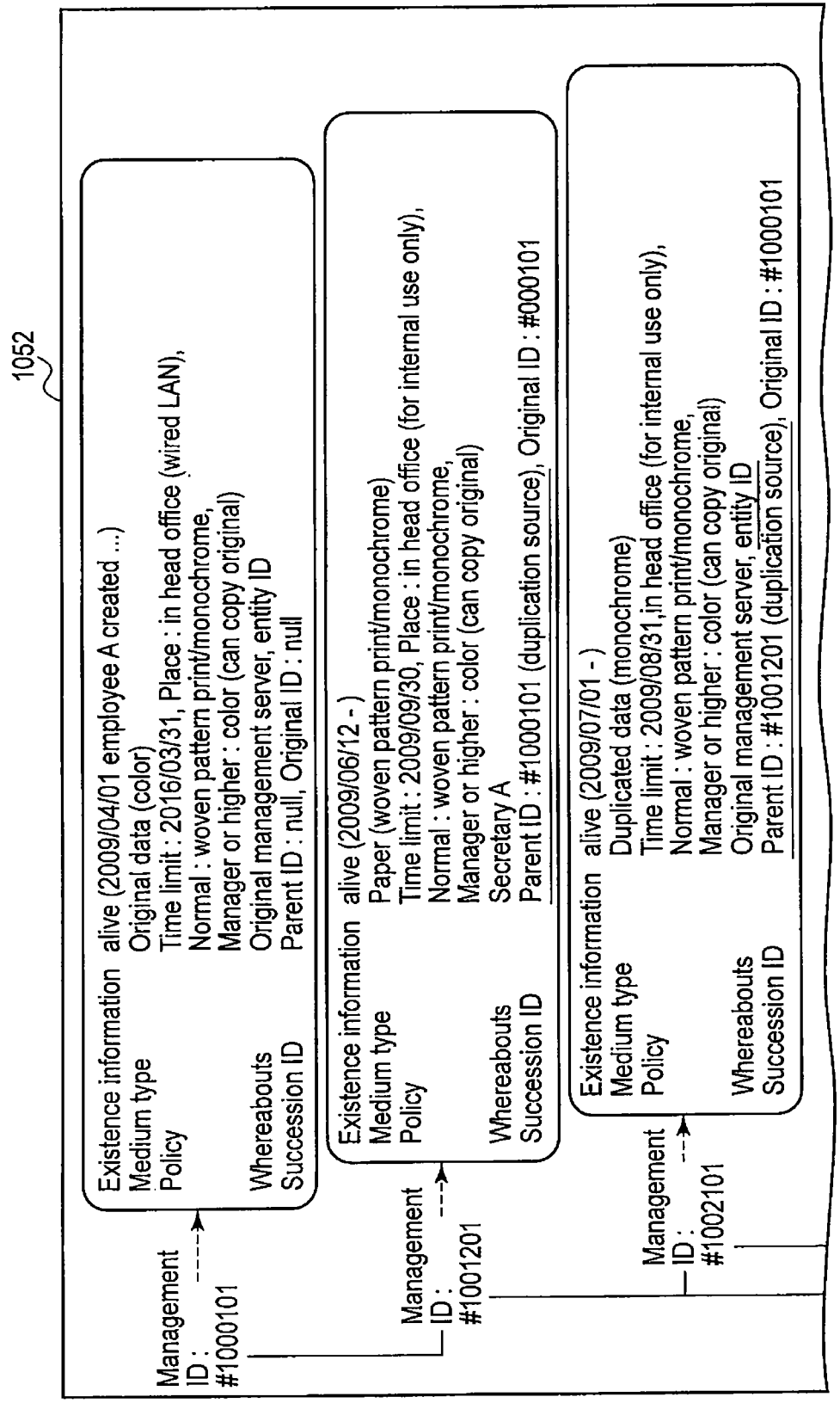
FIG. 40A is a schematic diagram showing the configuration of a system management table in the third embodiment.
Figure 40B:
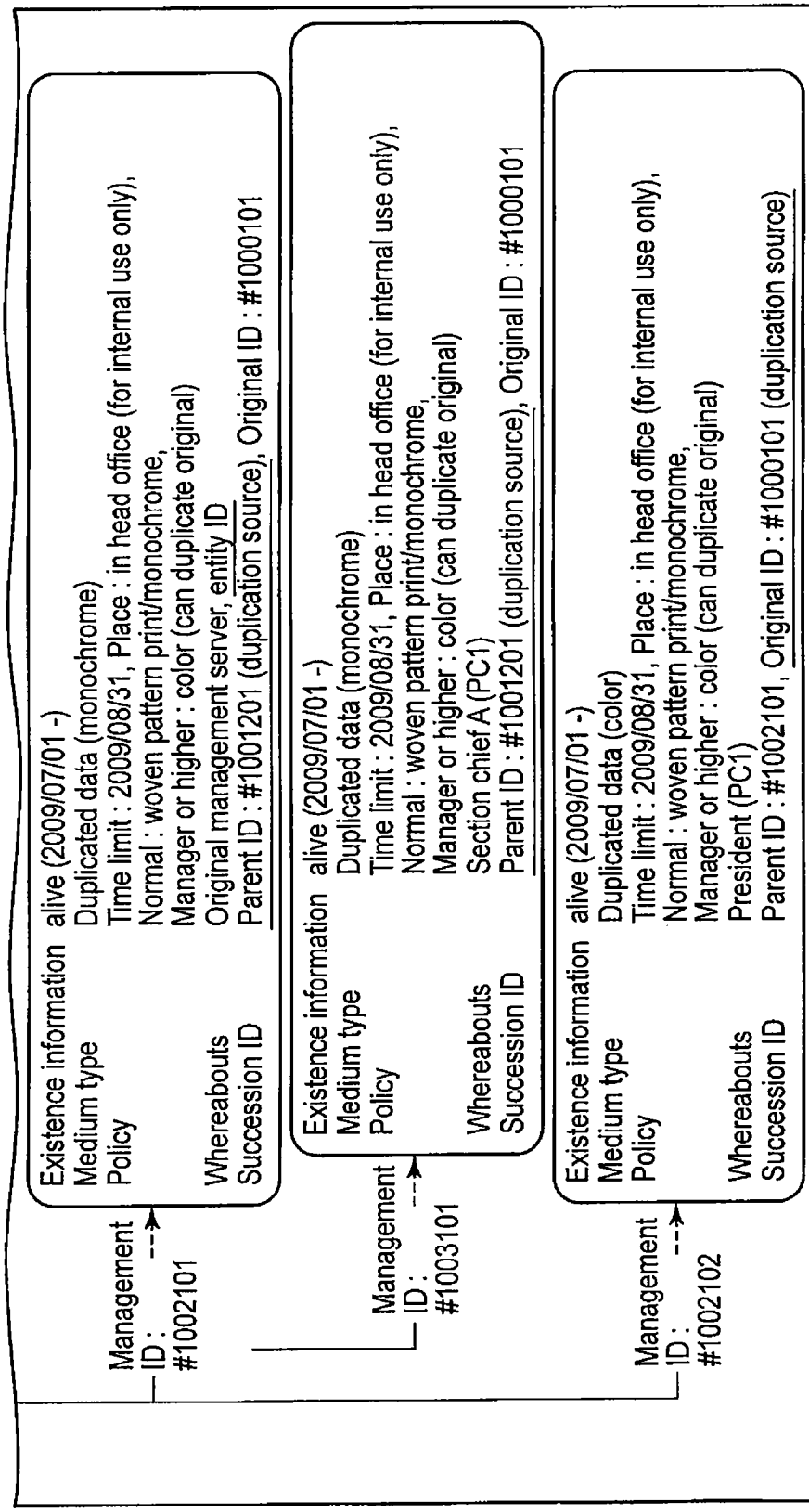
FIG. 40B is a schematic diagram showing the configuration of the system management table in the third embodiment.

Here, as shown in FIGS. 40A and 40B, a copy paper document (management ID: #1001201) to which a certain management ID has been given is read with a scanner. When the scan image is distributed to a copy destination (PC of section chief A) that has specified the scan image (management ID: #1002101), a child management ID is issued. The scan image is correlated with the child management ID issued to the data original management table 1056 of the information management DB 105 and then stored. The relationship between them is stored in the system management table 1052. Thereafter, a new grandchild management ID is issued for a specified distribution address and a management file that stores the grandchild management ID and scan image is created. When a copy acquisition request from the specified distribution address has been received, the management file is sent.

The first information medium control device 330 includes an upper system module 331, an information medium central control module 332, a context information acquisition module 333, a management request communication module 334, an IC card reader 335, a Web server module 336, a panel control module 337, and a scanner module 338.

The upper system module 331 has the function of acquiring user ID information on a duplication requester from the IC card reader 335 and screen selection information from the panel control module 337 and sending these pieces of information as duplication request information to the information medium central control module 332 and the function of acquiring the user ID information and screen selection information, requesting a Web page from the Web server module 316 as needed, and acquiring panel display page information.

The information medium central control module 332 has the following functions (f332-1) to (f332-4):

the function (f332-1) of receiving duplication request information from the upper system module 331, requesting paper document information serving as a copy original from the scanner module 338, and acquiring parent management ID information on the scan original, the function (f332-2) of requesting the scanner module 338 to send not only the paper document information but also a scan image of a paper document when "Scanning the original" has been selected and acquiring the parent management ID information and scan image information, the function (f332-3) of acquiring context information from the context information acquisition module 333, and the function (f332-4) of sending, to the management request communication module 334, not only duplication entry request information including duplication request information, parent management ID information of the copy original, and context information but also scan image information on the paper document, depending on the situation.

The context information acquisition module 333, management request communication module 334, IC card reader 335, Web server module 336, and panel control module 337 have the same functions as those of the first embodiment.

The second information medium control device 340 includes an upper system module 341, an information medium central control module 342, a context information acquisition module 343, a management request communication module 344, a management file control module 345, and a management client DB 346. The upper system module 341 has the function of confirming the presence or absence of a duplication entry to the second information medium control device 340 when the operator has operated or confirmation has been set at time intervals and, if there is a duplication entry, sending a request to acquire electronic data entered for copy (hereinafter, referred to as copy acquisition request) to the information medium central control module 342 and the function of receiving a copy acquisition completion notice and terminating the copy acquisition process.

The information medium central control module 342 has the following functions (f342-1) to (f342-6):

the function (f342-1) of receiving a duplication entry request from the upper system module 341, the function (f342-2) of requesting context information on the second information medium control device 340 from the context information acquisition module 343 and acquiring context information from the context information acquisition module 343, the function (f342-3) of sending post-office box check request information including the context information acquired from the context information acquisition module 343 to the management request communication module 344, the function (342-4) of requesting the acquisition of a management file by specifying a management ID to be acquired when post-office box confirmation information acquired from the management request communication module 344 includes management file list information that can be acquired by the second information medium control device 340, the function (f342-5) of sending the acquired management file to the management file control module 345 and requesting the management file control module 345 to store the file in the management client DB 346, and the function (f342-6) of receiving information on the result of storing a management file in the management client DB 346 and informing the upper system of the information.

The context information acquisition module 343 and management client DB 346 are the same as those of the first embodiment.

The management request communication module 344 has the function of sending not only a post-office box check request from the information medium central control module 342 to the information management server device 100 but also post-office box confirmation information received from the information management server device 100 to the information medium central control module 342 and the function of sending not only a management file acquisition request from the information medium central control module 342 to the information management server device 100 but also management file information received from the information management server device 100 to the information medium central control module 342.

The management file control module 345 has the function of acquiring management file information from the information medium central control module 342 and storing the management file information in the management client DB 346 and the function of sending storage result information to the information medium central control module 342.

Next, the operation of duplicating an image of a duplicated document with the selective duplicating system configured as described above will be explained in detail with reference to configuration diagrams in FIGS. 41 to 48. The third embodiment will be explained by dividing the functions of the third embodiment into a duplication entry process of the first information medium control device 330 reading a paper document with a scanner, issuing a child management ID by specifying a delivery destination, and entering the child management ID into the information management DB and a copy acquisition process of the second information medium control device 340 inquiring acquirable management files from the information management server device 100 and obtaining a management file created by the information management server device 100.

Figure 41:
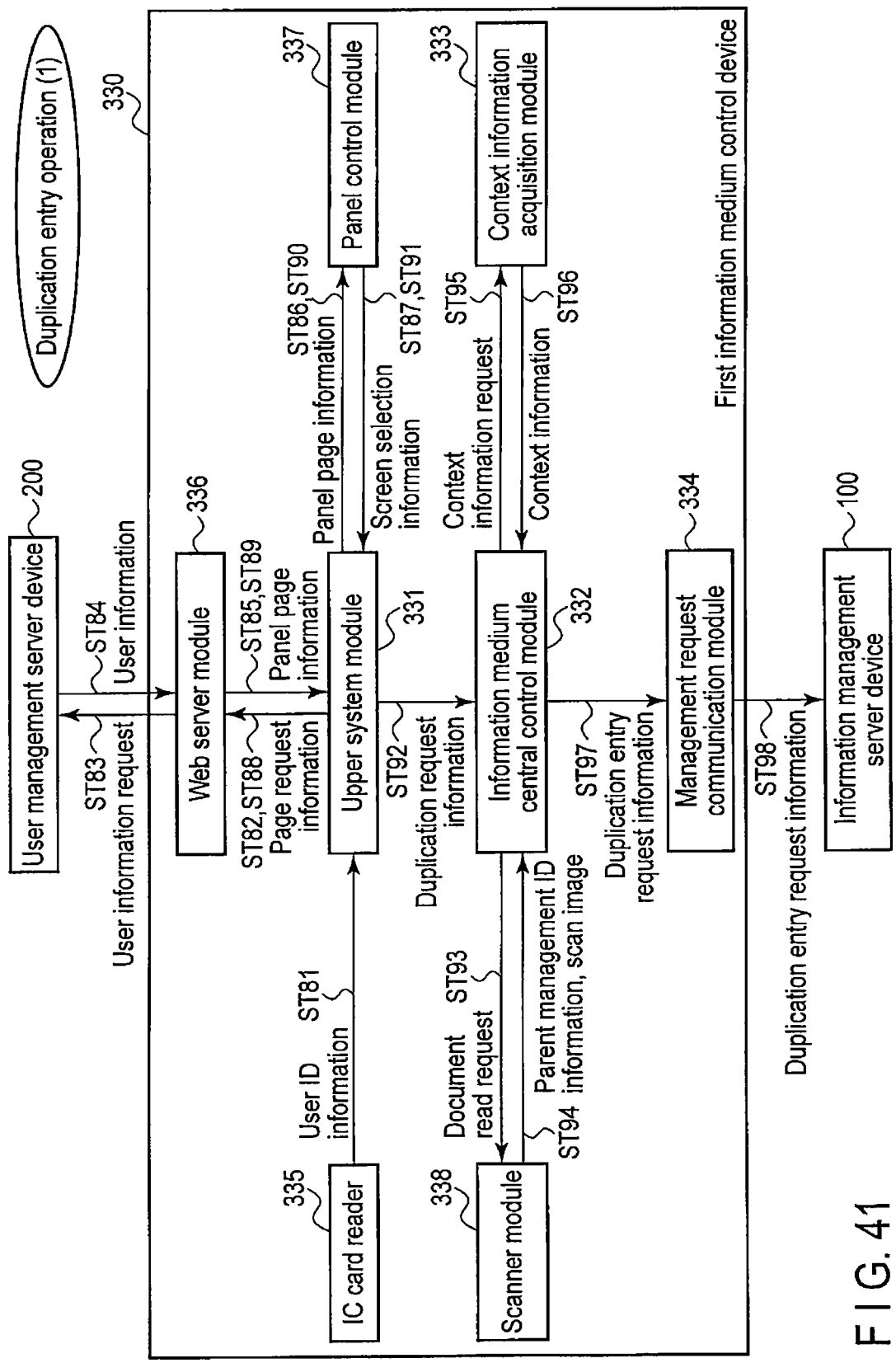
FIG. 41 is a schematic diagram to explain an operation of the third embodiment.
Figure 42:
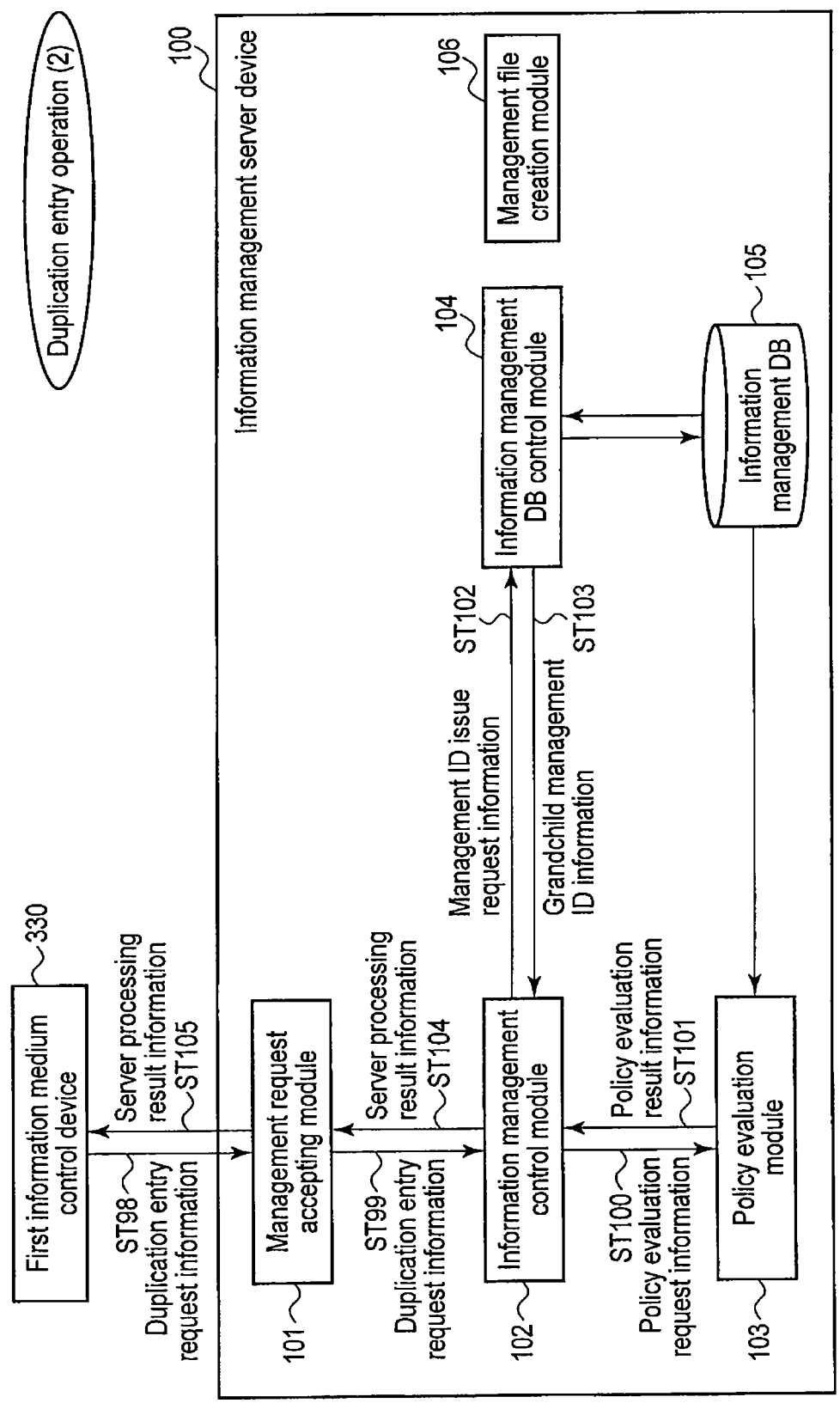
FIG. 42 is a schematic diagram to explain an operation of the third embodiment.
Figure 43:
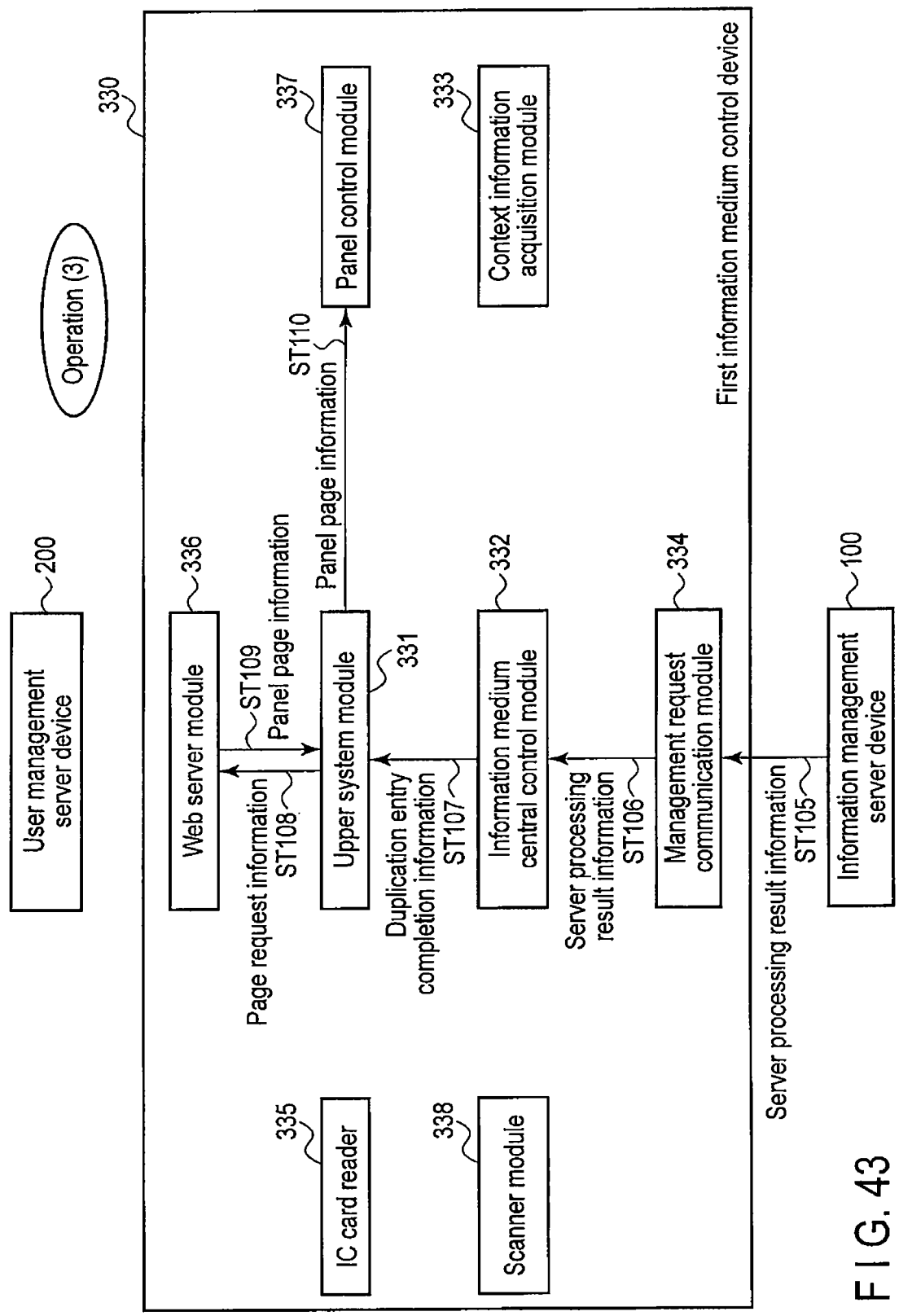
FIG. 43 is a schematic diagram to explain an operation of the third embodiment.
Figure 46:
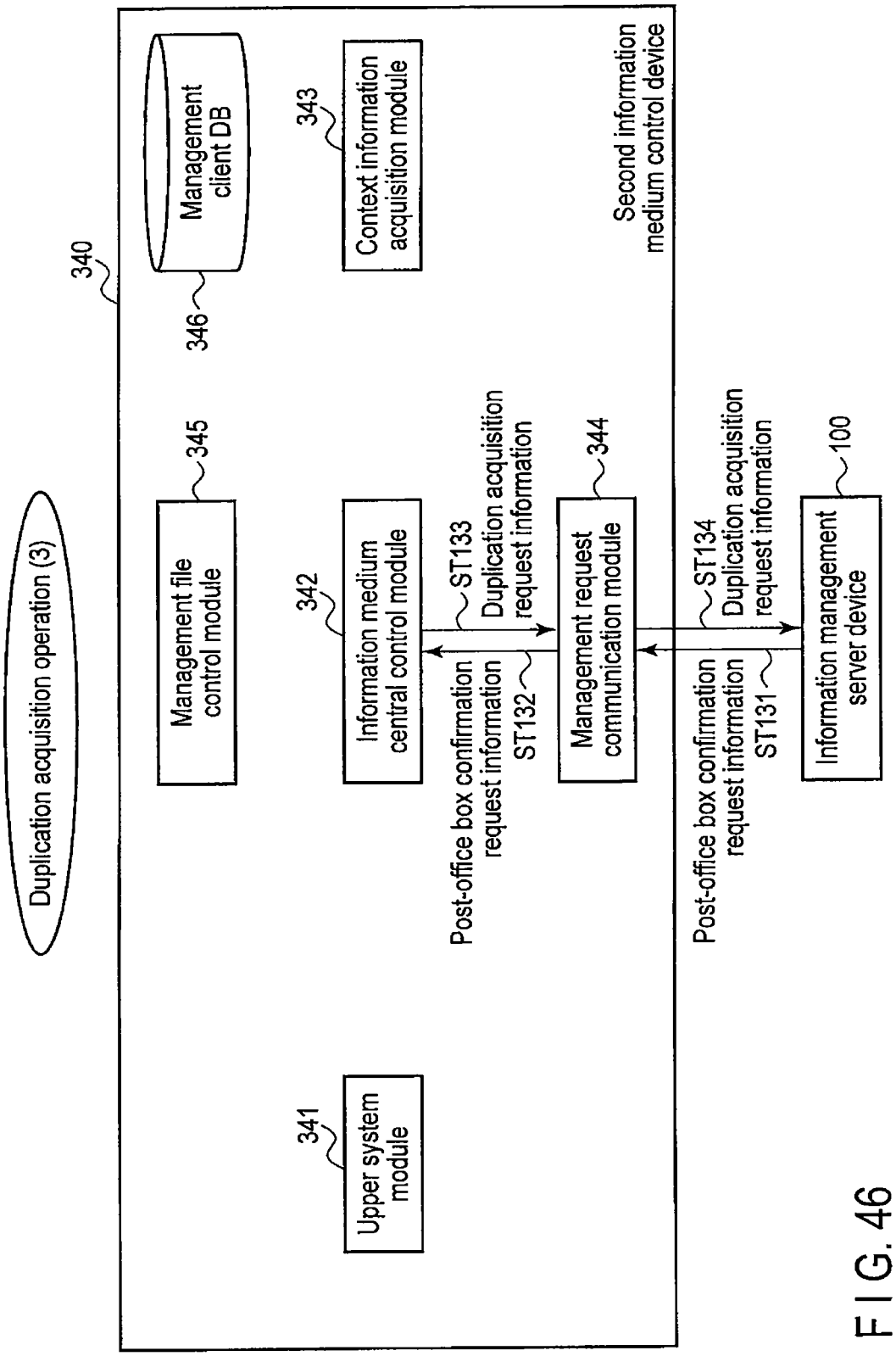
FIG. 46 is a schematic diagram to explain an operation of the third embodiment.
Figure 48:
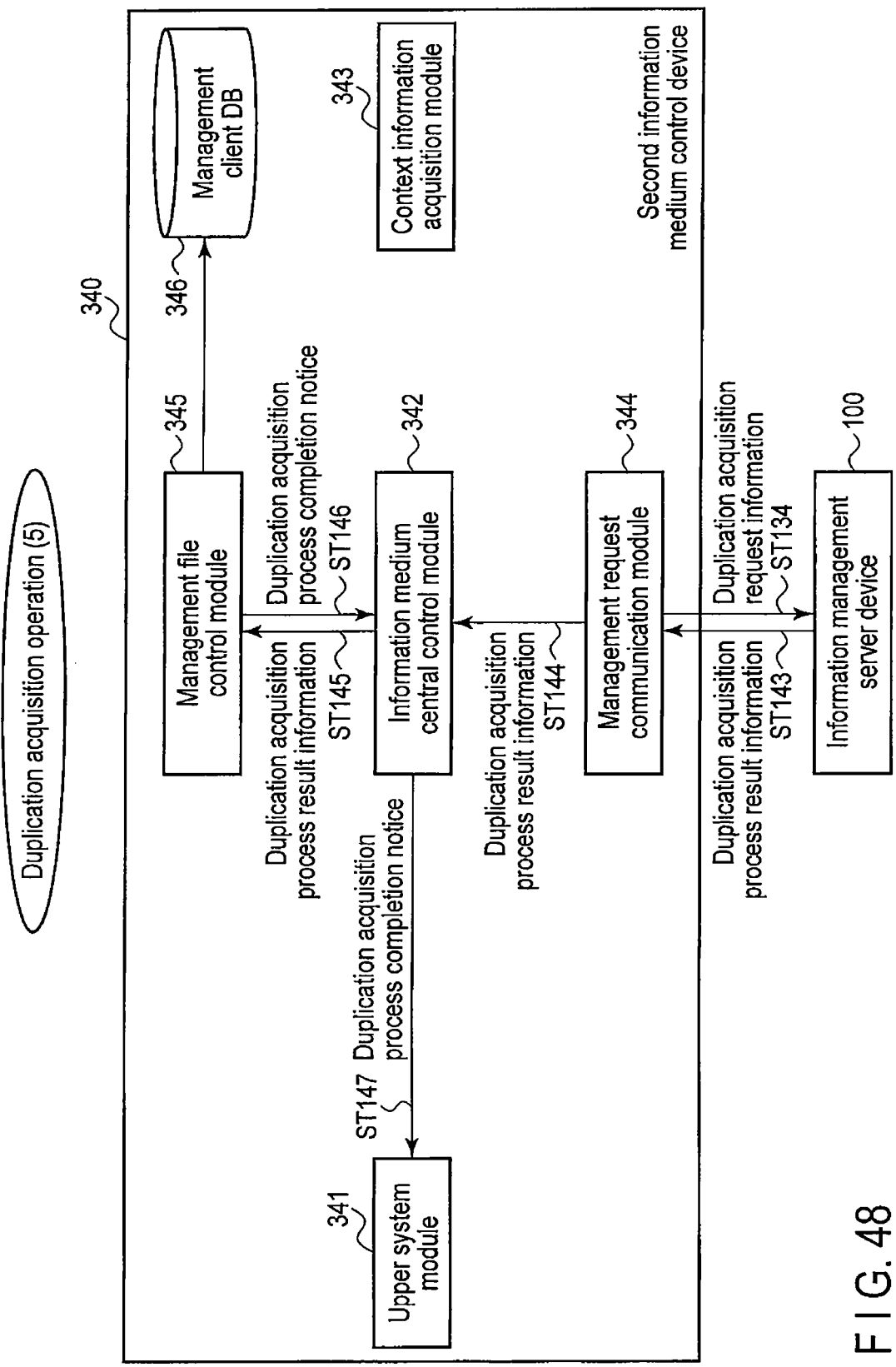
FIG. 48 is a schematic diagram to explain an operation of the third embodiment.

(Duplication Entry Process from Paper Document: FIG. 41 to FIG. 43)

The first information medium control device 330 performs the same processes as in steps ST1 to ST12 of the first embodiment and the information medium central control module 332 receives duplication request information from the upper system module 331 (ST81 to ST92).

Figure 49:
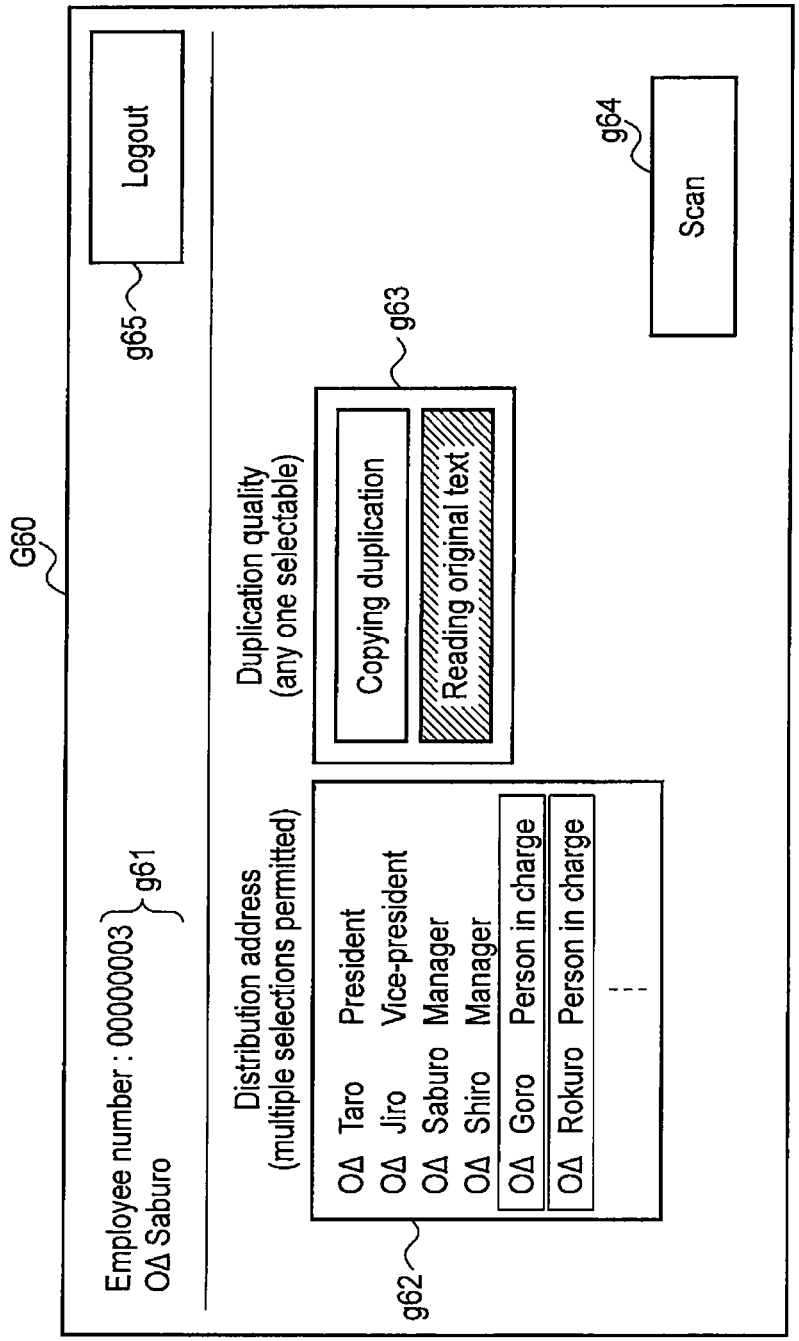
FIG. 49 is a schematic diagram showing an example of the configuration of a scan operation screen in the third embodiment.

Here, the panel control module 337 sends screen selection information selected on a page screen as shown in FIG. 49 to the upper system module 331. The operation from this point on will be explained on the assumption that "Copying duplication" has been selected to deliver a scan image of a copy paper document read by the scanner module 338 in the form of a management file to a delivery destination that has specified the scan image.

The information medium central control module 332 sends a document read request to the scanner module 338 to read a document to be duplicated (ST93). Here, a request to send a read scan image is included in the document read request.

When having received a document read request, the scanner module 338 acquires parent management ID information from scan image information obtained by reading a document to be copied and sends the parent management ID and scan image information to the information medium central control module 332 (ST94).

When having received the parent management ID and scan image information from the scanner module 338, the information medium central control module 332 performs the same processes as those in steps ST17 and ST18 of the first embodiment and acquires context information from the context information acquisition module 313 (ST95 and ST96).

The information medium central control module 332 sends, to the management request communication module 334, duplication entry request information including the duplication request information acquired from the upper system module 331, the parent management ID and scan image information acquired from the scanner module 338, and the context information acquired from the context information acquisition module 333 (ST97).

The management request communication module 334 communicates with the information management server device 100 and sends duplication entry request information (ST98).

The information management server device 100 performs the same processes as those in steps ST21 to ST23 of the first embodiment and the information management control module 102 receives policy evaluation result information from the policy evaluation module 103 (ST99 to ST101).

If the policy evaluation result has shown that the execution of duplication entry is rejected, the information management control module 102 informs the information medium control device 330 of an error in execution permission via the management request accepting module 101 and terminates the process. If the policy evaluation result has shown that the execution of duplication entry is permitted, the information management control module 102 sends management ID issue request information including the duplication entry request information to the information management DB control module 104 and requests a copy data management ID issue process (ST102).

When having received the management ID issue request information, the information management DB control module 104 issues as many scan image data management IDs (=child management IDs differing from management IDs in the duplication entry request information) as the number of management IDs (=grandchild management IDs differing from the management IDs in the duplication entry request information) of one and a plurality of data items to be delivered and writes issue information in the management ID table 1051 and system management table 1052 of the information management DB 105.

At this time, the information management DB control module 104 writes the issued child management IDs and grandchild management IDs in the system management table 1052 on the basis of the management IDs in the duplication entry request information. At this time, the information management DB control module 104 writes image scan information on the duplicated document in the data original management table 1056 so as to correlate the image scan information with the child management IDs and further writes whereabouts, including an entity ID of the image scan information and an original management server, in whereabouts information of the system management table 1052 so as to correlate the whereabouts with the child management IDs. In addition, the information management DB control module 104 further writes issue information that, for example, status information in existence information corresponding to a written grandchild management ID is to be updated to "waiting for copy acquisition."

In addition, the information management DB control module 104 enters the grandchild management IDs in the post-office box management table 1057 so as to correlate the grandchild management IDs with the post-office IDs in the duplication entry request information and writes the number of entered grandchild management IDs as the number of mailed files in the post-office box management table 1057 with respect to each specified post-office box.

In addition, the information management DB control module 104 further writes log information on the duplication entry request in the access log management table 1053. The information management DB control module 104 sends grandchild management ID information including grandchild management IDs issued for duplicated data to the information management control module 102 (ST103).

The information management control module 102 sends server processing result information including policy evaluation result and grandchild management ID information to the management request accepting module 101 (ST104).

The management request accepting module 101 sends server processing result information to the first information medium control device 330 (ST105).

The first information medium control device performs the same processes as those in steps ST38 to ST42 of the first embodiment and the panel control module 337 displays a screen G50 shown in FIG. 29 on the basis of panel page information and completes the process.

When "Reading original text" has been selected in step ST91, the above duplication entry process will be changed as described below.

In step ST93, the information medium central control module 332 makes the sending of a scan image unnecessary and sends a document read request to the scanner module 338.

In step ST94, the scanner module 338 acquires parent management ID information from scan image information obtained by reading a document to be copied and sends only the parent management ID information to the information medium central control module 332.

In steps ST97 to ST99, scan image information need not be included in a duplication entry request sent from the first information medium control device 330 to the information management server device 100.

When having received a management ID issue request in step ST103, the information management DB control module 104 issues as many management IDs (=child management IDs differing from the management IDs in the duplication entry request information) as the number of duplicated data items to be delivered and writes issue information in the management ID table 1051 and system management table 1052 of the information management DB 105.

At this time, the information management DB control module 104 writes the issued child management IDs in the system management table 1052 on the basis of the management IDs in the duplication entry request information. In addition, the information management DB control module 104 further writes issue information that, for example, status information in existence information corresponding to a written child management ID is to be updated to "waiting for copy acquisition."

In addition, the information management DB control module 104 enters the grandchild management IDs in the post-office box management table 1057 in such a manner that the grandchild management IDs are correlated with the post-office IDs in the duplication entry request information and writes the number of entered child management IDs as the number of mailed files in the post-office box management table 1057 with respect to each specified post-office box.

In addition, the information management DB control module 104 further writes log information on the duplication entry request in the access log management table 1053. The information management DB control module 104 sends child management ID information including child management IDs issued for duplicated data to the information management control module 102.

(Copy Acquisition Process: FIG. 44 to FIG. 48)

In this system, when the second information medium control device 340 acquires electronic data duplicated for the device 340 from the information management server device 101, the second information medium control devices 340 and information management server device 101 perform the following processes.

As shown in FIG. 44, the upper system module 341 confirms the presence or absence of a duplication entry to the second information medium control device 340 when the operator has operated or confirmation has been set at time intervals and, if there is a duplication entry, sends a request to acquire electronic data entered for duplication (hereinafter, referred to as a duplication acquisition request) to the information medium central control module 342 (ST120). The duplication acquisition request includes user information on a user who makes an acquisition request. The duplication acquisition request may include place information or use environment information on the second information control device 340. In this case, the operation from this point on will be explained using a post-office box ID corresponding to the second information medium control device 340 as user information.

As in steps ST17 to ST18 of the first embodiment, the information medium central control module 342 acquires context information from the context information acquisition module 343 (ST121 and ST122). The information medium central control module 342 sends a post-office box confirmation request including the context information to the management request communication module 344 to confirm the presence or absence of a duplication entry to the second information medium control device 340 (ST123).

The management request communication module 344 sends the post-office box confirmation request to the information management server device 100 (ST124).

The management request accepting module 101 sends the post-office box confirmation request information received from the second information medium control device 340 to the information management control module 102 (ST125).

The information management control module 102 performs the same processes as those in steps ST22 and step ST23 of the first embodiment and receives policy evaluation result information as to whether the issuing of post-office box confirmation information from the policy evaluation module 103 is permitted (ST126 and ST127). Only when the evaluation has shown that the issuing is permitted does the information management control module 102 send a post-office box check request including post-office box confirmation request information to the information management DB control module 104 (ST128).

The information management DB control module 104 extracts a post-office box ID from the post-office box check request and acquires post-office box confirmation information including the post-office box ID, the number of mailed files, and a management ID list from the post-office box management table 1057. The number of mailed files is the number of entered management IDs or the number of management files that can be duplicated and obtained. The information management DB control module 104 sends an obtained post-office box check result to the information management control module 102 (ST129).

The information management DB control module 104 sends post-office box confirmation result information including the policy evaluation information and post-office box check result to the management request accepting module 101 (ST130).

The management request accepting module 101 sends post-office box confirmation result information to the second information medium control device 340 (ST131).

The management request communication module 344 sends post-office box confirmation result information to the information medium central control module 342 (ST132).

The information medium central control module 342 confirms whether there is a management file that can be duplicated and obtained on the basis of the number of mailed files in the post-office box confirmation information or the management ID list. If there is no management file that can be duplicated and obtained, the information medium central control module 342 terminates the copy acquisition process. At this time, the information medium central control module 342 may request the management file control module 345 to write access log information in the management client DB 346. Alternatively, the information medium central control module 342 may inform the upper system module 341 that there is no management file. If there is a management file that can be obtained, the information medium central control module 342 selects the management ID of a management file to be obtained from the management ID list in the post-office box confirmation information and sends copy acquisition request information including the management ID to the management request communication module 344 (ST133).

The management request communication module 344 sends the copy acquisition request information to the information management server device 100 (ST134).

The management request accepting module 101 sends the copy acquisition request information received from the second information medium control device 340 to the information management control module 102 (ST135).

The information management control module 102 sends policy evaluation request information as to whether a management file with a management ID specified in the copy acquisition request information from the second information medium control device 340 can be acquired with reference to the policy to the policy evaluation module 103 (ST136).

As in step ST23 of the first embodiment, the policy evaluation module 103 determines whether the copy acquisition request can be accepted and sends policy evaluation result information to the information management control module 102 (ST137).

Only when the policy evaluation result information has shown that the copy acquisition request can be accepted does information management control module 102 send a copy acquisition process request to the information management DB control module 104 (ST138).

The information management DB control module 104 acquires necessary information from the information management DB 105 and sends a management file creation request including the information to the management file creation module 106 (ST139). Here, the information necessary for creating a management file includes a management ID to be duplicated and acquired, an electronic data body which is caused to correspond to the management ID and is to be managed, and an access control policy caused to correspond to the management ID.

The management ID and access control policy are acquired from, for example, the system management table 1052 of the information management DB 105. In addition, the electronic data body is acquired from the data original management table 1056 of the information management DB 105, depending on whether either the original data or image scan data information is selected at the time of a duplication entry request.

Having received a management file creation request including the management ID to be duplicated and acquired, the electronic data body, and the access control policy, the management file creation module 106 creates a management file on the basis of the management file creation request. The procedure for creating a management file is, for example, as follows.

The management file creation module 106 sets a management ID in the management ID field of the electronic data in the header part. The management file creation module 106 sets a child management ID (management ID: 10010201) in the parent information medium management ID of the header part. In the file information of the header part, a file format, a file size, creator information, creation date and time information, and creation place information are set.

The management file creation module 106 sets file storage information in the header part on the basis of the presence or absence of cryptographic processing and the specification of cryptographic processing, including a cryptographic algorithm, a cryptographic key, and a cryptographic module. Here, the specification of cryptographic processing includes various cases, including a case where the upper system module 341 specifies cryptographic processing based on information in a copy acquisition request, a case where the information medium central control module 342 specifies cryptographic processing based on information in a copy acquisition management request, and a case where the information management DB control module 104 specifies cryptographic processing based on a management file creation request.

In addition, the management file creation module 106 sets access control policy information in the access control policy part.

Then, the management file creation module 106 subjects the electronic data to cryptographic processing on the basis of the file storage information in the header part and sets the obtained encrypted electronic data in a body part, thereby creating the body part.

The management file creation module 106 creates authentication data for the created header part, access control policy part, and body part by an electronic signature method based on public key cryptosystem or by a MAC method based on a hash function or symmetric-key cryptosystem. The management file creation module 106 sets the authentication data in an authentication data part of the management file, thereby creating a management file.

The management file creation module 106 sends the created management file to the information management DB control module 104 (ST140).

Having received a management file, the information management DB control module 104 enters system information including creation date and time information, creator information, medium type, access control policy, whereabouts information, and entity ID in the system management table 1052 of the information management DB 105 in such a manner that the system information is correlated with the management ID of the electronic data on the basis of the management file, management ID, and copy acquisition process request information. Here, when there is a management ID of a parent information medium, the management ID of the electronic data is entered in the system management table 1052 in such a manner that the management ID of the electronic data is correlated with the management ID of the parent information medium.

Figure 4:
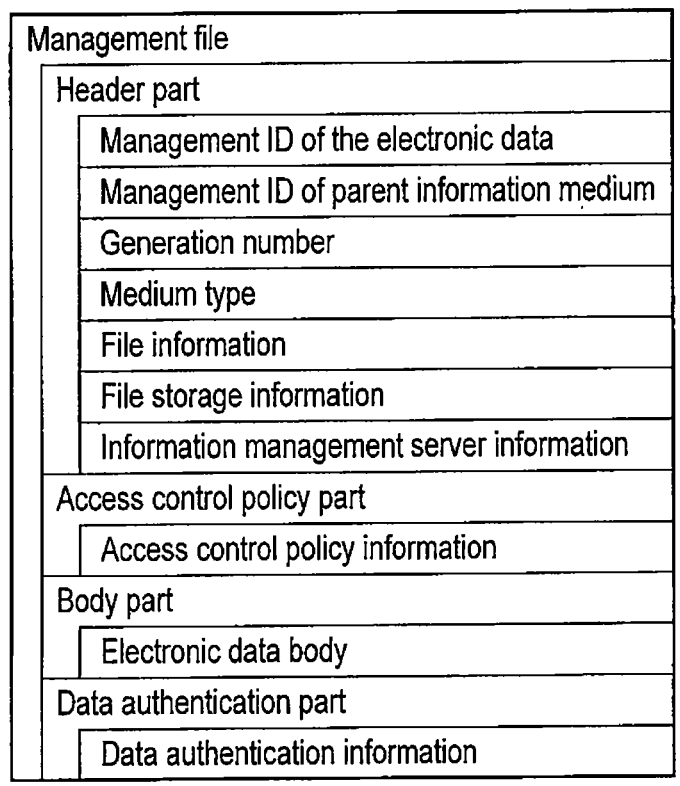
FIG. 4 is a schematic diagram showing an example of the configuration of a management file of each embodiment.

In addition, if there are a plurality of relevant management IDs, a management file creation process is performed as many times as there are the relevant management IDs. An example of the configuration of a management file is as shown in FIG. 4.

Moreover, the information management DB control module 104 performs not only the process of entering access log information on a management file creation process in the access log management table 1053 of the information management DB 105 but also the process of clearing the number of mailed files corresponding to the post-office box ID in the post-office box management table 1057 and the management ID list.

Thereafter, the information management DB control module 104 sends copy acquisition process result information including the issued management ID, management file, date and time, and operation type to the information management control module 102 (ST141).

The information management control module 102 sends the copy acquisition process result information to the management request accepting module 101 (ST142).

The management request accepting module 101 sends the copy acquisition process result information to the second information medium control device 340 (ST143).

The management request communication module 344 sends the copy acquisition process result information to the information medium central control module 342 (ST144). At the same time, the management request communication module 344 transmits a communication session disconnection request to the information management server device 100 and disconnects the communication.

The information medium central control module 342 sends copy acquisition process result information to the management file control module 345 and requests the file control module 345 to enter the processing result into the management client DB 346 (ST145).

On the basis of the copy acquisition process result information, the management file control module 345 enters the management ID, status, management file header part information, and a management file entity into the management file management table 3261. In addition, the management file control module 345 enters a copy acquisition process operation log including operation date and time information, an operation type, a management ID, and a management file name into the access log table 3262.

After having completed the entry, the management file control module 216 sends a copy acquisition process completion notice to the information medium central control module 342 (ST146). The copy acquisition process completion notice may include a management ID issued to the electronic data.

The information medium central control module 342 sends the copy acquisition process completion notice to the upper system module 341 and terminates the request session (ST147).

With the third embodiment as described above, even when electronic data is duplicated from a copy paper document and delivered, the quality of "original data" and the scan image quality of a copy paper document can be selected to make a copy as in the effect of the first embodiment.

<Fourth Embodiment> [Copy Source can be Selected at an Arbitrary Stage]

A fourth embodiment is a modification of the first to third embodiments. In the fourth embodiment, when a duplicating is performed, not only either the original or a copy a copier has but also an original derived from the original data or a copy other than the one the copier has is specified in terms of duplication quality and the specified one is output.

Hereinafter, a case where a paper duplicated child document is copied from a paper duplicated parent document and is output will be explained, centering on what the fourth embodiment differs from the first embodiment. The fourth embodiment may be further applied to printing whereby a duplicated document is output from duplicated data and to image scanning whereby duplicated data is output from a duplicated document.

First, a rough outline of the processing will be explained with reference to FIG. 50A and FIG. 50B. Now, employee C is going to cause an information medium control device 310 to read a monochrome paper document managed with management ID #1001201 employee C owns and output a duplicated document to manager D. Like a Multi-Function Peripheral or a copier, the information medium control device 310, which includes an operation panel, has the function of copying a paper document from a paper document.

At this time, data on a screen shown in FIG. 51 is sent to the panel control module 317 of the information medium control device 310. Employee C selects duplicated data (#1002101), which is neither the original data (#1000101) nor the owned duplicated document (#1001202), in the duplication quality selection area g73, and outputs the duplicated document to manager D. The process at this time will be explained in detail below.

A system management table 1052e of the information management DB 105 stores the management ID of a duplication source serving as a duplication material as a duplication source ID in a field that manages a succession ID shown in FIG. 50A and FIG. 50B in addition to a parent ID and an original ID. For example, the parent ID is #1001202, the original ID is #1000101, and the duplication source ID is #1002101. Here, the parent ID means the management ID of the parent and the original ID means the management ID of the original data.

As in steps ST1 to ST4 of the first embodiment, the Web server module 316 of the information medium control device 310 acquires user information necessary for responding to page request information from the upper system module 311 from the user management server device 200 as shown in FIG. 52 (ST151 to ST154).

The Web server module 316 sends a system information request via the upper system module 311 to the information medium central control module 312 to acquire duplication source information copiable from the owned duplicated document from the information management server device 100 (ST155 and ST156).

Having received the system information request from the upper system module 311, the information medium central control module 312 acquires parent management ID information from the print control module 318 and context information from the context information acquisition module 313 as in steps ST13 to ST18 of the first embodiment (ST157 to ST162).

The information medium central control module 312 sends system information request information including the acquired parent management ID information, context information, and system information request to the management request communication module 314 (ST163).

The management request communication module 314 sends the system information request information to the information management server device 100 (ST164).

Having received the system information request information from the information medium control device 310, the management request accepting module 101 sends the system information request information to the information management module 102 as shown in FIG. 53 (ST165).

As in steps ST22 and ST23 of the first embodiment, the information management control module 102 selects information necessary for determining whether the system information request is acceptable from the system information request and context information in the system information request information and sends the information as policy evaluation request information to the policy evaluation module 103, thereby acquiring policy evaluation result information (ST166 and ST167).

Only when the policy evaluation result has shown that the processing of the system information request is acceptable does information management control module 102 send a system information acquisition request including parent management ID information to the information management DB control module 104 (ST168).

The information management DB control module 104 retrieves the system management table 1052*e* of the information management DB 105 from the parent management ID information, further retrieves a management ID having the same original ID information as the one in the succession ID information of the parent management ID, and sends system information including the management ID, existence information, medium type, policy, whereabouts, and succession ID to the information management control module 102 (ST169).

The information management control module 102 sends server retrieval result information including the policy evaluation result and system information to the management request accepting module 101 (ST170).

The management request accepting module 101 sends the server retrieval result information to the information medium control device 310 (ST171).

Figure 54:
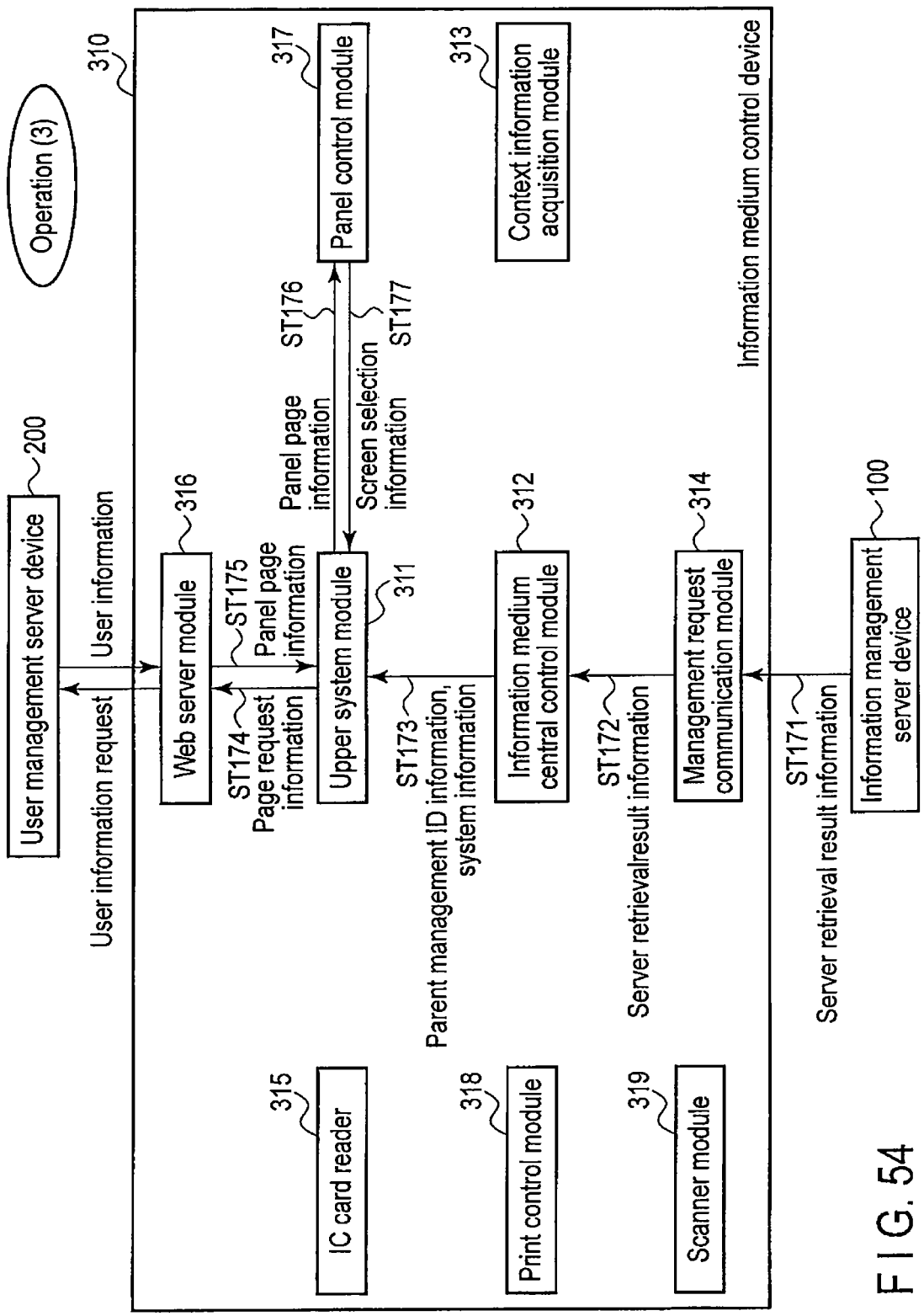
FIG. 54 is a schematic diagram to explain an operation of the fourth embodiment.

When having acquired the server retrieval result information from the information management server device 100, the management request communication module 314 sends the server retrieval result information to the information medium central control module 312 as shown in FIG. 54 (ST172).

Only when the policy evaluation result in the server retrieval result information is acceptable does the information medium central control module 312 send the system information included in the server retrieval result information and the parent management ID information acquired in step ST157 to the upper system module 331 (ST173).

The upper system module 331 sends page request information including the parent management ID information and system information to the Web server module 316 (ST174).

The Web server module 316 creates panel screen page information from the page request information including the parent management ID information and system information and sends the panel screen page information to the upper system module 331 (ST175). FIG. 51 shows a panel screen page G70. Here, user information necessary in a distribution address list g72 is acquired from the user management server device 200 as needed.

The upper system module 331 sends the panel page information acquired from the Web server module 316 to the panel control module 317 and requests the panel control module 317 to display the panel page information on an operation panel (ST176).

Here, in the duplication quality selection area g73, management IDs #1000010, #1002101, #1001202 can be specified. Management ID #1000010 and management ID #1001202 correspond to "Reading original text data" and "Copying duplication" in the first embodiment, respectively.

The panel control module 317 sends screen selection information to the upper system module 331 as in step ST11 of the first embodiment (ST177).

When "Reading original text" and "Copying duplication" have been selected in duplication quality, the upper system module 331 performs a copy process as in steps ST12 to ST42 of the first embodiment. Since the parent document has been scanned and the context information has been acquired, the copy process can be omitted suitably.

When a management ID other than "Reading original text data" and "Copying duplication" has been specified in duplication quality as a duplication source, the information management control module 102 requests the information management DB control module 104 to read copy data related to a specified management ID instead of reading original text data.

The information management DB control module 104 retrieves the management ID specified in the system management table 1052*e*, acquires duplicated data information serving as a duplication material from the data original management table 1056 on the basis of an entity ID related to the management ID, and sends the copy data information to the information management control module 102.

The information medium central control module 312 sends copying request information including the duplicated data information to the print control module 318. The print control module 318 creates a duplicated document from the duplicated data information and issued child management ID and outputs the duplicated document.

Here, when system management information can be acquired with any device, by any user, at any time, or at any place without restriction, the context information acquisition process and policy evaluation process in steps ST161, ST162, ST166, and ST167 may be omitted.

The same holds true when the fourth embodiment is applied to the second embodiment. In step ST56, the information management server device 100 stores entity file information with the specified management ID in place of the original data information included in the server processing result information.

The information medium control device 320 sends printing request information including child management ID information, entity file information with the specified management ID, and copy destination information to the printer 400 and causes the printer 400 to output a copy with a duplication quality of a duplicated data entity with the specified management ID.

The same holds true when the fourth embodiment is applied to the third embodiment. In step ST139, the information management DB control module 104 acquires a duplicated data entity with the specified management ID from the information management DB 105 in place of the original data and requests the management file creation module 106 to create a management file for the duplicated data.

As described above, the fourth embodiment produces the effect of enabling an original derived from the original data or a copy other than the one the copier owns to be specified and output in addition to the effects of the first to third embodiments to which the fourth embodiment has been applied.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A selective duplicating system comprising a paper medium duplicating device and an information management server device which are capable of communicating with each other, wherein the information management server device comprises:
  a first storage unit which, regarding original data, stores a management ID, an entity ID, and an electronic data body which are associated with each other;
  a second storage unit which, regarding paper mediums duplicated sequentially from the original data, stores policy information to indicate whether a user is permitted to duplicate each of the paper mediums, original data, and the individual items of the original data and a management ID of the original data which are associated with each other on a management ID basis;
  a unit which reads policy information related to a management ID in a duplication request from the second storage unit when having received the duplication request that includes a management ID indicating a paper medium to be duplicated, duplication source selection information that has selected the paper medium or original data as a duplication source, and user information;
  a unit which collates the read policy information with the user information in the duplication request and determines whether to permit the duplicating of the paper medium or original data selected in the duplication source selection information;
  a unit which reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body;
  a unit which transmits the created duplicated original data to the paper medium duplicating device; and
  a unit which transmits a new management ID to the paper medium duplicating device when the determination result for the paper medium has shown that the duplicating is permitted; and
the paper medium duplicating device comprises
  a unit which transmits the duplication request to the information management server device;
  a unit which creates duplicated paper medium data by giving the new management ID received from the information management server device to image data read from the paper medium to be duplicated; and
  a unit which prints and outputs the duplicated original data received from the information management server device or the created duplicated paper medium data.

2. A selective duplicating system comprising a print control device and an information management server device which are capable of communicating with each other, wherein the print control device comprises:
  a first storage unit which, regarding each of original data and electronic data bodies sequentially duplicated from the original data, stores a management ID and an electronic data body which are associated with each other;
  a unit which transmits a duplication request including a management ID indicating an electronic data body to be duplicated, duplication source selection information that has selected either the electronic data body or original data as a duplication source, and user information to the information management server device;

a unit which creates duplicated data by giving a new management ID received from the information management server device to the electronic data body in the first storage unit related to the management ID in the duplication request; and a unit which outputs the created duplicated data to a printer; and the information management server device comprises a second storage unit which, regarding each of the original data and electronic data bodies sequentially duplicated from the original data, stores policy information to indicate whether a user is permitted to duplicate each of the electronic data body, original data, and the individual items of the original data and a management ID of the original data which are associated with each other on a management ID basis;

a unit which reads policy information related to a management ID in the duplication request from the second storage unit when having received the duplication request from the print control device;

a unit which collates the read policy information with user information in the duplication request and determines whether to permit the duplicating of the electronic data body or original data selected in the duplication source selection information; and a unit which transmits a new management ID to the print control device when the determination result has shown that the duplicating is permitted.

3. A selective duplicating system comprising a scanner device, an information medium control device, and an information management server device which are capable of communicating with one another, wherein the information management server device comprises:

a first storage unit which, regarding original data, stores a management ID, an entity ID, and an electronic data body which are associated with each other;

a second storage unit which, regarding electronic data bodies duplicated sequentially from the original data, stores policy information to indicate whether a user is permitted to duplicate each of the electronic data bodies, original data, and the individual items of the original data, a management ID of the original data, and duplication source selection information which are associated with each other on a management ID basis;

a third storage unit which, regarding the electronic data bodies sequentially duplicated from the original data, stores the electronic data bodies and entity IDs which are associated with the management IDs in the second storage unit;

a post-office box ID storage unit which stores a post-office box ID corresponding to the information medium control device and a management ID indicating a duplicated electronic data body which are associated with each other;

a unit which reads policy information related to a management ID in a duplication request from the second storage unit when having received the duplication request that includes image data read from a paper medium to be duplicated, a management ID indicating the paper medium read from the image data, duplication source selection information that has selected the paper medium or original data as a duplication source, user information, and a post-office box ID from the scanner device;

a unit which collates the read policy information with the user information in the duplication request and determines whether to permit the duplicating of the paper medium or original data selected in the duplication source selection information;

a unit which, regarding a new management ID, updates the second storage unit so that the second storage unit may store policy information to indicate whether a user is permitted to duplicate the electronic data bodies duplicated from the original data, a management ID of the original data, and duplication source selection information which are associated with each other when the determination result for the original data has shown that the duplicating is permitted;

a unit which not only updates the second storage unit so that the second storage unit may, regarding a new management ID, store policy information to indicate whether a user is permitted to duplicate image data as the electronic data bodies duplicated from the paper medium, a management ID of the original data, and duplication source selection information which are associated with each other but also updates the third storage unit so that the third storage unit may, regarding a new management ID in the second storage unit, store the image data and entity ID which are associated with each other when the determination result for the paper medium has shown that the duplicating is permitted;

a unit which writes the new management ID and the post-office box ID in the duplication request which are associated with each other in the post-office box storage unit when the determination result for the original data or paper medium has shown that the duplicating is permitted; and a unit which transmits a management ID in the post-office box storage unit and an electronic data body related to duplication source selection information corresponding to the management ID and an entity ID to the information medium control device based on a post-office box ID when having received a post-office box confirmation request including the post-office box ID from the information medium control device; and the information medium control device comprises a fourth storage unit which, regarding electronic data bodies sequentially duplicated from the original data, stores management IDs and the electronic data bodies which are associated with each other;

a unit which transmits a post-office box confirmation request including a post-office box ID to the information management server device; and a unit which writes the management ID and the electronic data body received from the information management server device in the fourth storage unit in compliance with the post-office box confirmation request.

4. A selective duplicating system comprising a paper medium duplicating device and an information management server device which are capable of communicating with each other, wherein the information management server device comprises:

a first storage unit which, regarding stored original data, stores a management ID, an entity ID, and an electronic data body which are associated with each other;

a second storage unit which, regarding paper mediums duplicated sequentially from the original data, stores policy information to indicate whether a user is permitted to duplicate each of the paper mediums, original data, and the individual items of the original data and a management ID of the original data which are associated with each other on a management ID basis;

a unit which reads policy information related to a management ID in a duplication request from the second storage unit when having received a duplication request that includes a management ID indicating a paper medium to be duplicated, a duplication source selection ID obtained by, regarding each of original data and electronic data bodies sequentially duplicated from the original data, selectively specifying a management ID of either the original data or any one of the electronic data bodies as a duplication source, and user information;

a unit which collates the read policy information with the user information in the duplication request and determines whether to permit the duplicating of the paper medium or original data selected in the duplication source selection ID;

a unit which reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body;

a unit which transmits the created duplicated original data to the paper medium duplicating device;

a unit which transmits a new management ID to the paper medium duplicating device when the determination result for the paper medium has shown that the duplicating is permitted;

a unit which writes the duplication source selection ID in the duplication request and the management ID in the second storage unit which are associated with each other in the second storage unit; and a unit which sends back duplication system information including the management ID in the second storage unit and the duplication source selection ID to a sender of a system information request when having received the system information request before the duplication request; and the paper medium duplicating device comprises a unit which transmits the duplication request to the information management server device, a unit which creates duplicated paper medium data by giving a new management ID received from the information management server device to image data read from the paper medium to be duplicated; and a unit which prints and outputs the duplicated original data received from the information management server device or the created duplicated paper medium data.

5. An information management server device capable of communicating with a paper medium duplicating device, comprising:

a first storage unit which, regarding original data, stores a management ID, an entity ID, and an electronic data body which are associated with each other;

a second storage unit which, regarding paper mediums duplicated sequentially from the original data, stores policy information to indicate whether a user is permitted to duplicate each of the paper mediums, original data, and the individual items of the original data and a management ID of the original data which are associated with each other on a management ID basis;

a unit which reads policy information related to a management ID in a duplication request from the second storage unit when having received the duplication request that includes a management ID indicating a paper medium to be duplicated, duplication source selection information that has selected the paper medium or original data as a duplication source, and user information;

a unit which collates the read policy information with the user information in the duplication request and determines whether to permit the duplicating of the paper medium or original data selected in the duplication source selection information;

a unit which reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body;

a unit which transmits the created duplicated original data to the paper medium duplicating device; and a unit which transmits a new management ID to the paper medium duplicating device when the determination result for the paper medium has shown that the duplicating is permitted; and the paper medium duplicating device prints and outputs duplicated paper medium data created by giving a new management ID received as a result of the transmission of the duplication request to image data read from the paper medium to be duplicated when the duplication source selection information has selected a paper medium or prints and outputs the transmitted duplicated original data when the duplication source selection information has selected the original data.

6. An information management server device capable of communicating with a print control device, comprising:

a storage unit which, regarding each of the original data and electronic data bodies sequentially duplicated from the original data, stores policy information to indicate whether a user is permitted to duplicate each of the electronic data body, original data, and the individual items of the original data and a management ID of the original data which are associated with each other on a management ID basis;

a unit which reads policy information related to a management ID in a duplication request from the storage unit when having received a management ID indicating an electronic data body to be duplicated, duplication source selection information that has selected either the electronic data body or original data as a duplication source, and user information from the print control device;

a unit which collates the read policy information with user information in the duplication request and determines whether to permit the duplicating of the electronic data body or original data selected in the duplication source selection information; and a unit which transmits a new management ID to the print control device when the determination result has shown that the duplicating is permitted; and the print control device, regarding each of the original data and electronic data bodies sequentially duplicated from the original data, stores a management ID and an electronic data body which are associated with each other in a memory, creates duplicated data by giving a new management ID received as a result of the transmission of the duplication request to the electronic data body in the memory related to the management ID in the duplication request, and outputs the created duplicated data to a printer.

7. An information management server device capable of communicating with a scanner device and an information medium control device, comprising:
   a first storage unit which, regarding original data, stores a management ID, an entity ID, and an electronic data body which are associated with each other;
   a second storage unit which, regarding electronic data bodies duplicated sequentially from the original data, stores policy information to indicate whether a user is permitted to duplicate each of the electronic data bodies, original data, and the individual items of the original data, a management ID of the original data, and duplication source selection information which are associated with each other on a management ID basis;
   a third storage unit which, regarding the electronic data bodies sequentially duplicated from the original data, stores the electronic data bodies and entity IDs which are associated with the management IDs in the second storage unit;
   a post-office box ID storage unit which stores a post-office box ID corresponding to the information medium control device and a management ID indicating a duplicated electronic data body which are associated with each other;
   a unit which reads policy information related to a management ID in a duplication request from the second storage unit when having received the duplication request that includes image data read from a paper medium to be duplicated, a management ID indicating the paper medium read from the image data, duplication source selection information that has selected the paper medium or original data as a duplication source, user information, and a post-office box ID from the scanner device;
   a unit which collates the read policy information with the user information in the duplication request and determines whether to permit the duplicating of the paper medium or original data selected in the duplication source selection information;
   a unit which updates the second storage unit so that the second storage unit may, regarding a new management ID, store policy information to indicate whether a user is permitted to duplicate the electronic data bodies duplicated from the original data, a management ID of the original data, and duplication source selection information which are associated with each other when the determination result for the original data has shown that the duplicating is permitted;
   a unit which not only updates the second storage unit so that the second storage unit may, regarding a new management ID, store policy information to indicate whether a user is permitted to duplicate image data as the electronic data bodies duplicated from the paper medium, a management ID of the original data, and duplication source selection information which are associated with each other but also updates the third storage unit so that the third storage unit may, regarding a new management ID in the second storage unit, store the image data and entity ID which are associated with each other when the determination result for the paper medium has shown that the duplicating is permitted;
   a unit which writes the new management ID in the post-office box storage unit associated with a post-office box ID in the duplication request when the determination result for the original data or paper medium has shown that the duplicating is permitted; and
   a unit which transmits a management ID in the post-office box storage unit and an electronic data body related to duplication source selection information corresponding to the management ID and an entity ID to the information medium control device based on a post-office box ID when having received a post-office box confirmation request including the post-office box ID from the information medium control device.

8. An information management server device capable of communicating with a paper medium duplicating device, comprising:
   a first storage unit which, regarding stored original data, stores a management ID, an entity ID, and an electronic data body which are associated with each other;
   a second storage unit which, regarding paper mediums duplicated sequentially from the original data, stores policy information to indicate whether a user is permitted to duplicate each of the paper mediums, original data, and the individual items of the original data and a management ID of the original data which are associated with each other on a management ID basis;
   a unit which reads policy information related to a management ID in a duplication request from the second storage unit when having received a duplication request that includes a management ID indicating a paper medium to be duplicated, a duplication source selection ID obtained by, regarding each of original data and electronic data bodies sequentially duplicated from the original data, selectively specifying a management ID of either the original data or any one of the electronic data bodies as a duplication source, and user information;
   a unit which collates the read policy information with the user information in the duplication request and determines whether to permit the duplicating of the paper medium or original data selected in the duplication source selection ID;
   a unit which reads the management ID of the original data related to the management ID in the duplication request and the electronic data body related to the entity ID with reference to the first and second storage units when the determination result for the original data has shown that the duplicating is permitted and creates duplicated original data by giving a new management ID to duplicated data obtained by duplicating the electronic data body;
   a unit which transmits the created duplicated original data to the paper medium duplicating device;
   a unit which transmits a new management ID to the paper medium duplicating device when the determination result for the paper medium has shown that the duplicating is permitted;
   a unit which writes the duplication source selection ID in the duplication request into the second storage unit associated with the management ID in the second storage unit; and
   a unit which sends back duplication system information including the management ID in the second storage unit and the duplication source selection ID to a sender of a system information request when having received the system information request before the duplication request; and
   the paper medium duplicating device prints and outputs duplicated paper medium data created by giving a new management ID received as a result of the transmission of the duplication request to image data read from the paper medium to be duplicated when the duplication source selection ID has selected a paper medium or prints and outputs the transmitted duplicated original data when the duplication source selection ID has selected the original data.

* * * * *